(12) United States Patent
Nakamura

(10) Patent No.: US 11,521,192 B2
(45) Date of Patent: Dec. 6, 2022

(54) SETTLEMENT SYSTEM, USER TERMINAL AND METHOD EXECUTED THEREBY, SETTLEMENT DEVICE AND METHOD EXECUTED THEREBY, AND PROGRAM

(71) Applicant: NTI, Inc., Yokkaichi (JP)

(72) Inventor: Takatoshi Nakamura, Yokkaichi (JP)

(73) Assignee: NTI, INC., Mie (JP)

(*) Notice: Subject to any disclaimer, the term of this patent is extended or adjusted under 35 U.S.C. 154(b) by 0 days.

(21) Appl. No.: 16/065,210

(22) PCT Filed: Nov. 4, 2016

(86) PCT No.: PCT/JP2016/082872
§ 371 (c)(1),
(2) Date: Oct. 1, 2018

(87) PCT Pub. No.: WO2017/110268
PCT Pub. Date: Jun. 29, 2017

(65) Prior Publication Data
US 2019/0236580 A1    Aug. 1, 2019

(30) Foreign Application Priority Data
Dec. 22, 2015    (JP) .............................. JP2015250700

(51) Int. Cl.
*G06Q 20/32*    (2012.01)
*G06Q 20/40*    (2012.01)
(Continued)

(52) U.S. Cl.
CPC ....... *G06Q 20/3223* (2013.01); *G06Q 20/102* (2013.01); *G06Q 20/3676* (2013.01);
(Continued)

(58) Field of Classification Search
None
See application file for complete search history.

(56) References Cited

U.S. PATENT DOCUMENTS 6,058,382 A * 5/2000 Kasai .................... G06Q 20/04
705/39
7,155,411 B1 * 12/2006 Blinn .................... G06Q 20/02
705/40
(Continued)

FOREIGN PATENT DOCUMENTS

JP    H11195072 A    7/1999
JP    2001067396 A    3/2001
(Continued)

OTHER PUBLICATIONS

International Search Report, PCT/JP2016/082872, dated Jan. 18, 2017, 4 pages.
(Continued)

*Primary Examiner* — Cho Kwong
*Assistant Examiner* — Bhavin D Shah
(74) *Attorney, Agent, or Firm* — Edell, Shapiro & Finnan, LLC

(57) ABSTRACT

A settlement system with higher security which replaces a settlement system using credit cards is provided. The settlement system has a user terminal, a settlement device, and a settlement terminal. First, a user ID, a password, and upper limit amount information identifying an amount are inputted in a user terminal 100 (S912), and sent to the settlement device (S913). The settlement device performs credit determination (S922), generates temporary permission information if credit is possible (S923), and sends the temporary permission information to the user terminal (S924). The user terminal generates a one-time password (S915). The one-time password is inputted to the settlement terminal (S931). If the one-time password sent from the settlement terminal to the settlement device is identical to the one-time password created in the settlement device, the settlement device allows a user's payment (S928).

29 Claims, 23 Drawing Sheets

(51) Int. Cl.
  *G06Q 20/10* (2012.01)
  *G06Q 20/36* (2012.01)
  *G06Q 20/38* (2012.01)
  *G07G 1/12* (2006.01)

(52) U.S. Cl.
  CPC .......... *G06Q 20/385* (2013.01); *G06Q 20/40* (2013.01); *G06Q 20/407* (2013.01); *G07G 1/12* (2013.01)

(56) References Cited

U.S. PATENT DOCUMENTS

| | | | | |
|---|---|---|---|---|
| 7,346,578 | B1 * | 3/2008 | Ishida | G06Q 20/10 235/379 |
| 7,386,511 | B2 * | 6/2008 | Buchanan | G06Q 20/042 235/379 |
| 7,475,040 | B2 * | 1/2009 | Buchanan | G06Q 20/042 705/40 |
| 7,720,717 | B2 * | 5/2010 | Fujita | G06Q 20/10 705/26.35 |
| 9,002,750 | B1 * | 4/2015 | Chu | H04W 12/04 705/72 |
| 2009/0119190 | A1 * | 5/2009 | Realini | G06Q 20/04 705/30 |
| 2013/0268444 | A1 * | 10/2013 | Namgoong | H04L 63/0838 705/71 |

FOREIGN PATENT DOCUMENTS

| | | |
|---|---|---|
| JP | 2002207970 A | 7/2002 |
| JP | 2006004264 A | 1/2006 |
| JP | 2006504179 A | 2/2006 |
| JP | 2010061318 A | 3/2010 |
| JP | 2011209861 A | 10/2011 |

OTHER PUBLICATIONS

Written Opinion, PCT/JP2016/082872, dated Jan. 31, 2017, 13 pages.

* cited by examiner

| USER ID | PASSWORD | TERMINAL INFORMATION | CREDIT BALANCE (¥) |
|---|---|---|---|
| 12385adf0 | fai2fa60 | 123456789 | 10000000 |
| d2af1apfa | aofau554 | 012457854 | 2956002 |
| fd8a4op44 | mauoa365 | 658799365 | 1505612 |
| nm465fai3 | 009afaoi | 709658456 | 204550 |
| faio897a8 | pl36a7uf | 325778456 | 5002230 |
| ⁎ | ⁎ | ⁎ | ⁎ |
| ⁎ | ⁎ | ⁎ | ⁎ |
| ⁎ | ⁎ | ⁎ | ⁎ |
| ⁎ | ⁎ | ⁎ | ⁎ |
| ⁎ | ⁎ | ⁎ | ⁎ |
| ⁎ | ⁎ | ⁎ | ⁎ |
| 90afa45a5 | 5f0a65ak | 201147775 | 700445 |
| 21orz4651 | a4awktk0 | 123388440 | 0 |

FIG. 7

| SETTLEMENT TERMINAL ID | POSITION INFORMATION | | FACILITY NAME | BUSINESS TYPE NAME | ENTERPRISE NAME |
|---|---|---|---|---|---|
| 1 | 36° 18' 48.3"N | 139° 21' 17.5"E | McDonald's (SHIMBASHI BRANCH) | RESTAURANTS | — |
| 2 | 48° 34' 25.3"N | 13° 24' 56.8"E | STARBUCKS (AKASAKA BRANCH) | RESTAURANTS | ○○MALL |
| 3 | 40° 44' 33.2"N | 73° 59' 36.1"W | ○○CAFE | RESTAURANTS | XX BUILDING |
| 4 | | | ○○FASHION | CLOTHING | RAKUTEN ICHIBA |
| 5 | 33° 56' 41.4"S | 151° 14' 46.7"E | McDonald's (AOYAMA BRANCH) | RESTAURANTS | — |
| ... | ... | ... | ... | ... | ... |
| n−1 | 41° 24' 14.2"N | 2° 11' 09.1"E | ××BOOKS | BOOKS | — |
| n | 22° 54' 37.7"S | 43° 14' 27.6"W | ○○SUPERMARKET | RETAIL | ○○MALL |

FIG. 8

| USER ID | INITIAL | VALUE | NUMBER OF GENERATION |
|---|---|---|---|
| 12385adf0 | 001245533 | 123458899 | 12 |
| d2af1apfa | 178655336 | 458752225 | 233 |
| fd8a4op44 | 398756899 | 157846355 | 0 |
| nm465fai3 | 569869896 | 700002321 | 4501 |
| faio897a8 | 755003665 | 923658855 | 990 |
| ⁎ | ⁎ | ⁎ | ⁎ |
| 90afa45a5 | 4577778123 | 6356899677 | 9455 |
| 21orz4651 | 6898100021 | 3236955441 | 214651 |

FIG. 9

| USER ID | ONE-TIME PASSWORD | VIRTUAL BALANCE | TIME INFORMATION | ADDITIONAL CONDITION |
|---|---|---|---|---|
| d2af1apfa | 01563894451 | 21000 | 2016/12/24/10/11 | ONLY ○○ MALL |
| | f23aa012200 | 4000 | 2016/12/24/10/11 | CLOSE TO USER TERMINAL |
| fd8a4op44 | 1198431qa01 | 5000 | 2016/12/24/10/25 | WITHIN TWO DAYS |
| nm465fai3 | kcblkq2dall | 200000 | 2016/12/24/21/00 | ONLY McDonald's |
| faio897a8 | 9558475&da3 | 5000 | 2016/12/24/22/57 | |
| | 125adlkfaa4 | 3000 | 2016/12/24/22/57 | |
| | idaxbhkaau8 | 1000 | 2016/12/24/22/57 | ONLY McDonald's SHIMBASHI BRANCH |
| ⋮ | ⋮ | ⋮ | ⋮ | ⋮ |
| 21orz4651 | zk0j32dad7a | 30000 | 2016/12/25/01/00 | ONLY RESTAURANTS AND BOOK STORES |
| | 65mnajda4fa | 2000 | 2016/12/25/01/00 | |
| | lk87zv87av3 | 2000 | 2016/12/25/01/00 | WITHIN 30 MINUTES |

START SETTLEMENT     (DECIDE)

USER ID: ☐
PASSWORD: ☐
UPPER LIMIT AMOUNT: ☐ YEN
☐ SPLIT UPPER LIMIT AMOUNT
☐ ADD ADDITIONAL CONDITIONS (B)

START SETTLEMENT     (DECIDE)

USER ID: d2af1apfa
PASSWORD: aofau554
AMOUNT (YEN): 25,000 YEN
☑ SPLIT UPPER LIMIT AMOUNT
☑ ADD ADDITIONAL CONDITIONS

ADDITIONAL CONDITIONS (DECIDE)

☐ LIMIT PLACE OF PAYMENT RECIPIENT
☐ LIMIT BUSINESS TYPE AND THE LIKE
   OF PAYMENT RECIPIENT
☐ LIMIT PAYMENT PERIOD (B)

ADDITIONAL CONDITIONS (DECIDE)

☑ LIMIT PLACE OF PAYMENT RECIPIENT
☑ LIMIT BUSINESS TYPE AND THE LIKE
   OF PAYMENT RECIPIENT
☑ LIMIT PAYMENT PERIOD

```
RESTRICTIONS OF BUSINESS TYPE        [DECIDE]
AND THE LIKE OF PAYMENT RECIPIENT
        BUSINESS TYPE: [          ]
                GROUP: [          ]
             FACILITY: [          ]
                STORE: [          ]
```

(B)

```
RESTRICTIONS OF BUSINESS TYPE        [DECIDE]
AND THE LIKE OF PAYMENT RECIPIENT
        BUSINESS TYPE: [              ]
                GROUP: [              ]
             FACILITY: [    ○○ MALL  ]
                STORE: [              ]
```

RESTRICTION OF PAYMENT PERIOD (DECIDE)

START PAYMENT: YYYY/MM/DD/hh/mm
END PAYMENT: YYYY/MM/DD/hh/mm (B)

RESTRICTION OF PAYMENT PERIOD (DECIDE)

START PAYMENT: 2016/12/25/00/00
END PAYMENT: 2016/12/25/23/59

ONE-TIME PASSWORD IS AS FOLLOWS

THIS ONE-TIME PASSWORD IS VALID FOR ONE WEEK FROM NOW 0 1 5 6 3 8 9 4 4 5 1

(B)

YOUR REQUESTED SETTLEMENT CANNOT BE PERFORMED DUE TO FOLLOWING REASON

☐ USER ID IS WRONG
☑ PASSWORD IS NOT CORRECT
☐ THIS IS NOT A REGISTERED TERMINAL
☐ CREDIT BALANCE IS INSUFFICIENT

FINAL CHECK  (DECIDE)

USER ID:
O T P:
PAYMEN AMOUNT:

(B)

FINAL CHECK  (DECIDE)

USER ID: d2af1apfa
O T P: 0 1 5 6 3 8 9 4 4 5 1
PAYMEN AMOUNT: 10000 YEN

CANCELABLE SETTLEMENTS　　(DECIDE)

☐　2016/12/25 19:21　¥25,000
☐　2016/12/25 19:18　¥2,600

(B)

CANCELABLE SETTLEMENTS　　(DECIDE)

| USER ID | PASSWORD | TERMINAL INFORMATION | DEPOSIT BALANCE (¥) |
|---|---|---|---|
| 12385adf0 | fai2fa60 | 123456789 | 10000000 |
| d2af1apfa | aofau554 | 012457854 | 2956002 |
| fd8a4op44 | mauoa365 | 658799365 | 1505612 |
| nm465fai3 | 009afaoi | 709658456 | 204550 |
| faio897a8 | pl36a7uf | 325778456 | 5002230 |
| ⁎ | ⁎ | ⁎ | ⁎ |
| ⁎ | ⁎ | ⁎ | ⁎ |
| ⁎ | ⁎ | ⁎ | ⁎ |
| ⁎ | ⁎ | ⁎ | ⁎ |
| ⁎ | ⁎ | ⁎ | ⁎ |
| ⁎ | ⁎ | ⁎ | ⁎ |
| 90afa45a5 | 5f0a65ak | 201147775 | 700445 |
| 2lorz4651 | a4awktk0 | 123388440 | 0 |

FIG. 22

(A)
(B)
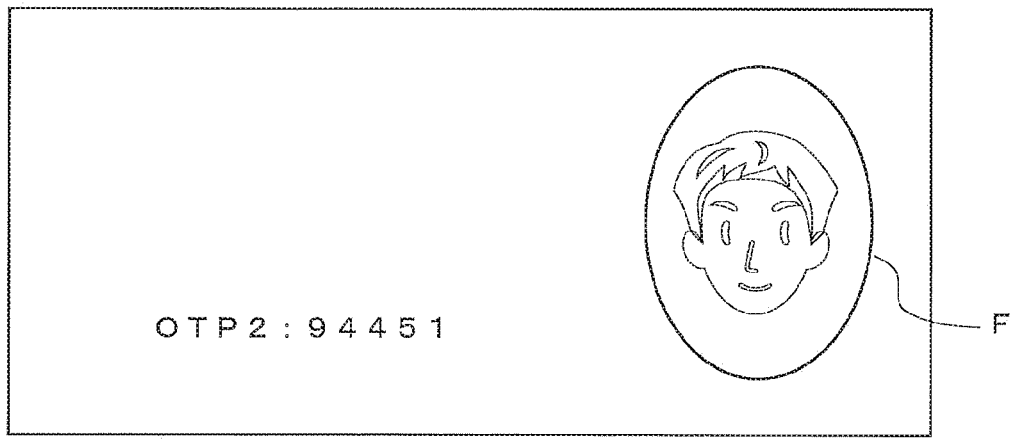
FIG. 23

(A)
(B)
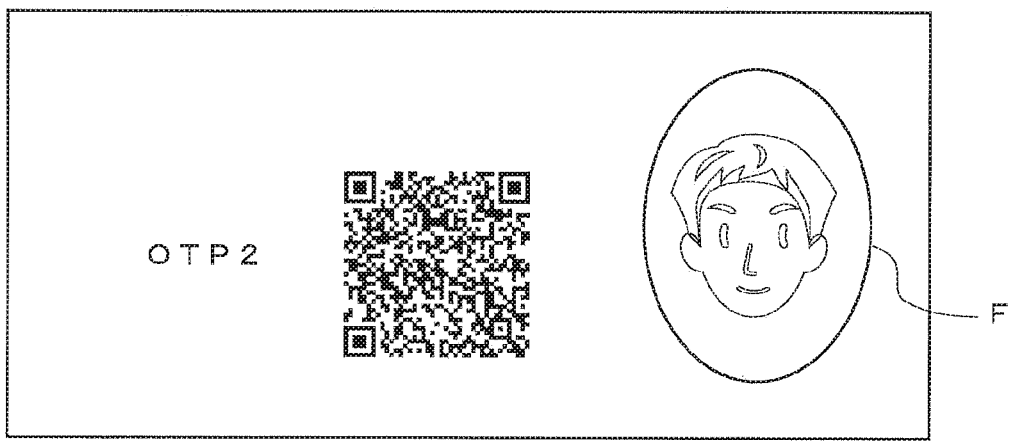
FIG. 24

SETTLEMENT SYSTEM, USER TERMINAL AND METHOD EXECUTED THEREBY, SETTLEMENT DEVICE AND METHOD EXECUTED THEREBY, AND PROGRAM

TECHNICAL FIELD

The present invention relates to a settlement system.

BACKGROUND ART

For example, credit card settlements are widely used for payment at stores, eating places and the like, as well as payment for buying and selling goods on the Internet. Such settlements (payment of money) are now performed via the Internet or other networks.

More specifically, the credit card settlements are performed as follows.

For a currently popular credit card, when a user performs the payment with the credit card, data read with a card reader or the like of a brick-and-mortar store if the user has used the credit card at the brick-and-mortar store, or data sent by the user to a virtual store on the web, for example, through encrypted communication, if the user has used the credit card at the virtual store, is sent from the brick-and-mortar store or the virtual store, via the network such as the Internet, to a settlement device that is a computer of a credit card company (or a computer managed by the credit card company). In the settlement device, an approach is generally employed in which it is determined whether or not credit is possible for the user, based on the received data, and the settlement is performed if the credit has been successful. While such credit is intended to mitigate risks taken by the credit card company, the computer of the credit card company attempts to mitigate risks due to fraudulent use of the credit card through impersonation by a third party, also by performing user authentication (for example, authentication by seeing legitimacy of a combination of a credit card number and a name of a credit card holder) prior to performing the credit. The authentication for the user as above is basically performed with the credit card number and the credit card holder which are physically imprinted or electromagnetically recorded information on the credit card.

SUMMARY OF INVENTION

Technical Problem

As mentioned above, only one fixed credit card number on the credit card exists for one credit card. Accordingly, complete elimination of the impersonation by the third party is difficult in the authentication with the credit card number.

In addition to a case where the credit card itself has been stolen by a malicious third party, if the credit card number has leaked as data, for example, from a database having recorded credit card numbers of customers for the settlement device or the like, the malicious third party can easily impersonate an owner of the credit card.

Various contrivances have been provided for the purpose of increasing precision of the user authentication to thereby reduce the fraudulent use of the credit card through the impersonation by the third party. If the credit card is used at the brick-and-mortar store, one of the contrivances is, of course, to essentially have the user's signature. Moreover, recently, various technologies such as CVC (Card Verification Code) and CVC2 are also actually used. However, these technologies merely increase the precision of the authentication by using a several-digit number other than the credit card number, with the credit card number in the authentication. Since the several-digit number used with the credit card number is constantly fixed similarly to the credit card number, these technologies only have an effect like that obtained by somewhat increasing the number of digits of the credit card number, and the effect of increasing the precision of the user authentication is also highly restricted.

An object of the invention of the present application is to propose a novel settlement technology which replaces a settlement technology using credit cards, and in which fraud through the impersonation by the third party is unlikely to occur.

Solution to Problem

In order to achieve this object, the inventor of the present application proposes the invention as described below.

The invention of the present application is a settlement system configured to include a user terminal used by a user, comprising user terminal input means that accepts input of information, user terminal transmission and reception means that performs transmission and reception of data via a predetermined network, and user terminal information processing means that performs information processing; a settlement device that performs settlement of the user's payment, comprising settlement device transmission and reception means that performs transmission and reception of the data via the network, and settlement device information processing means that performs information processing, and a recording medium that records at least virtual balance information for each user so as to be associated with each user; and a settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network.

The user terminal in this settlement system is capable of inputting upper limit amount information that is information identifying an amount of an upper limit of the settlement, and amount information that is information identifying an amount to be settled, with the user terminal input means, and transmits the upper limit amount information and user information that is information identifying the user who performs the payment of the amount identified by the upper limit amount information, to the settlement device via the network with the user terminal transmission and reception means; and moreover, the user terminal information processing means comprises a user terminal OTP generation unit that generates a one-time password.

Moreover, the settlement device in the settlement system receives the upper limit amount information and the user information from the user terminal with the settlement device transmission and reception means; the settlement device information processing means comprises a credit determination unit that, if the settlement device transmission and reception means has received the upper limit amount information and the user information, executes credit determination that is determination of whether or not the settlement of the payment of the amount identified by the upper limit amount information sent from the user terminal is possible, and if it is determined in the credit determination that the settlement is possible, generates temporary permission information that is information indicating the determination; the settlement device information processing means also comprises a final determination unit that performs final determination of the settlement, and a settlement device OTP generation unit that generates the one-time password identical to the one-time password which is generated in the user terminal if the temporary permission information has been generated; and the settlement device transmission and reception means transmits the temporary permission information generated by the credit determination unit to the user terminal via the network; and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password in the settlement device OTP generation unit.

In addition, in this settlement system, when the temporary permission information is accepted from the settlement device by the user terminal at the user terminal transmission and reception means, the user terminal OTP generation unit generates the one-time password; and if the one-time password generated in the user terminal and the amount information have been inputted from the settlement terminal input means of the settlement terminal, and the settlement terminal has sent the one-time password from the settlement terminal transmission and reception means to the settlement device via the network, the virtual balance information associated with a one-time password identical to the one-time password received from the settlement terminal by the settlement device is read out from the recording medium, and also on a condition that the amount identified by the amount information received from the settlement terminal is equal to or less than an amount identified by the virtual balance information, the final determination unit of the settlement device permits the payment from the user of the user terminal to an administrator of the settlement terminal with the one-time password, and also subtracts the amount used for the payment, from the virtual balance information recorded so as to be associated with the one-time password used for the payment in the recording medium.

In an illustration for the purpose of helping general understanding of the invention of the present application, the user terminal in the settlement system of the invention of the present application is used, managed, etc. by the user, and corresponds to a credit card in a conventional settlement system using credit cards. The settlement device of the invention of the present application corresponds to a settlement device managed, etc. by a credit card company or the like in a credit card settlement system. Moreover, the settlement terminal of the invention of the present application corresponds to a device having a card reader placed at a brick-and-mortar store in the credit card settlement system, or if the settlement system is applied to the settlement at a virtual store on the Internet, the settlement terminal of the invention of the present application corresponds to a computer itself used by the user, or a computer managed by an administrator of the virtual store, which receives the one-time password from the computer used by the user, or a combination thereof. However, the above illustration is merely an illustration, and may also be not necessarily accurate since the invention of the present application may also be a totally new settlement system.

The user terminal of the invention of the present application is a computer, for example, a portable computer, and is a mobile phone, a smartphone, a tablet or the like. It is now very common also for ordinary people to carry around such equipment. The user utilizes such equipment as the user terminal, and thus does not need to carry around the credit card that is bulky. In this settlement system, if the user terminal corresponds to the credit card in the conventional settlement system, the one-time password generated in the user terminal in this settlement system corresponds to the credit card number in the conventional settlement system. For the one-time password, different one-time passwords are generated one after another as is well known. Accordingly, even if the one-time password has been stolen by a malicious third party, it is difficult to abuse such a so-called disposable one-time password, and in addition, as will be described later, when an expiration time of the one-time password has been defined to be much shorter than the expiration time of an ordinary credit card (for example, within several months or several weeks, within on the order of several days to several tens of minutes, possibly on the order of 10 minutes, which, however, may be longer than this), such abuse becomes almost impossible. In other words, in this settlement system, the one-time password that is valid only at that time is used instead of the credit card number, and thereby the impersonation by the malicious third party is prevented.

Meanwhile, the settlement system according to the invention of the present application has a further advantage. In the conventional settlement system using the credit cards, it is widely known that a person stealing and abusing the credit card number may be a person in a position of being informed of the credit card number by the user, such as those who operate or manage a credit card reader. In other words, in the credit card settlement system, a person handling the credit card number himself may structurally become the malicious third party, and complete elimination thereof is impossible. In case of the abuse of the credit card number performed by such a person, the credit card company or the like that issues the credit cards performs credit management for a person operating or managing the credit card reader (or organization of corporation to which they belongs), and increases or decreases a fee in the case of the payment with the credit card, depending on the degree of his credit, and the like, which are very burdensome. However, according to the settlement system of the invention of the present application in which the abuse of the credit card number by the third party can hardly be assumed, the above credit management performed by the credit card company or the like is not required. In the above credit management, a person even without the credit, who is judged to be imbalanced with risks taken by the credit card company or the like, regardless of how much the fee is increased, is precluded from the credit management performed by the credit card company or the like, and cannot receive the payment with the credit card. This is reality today with popularization of the credit card settlement system. Unnecessary credit management for the recipient of the payment from the user in the settlement system using the credit cards, in which the credit card number is received from the user, means that the number of recipients of the payment from the user can be increased more than a conventional case, according to the settlement system of the invention of the present application. This naturally is a great advantage.

A general flow of processing in this settlement system is as follows.

First, the user inputs the upper limit amount information that is the information identifying the upper limit amount to be settled, with the user terminal input means. The upper limit amount information is transmitted from the user terminal to the settlement device, along with the user information that is the information identifying the user who performs the settlement according to the upper limit amount information.

This settlement device uses the user information and the upper limit amount information to perform user authentication and credit judgment with the credit determination unit. The user authentication performed here is performed with the user information. The user information may include, for example, at least one of a user ID inputted by the user with the user terminal input means, and unique terminal information allocated to each user terminal that is the user terminal, or may include both of them. Since the user ID is, for example, an enumeration of numbers, characters, symbols and the like decided by the user, and is basically only known to a legitimate user, even if the user terminal is stolen by the third party, the impersonation by the third party may be highly likely to be prevented. Examples of the terminal information can include, in the case where the user terminal is a smartphone, an ID number recorded in a SIM card (Subscriber Identity Module Card) incorporated in this smartphone, and an individual identification number such as a manufacturing number of the smartphone. If the terminal information is used for the user authentication, the impersonation by the malicious third party becomes likely to be prevented, unless the user terminal itself is stolen by the malicious third party. Of course, when both the user ID and the terminal information are used for the user authentication, the user authentication becomes precise, and the impersonation can also be prevented with a high possibility.

The credit determination itself performed in the credit determination unit can be performed similarly to the credit determination in the case of using the conventional credit card. If it is determined in the credit determination that the settlement can be performed, the temporary permission information indicating the determination is sent from the settlement device to the user terminal. However, depending on this method of executing the credit determination, the settlement system of the present application may be close to the settlement system with the credit cards or may be close to a settlement system with debit cards. This point will be described later.

In the user terminal, which has received the temporary permission information, the one-time password is generated in its user terminal OTP generation unit. The one-time password can be an enumeration of numbers, characters, symbols and the like, and is generated at least each time the user is authenticated by the settlement device, and also becomes different for each generation. Moreover, the sets of the one-time passwords generated in each user terminal are different if all the one-time passwords generated multiple number of times in each of user terminal are seen. The one-time password can be generated, for example, with a publicly known approach. The one-time password generated in the user terminal is passed to the settlement terminal with the settlement terminal input means of the settlement terminal.

The user terminal typically includes a display. The one-time password generated in the user terminal OTP generation unit is displayed, for example, on the display. If the one-time password is an enumeration of numbers, a numeric keypad or the like is provided as the settlement terminal input means, and thereby, the user or the administrator of the settlement terminal can operate the numeric keypad or the like to input the one-time password displayed on the display, to the settlement terminal. If the one-time password is a combination of numbers and characters, and the settlement terminal input means is a keyboard, the user or the administrator of the settlement terminal can operate the keyboard to input the one-time password displayed on the display, to the settlement terminal. A method of passing the one-time password to the settlement terminal is not limited thereto. For example, the one-time password can also be passed to the settlement terminal by taking an image of the display of the user terminal having the one-time password displayed thereon, with a camera as the settlement terminal input means, and inputting the one-time password displayed on the display to the settlement terminal through image processing, or by reading the one-time password displayed as a bar code on the display of the user terminal, with a bar-code reader as the settlement terminal input means. Alternatively, the one-time password can also be passed as data from the user terminal to the settlement terminal through wireless communication such as Bluetooth™ or infrared communication (of course, wired communication may be used but is somewhat inconvenient). It should be noted that, in this case, the one-time password is not necessarily required to be displayed on the display of the user terminal.

If the user performs the payment to the virtual store on the Internet, the user will input the one-time password to the user terminal, or to another terminal that is used by the user and is capable of communicating via the Internet. For the input in this case, while the numeric keypad or the keyboard included in the user terminal or the other terminal is typically used, it is self-evident that the camera, the bar-code reader, or the wireless communication may also be utilized in this input, similarly to the above-mentioned case.

Moreover, the amount information that is the information identifying the amount to be settled is passed from the user terminal to the settlement terminal. In the case of the brick-and-mortar store, one of specific examples thereof is that the user orally tells the amount to be paid with the one-time password at the brick-and-mortar store, to the administrator of the settlement terminal, and the administrator of the settlement terminal inputs the amount to the settlement terminal with the settlement terminal input means. Alternatively, the user may also send or input the amount information, which has been inputted to the user terminal by the user with the user terminal input means, to the settlement terminal with the camera or the bar-code reader, or wirelessly. In this case, the one-time password and the amount information may conveniently be sent or inputted collectively from the user terminal to the settlement terminal. In contrast, in the case of the virtual store, while the numeric keypad or the keyboard included in the user terminal or the other terminal is used in order for the user to pass the amount information to the virtual store, it may be self-evident that the camera, the bar-code reader, or the wireless communication may also be utilized in this input, similarly to the above-mentioned case.

In any case, the one-time password and the amount information passed from the user terminal to the settlement terminal are sent from the settlement terminal to the settlement device.

Meanwhile, the settlement device has the settlement device OTP generation unit. The settlement device OTP generation unit generates a one-time password identical to the one-time password which is generated in the user terminal. The settlement device OTP generation unit generates the one-time password at an appropriate timing that is the same time as the generation of the temporary permission information or later. Regarding the one-time password generated in the settlement device OTP generation unit, the one-time password and the upper limit amount information are recorded so as to be associated with each other such that the upper limit amount information becomes the virtual balance information, in the recording medium, the upper limit amount information having been used for generating the temporary permission information that has caused the generation of the one-time password in the settlement device OTP generation unit.

As is publicly known, the one-time password generated in the user terminal OTP generation unit and the one-time password generated in the settlement device OTP generation unit are synchronized. The settlement device performs settlements of many user terminals, so that the settlement device can generate the one-time password that is synchronized with the one-time password generated in the user terminal OTP generation unit of each user terminal.

When the one-time password is received from the settlement terminal, the final determination unit performs the final determination in the settlement device. The final determination is determination of whether or not the payment of the amount identified by the amount information, from the user to the administrator of the settlement terminal or the like, may be allowed. When the settlement device receives the one-time password and the amount information from the settlement terminal, the virtual balance information associated with the one-time password identical to the one-time password sent from the settlement terminal is read out from the recording medium, and on the condition that the amount identified by the amount information received from the settlement terminal is equal to or less than the amount identified by the virtual balance information, the final determination unit allows the above-mentioned payment. If the final determination unit has allowed the payment, the final determination unit subtracts the amount used for the payment, from the virtual balance information recorded so as to be associated with the one-time password used for the payment in the recording medium. The processing performed in the settlement device after the payment is permitted may, for example, be similar to the case of the settlement system using the credit cards or the debit cards.

According to this settlement system, as mentioned above, final permission of the settlement performed in the settlement device is performed with the one-time password generated in the user terminal.

The one-time password used in the user terminal will be generated over and over again to be changed. Accordingly, even when the one-time password has been stolen by the third party, damage is unlikely to occur therefrom, and even if the damage occurs, the damage is much smaller than the case of the settlement system using the credit cards.

In the invention of the present application, the user can use one one-time password to perform multiple payments within a range of the upper limit amount. When the user performs the payment, the user sends the one-time password and the amount information to the settlement device via the settlement terminal. Unless a sum of the amounts identified by the amount information exceeds the upper limit amount, the settlement device allows the payment from the user to the administrator of the settlement terminal, and subtracts the amount used for the payment, from the virtual balance in each case.

Moreover, even in a case where the one-time password has been generated once in the user terminal, and a one-time password identical to the one-time password has also been generated once in the settlement device, for example, if a balance has existed in virtual balance information when the expiration time of the one-time password has expired, the settlement device can also set the balance back to the user's credit balance or account balance at a bank or the like. Thereby, the user can lightheartedly use the user terminal to issue the one-time password.

It should be noted that, in the invention of the present application, the administrator of the settlement terminal is not limited to a person who manages the settlement terminal, but includes all of persons who install, own, take sole possession of or occupy, or manage and operate the settlement terminal, as well as the recipient of the payment from the user, and in any case, the administrator of the settlement terminal means an organization itself that receives the payment from the user, or a person who belongs to this organization or is at least associated with the organization.

Moreover, in the settlement system of the invention of the present application, communication between the settlement device and the user terminal and communication between the settlement device and the settlement terminal may be encrypted communication.

It should be noted that, if the other party to which the user performs the payment with the settlement system of the present application is specifically a brick-and-mortar store, and if the user is assumed to perform the payment to the other party after a certain amount of time elapses (for example, after several hours or several months elapse) since the generation of the one-time password with the user terminal, the one-time password generated in the user terminal may also be conveniently printed on paper. While the one-time password in the invention of the present application is data (or simple information) without physical substance, the one-time password has a property in which the data or the information can be used to perform the payment to the third party. If this property is emphasized more, the one-time password generated in the user terminal in the settlement system of the present application can be considered as an alternative to money. In consideration of a trend with FinTech-related technologies raised as topics in recent years, while money may eventually lose its substance, at least the ordinary people in a current state are familiar with money having the physical substance. The user can use a cash voucher that is paper having the one-time password printed thereon, as if it were money (paper money), to thereby perform the payment to the other party of the payment. In other words, this cash voucher can be said to be one of variations for delivering the one-time password from the user terminal to the settlement terminal. The recipient of the payment, who has received this cash voucher, can input the one-time password printed thereon to the settlement terminal through some method, for example, by using the numeric keypad or the keyboard to perform the input.

However, if this cash voucher has been dropped by the user or stolen by the third party, the cash voucher may be used by the third party, similarly to when conventional paper money has been dropped by the user or stolen by the third party. Nonetheless, since the cash voucher has an expiration time for use depending on a usable period provided for the one-time password, a risk of being used by the malicious third party can be said to be smaller than the conventional money. However, as another kind of problem, this cash voucher has a risk in that, if the one-time password printed thereon has been known to the third party, the one-time password is used by the third party while the cash voucher itself exists at hand of the user, and thus monetary value, which has been originally included in the cash voucher or the one-time password printed on the cash voucher, may be lost. It is the risk that is not caused in the conventional paper money. It is difficult for the user still having the cash voucher at hand to know that the one-time password printed on the cash voucher has been stolen by the third party, and thus, even if this problem has occurred, it is difficult to find and solve the problem. Accordingly, as a technology for preventing occurrence of such a situation, the inventor of the present application proposes a cash voucher having a part of the one-time password printed on one side of the paper, and a rest part of the one-time password printed on another side of the paper, respectively. With this cash voucher, if the malicious third party has attempted to steal the one-time password printed on the cash voucher, the malicious third party needs to see (or take pictures of) both sides of the cash voucher, and thus a possibility of the one-time password being stolen becomes much lower than a case of the one-time password printed only on one side of the paper.

Moreover, the inventor of the present application also proposes a cash voucher made by printing information for identifying the one-time password generated in the user terminal in the settlement system of the present application, on paper, as one aspect of the invention of the present application. This cash voucher can also be used by the user in an aspect similar to existing traditional money. The information for identifying the one-time password is, for example, a bar code. The other party, which has received this cash voucher from the user and should receive the payment from the user, can read and input the information (for example, the bar code) to the settlement terminal to thereby input the one-time password generated in the user terminal to the settlement terminal. This can also be said to be one of the variations for delivering the one-time password from the user terminal to the settlement terminal. As in a case of printing the one-time password itself on the cash voucher, information for identifying a part of the one-time password may be printed on one side of the paper, and information for identifying a rest part of the one-time password may be printed on another side of the paper, respectively.

Moreover, a face of a person scheduled to use the cash voucher may be printed on the paper constituting the above cash voucher. If a person who should receive the payment from the user has received the cash voucher, matching of the face printed on the cash voucher and the face of the user who has held out the cash voucher is checked, and if processing required for the settlement with the cash voucher (for example, the input of the one-time password described on the cash voucher, to the settlement terminal) is to be performed only when the check has been successful, fraudulent use of the one-time password (a fraudulent settlement) can be prevented even in the case where the cash voucher has been dropped or stolen by the third party.

In this settlement system, if the user has the one-time password issued in the user terminal, the user can use the one-time password to perform the payment of the amount identified by the amount information, with the upper limit of the upper limit amount set when the one-time password has been issued, and possibly, the payment may be split into multiple number of times. In other words, the user can present the amount information to the other party to thereby provide an indication of intention of performing the payment of the amount identified by the amount information, and can also present the one-time password to the other party to thereby perform the payment of the amount identified by the amount information.

This is possible because, when the one-time password has been generated in the user terminal, the credit has already been finished for the upper limit amount identified by the upper limit amount information indicated to the settlement device by the user when the one-time password has been issued. In that sense, the one-time password generated in the user terminal can also be regarded as a temporary credit card number with a defined upper limit of a payable amount.

Moreover, specifically, when the one-time password and the amount information are sent from the settlement terminal to the settlement device, if identity of the user who has generated the one-time password in the user's own user terminal and has sent the one-time password from the settlement terminal is not checked in the settlement device, this one-time password can be used by anyone. In this case, the one-time password becomes transferable, and a person who has been transferred the one-time password can use it. In this case, the one-time password generated in the user terminal can be regarded as virtual currency that can be used for the payment with the upper limit of the amount identified by the upper limit amount information. It should be noted that since the virtual currency in this case has been given the credit based on the user's trust, reception of money by the person who has been transferred the one-time password, for example, via the settlement device, is generally ensured. In this sense, if the one-time password in the invention of the present application is regarded as the virtual currency, this one-time password has higher reliability than conventional virtual currency.

This one-time password is convenient since the user can be enabled to generate the one-time password at the user's preferable timing when the user needs to perform the payment. Moreover, even if the user has generated the one-time password, the user does not need to use it soon, and can separately use it several times according to the user's wish when the user needs to use it, which is also convenient. Moreover, when the user generates the one-time password, the user can set the upper limit amount of the amount that can be paid with the one-time password, by himself. Thus, the user can prevent wasteful spending as long as the generated one-time password is used to perform the payment, and also, even if the one-time password has been stolen, an amount of economic damage thereof will be limited to the upper limit amount set for the one-time password. All of them are advantages of the invention of the present application.

For example, when the user goes on an overseas trip, the user can generate the one-time password for covering the payments during the overseas trip, with the user's own user terminal, and go on the overseas trip with the one-time password instead of cash or the credit card. Moreover, when the user has intended to go for shopping at a shopping mall, if the user generates the one-time password with the upper limit amount depending on a budget for the shopping on that day, and utilizes the one-time password to perform the payment for the shopping on that day, the user can stay within the budget during the shopping. Moreover, if the one-time password is transferable, for example, a father can also generate multiple one-time passwords in his own user terminal, and give them to his children, respectively, for example, as their spending money. In this case, of course, different upper limits can also be set to the amounts that can be paid with the respective one-time passwords, which can create a state similar to a state where different amounts of spending money have been given to the respective children.

The inventor of the present application also proposes the user terminal used in the settlement system as described above, as one aspect of the invention of the present application. An effect thereby obtained is the same as the effect obtained in the above-mentioned settlement system.

An example user terminal is a user terminal for constituting a settlement system which has the user terminal, a settlement device, and a settlement terminal configured to include the user terminal used by a user, comprising user terminal input means that accepts input of information, user terminal transmission and reception means that performs transmission and reception of data via a predetermined network, and user terminal information processing means that performs information processing; the settlement device that performs settlement of the user's payment, comprising settlement device transmission and reception means that performs transmission and reception of the data via the network, settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network.

In this user terminal, upper limit amount information that is information identifying an amount of an upper limit of the settlement, and amount information that is information identifying an amount to be settled are capable of being inputted with the user terminal input means; the upper limit amount information and user information that is information identifying the user who performs the payment of the amount identified by the upper limit amount information are transmitted to the settlement device via the network with the user terminal transmission and reception means; and moreover, the user terminal information processing means comprises a user terminal OTP generation unit that generates a one-time password.

The settlement device receives the upper limit amount information and the user information from the user terminal with the settlement device transmission and reception means; the settlement device information processing means comprises a credit determination unit that, if the settlement device transmission and reception means has received the upper limit amount information and the user information, executes credit determination that is determination of whether or not the settlement of the payment of the amount identified by the upper limit amount information for the user identified by the user information is possible, and if it is determined in the credit determination that the settlement is possible, generates temporary permission information that is information indicating the determination; the settlement device information processing means also comprises a final determination unit that performs final determination of the settlement, and a settlement device OTP generation unit that generates a one-time password identical to the one-time password which is generated in the user terminal if the temporary permission information has been generated; the settlement device transmission and reception means transmits the temporary permission information generated by the credit determination unit to the user terminal via the network; and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password in the settlement device OTP generation unit.

In addition, in this settlement system, when the temporary permission information is accepted from the settlement device by the user terminal at the user terminal transmission and reception means, the user terminal OTP generation unit generates the one-time password; and thereby, if the one-time password generated in the user terminal and the amount information have been inputted from the settlement terminal input means of the settlement terminal, and the settlement terminal has sent the one-time password and the amount information from the settlement terminal transmission and reception means to the settlement device via the network, the virtual balance information associated with a one-time password identical to the one-time password received from the settlement terminal by the settlement device is read out from the recording medium, and also on a condition that the amount identified by the amount information received from the settlement terminal is equal to or less than an amount identified by the virtual balance information, the final determination unit of the settlement device permits the payment from the user of the user terminal to an administrator of the settlement terminal with the one-time password, and also subtracts the amount used for the payment, from the virtual balance information recorded so as to be associated with the one-time password used for the payment in the recording medium.

The final determination unit included in the settlement device in the settlement system of the invention of the present application may permit the settlement only if a time from a predetermined time point after the user starts processing for inputting the upper limit amount information with the user terminal input means and before the final determination unit performs the final determination of the settlement, until the final determination unit performs the final determination of the settlement, is shorter than a predefined time interval.

This, in short, provides the expiration time for the one-time password generated in the user terminal. Thereby, the one-time password in the settlement system according to the invention of the present application becomes less likely to be fraudulently used.

The predetermined time point is a predetermined time point after the user starts the processing for inputting the upper limit amount information with the user terminal input means and before the final determination unit performs the final determination of the settlement, as mentioned above. "When the user has started the processing for inputting the upper limit amount information with the user terminal input means" means when the user has started some processing required for starting the input of the upper limit amount information, instead of when the user has started the input of the upper limit amount information itself. For example, if software necessary for this settlement needs to be launched in the user terminal in order to input the upper limit amount information, this time means when processing thereof has been performed.

The predetermined time point is, for example, a time point when the user has inputted the upper limit amount information that is the information identifying the amount of the upper limit of the settlement, with the user terminal input means (for example, a time point when the user has started the input, or has finished the input); a time point when the user terminal transmission and reception means has transmitted the upper limit amount information and the user information to the settlement device via the network; a time point when the settlement device transmission and reception means has received the upper limit amount information and the user information from the user terminal transmission and reception means; a time point when the credit determination unit of the settlement device has generated the temporary permission information; a time point when the temporary permission information has been transmitted from the settlement device transmission and reception means of the settlement device; and a time point when the temporary permission information has been received at the user terminal transmission and reception means of the user terminal.

The settlement device can process virtual balances unused for payments, in virtual balances associated with expired one-time passwords, as unused virtual balances. For example, the settlement device can refrain from charging a financial institution for parts of the virtual balances which are unused for the payments, or as will be described later, if the settlement device manages the user's deposit balance (for example, corresponding to a case where the user performs the payment to the administrator of the settlement device in a prepaid manner, and the like), the settlement device can execute processing of returning the virtual balances unused for the payments, to the deposit balance.

In the settlement system of the invention of the present application, the user terminal input means may be capable of, with an operation thereof, inputting an additional condition that is a condition added in order for the final determination unit of the settlement device to permit the payment from the user of the user terminal to the administrator of the settlement terminal, and the user terminal transmission and reception means may send the additional condition to the settlement device via the network, and when the settlement device transmission and reception means accepts the additional condition, the final determination unit may add a condition for permitting the payment from the user of the user terminal to the administrator of the settlement terminal, depending on the additional condition.

In this way, the user can set conditions regarding the payment performed with the one-time password generated in the user terminal, based on the user's wish.

Examples of the additional condition are as follows.

The additional condition may be a restriction of a period in which the payment is permitted. As mentioned above, for the one-time password in the settlement system of the present application, the period in which the payment is permitted, and which is defined on the side of the settlement device, more precisely, determined by the final determination unit of the settlement device, may be provided. Meanwhile, it is more convenient and the one-time password can be less likely to be fraudulently used if a shorter time limit of the payment can be set, or a starting point and an ending point of a time in which the payment can be performed can be set on the side of the user terminal. If the period in which the payment is permitted, and which is determined by the final determination unit of the settlement device, does not exist, a larger benefit is provided from the user terminal capable of restricting the period in which the payment with the one-time password is permitted.

The additional condition may be a restriction of a position of the settlement terminal that receives the payment. For example, if the payment is allowed only for settlement terminals that exist in one area or exist close to the user terminal, among the settlement terminals, the user can perform the payment with the one-time password to the user's desired store or the like, with a lower possibility of the fraudulent use of the one-time password.

When the additional condition is a restriction of a position of the settlement terminal that receives the payment, the user terminal in the settlement system of the invention of the present application comprises position information generation means that generates position information that is information for identifying a position where the user terminal exists, and the user terminal transmission and reception means may transmit the position information to the settlement device. In this case, only if a position of the settlement terminal that has sent the one-time password from the user terminal with the settlement terminal transmission and reception means thereof is within a predetermined distance from the position identified by the position information generated in the position information generation means of the user terminal, the final determination unit of the settlement device may permit the payment from the user of the user terminal to the administrator of the settlement terminal with the one-time password. This settlement system is particularly useful in the case where the settlement terminal exists in the brick-and-mortar store, but is not limited thereto. In this settlement system, unless the user terminal and the position of the settlement terminal to which the one-time password is passed from the user terminal are within the predetermined distance, the final determination unit of the settlement device does not perform the permission of the settlement. Thereby, fear of the impersonation performed by the third party can further be reduced.

A timing of the transmission of the position information from the user terminal to the settlement device can be decided separately from a timing of the transmission of the upper limit amount information and the user ID to the settlement device. For example, the user terminal transmission and reception means may transmit the position information along with the upper limit amount information and the user information to the settlement device. Alternatively, at a predetermined timing after the user terminal has received the temporary permission information, the user terminal may send the position information to the settlement device.

The position information generation means is, for example, a GPS (Global Positioning System). Since functions of the GPS have typically already been integrated in the smartphone or the like as an example of the user terminal, use of the GPS as the position information generation means is less burdensome as far as hardware is concerned.

As mentioned above, the final determination unit determines whether or not the position of the settlement terminal that has sent the one-time password from the user terminal is within the predetermined distance from the position identified by the position information on the user terminal. In order to perform this determination, the final determination unit needs to know the position of the settlement terminal. In order to enable it, there are some approaches as follows.

The first one of the approaches is that the settlement device has previously grasped the position of the settlement terminal that may send the one-time password to the settlement device. For example, if the settlement device has a database in which a settlement terminal ID for identifying each settlement terminal and the position of each settlement terminal are linked and recorded, the settlement device can grasp which settlement terminal the one-time password has been sent from, to thereby grasp the position of the settlement terminal that has sent the one-time password.

The second one of the approaches is that the settlement terminal has been caused to have position information generation means similar to the position information generation means included in the user terminal, and the position information on the settlement terminal is sent from the settlement terminal to the settlement device each time the settlement terminal sends the one-time password to the settlement device (regardless of whether or not the position information on the settlement terminal is sent at the same time as the sending of the one-time password). Thereby, the settlement device can also grasp the position of the settlement terminal that has sent the one-time password.

The additional condition may be a restriction of the settlement terminal that receives the payment. For example, if the settlement terminals that receive the payment are restricted only to settlement terminals that exist within one shopping mall, or to settlement terminals managed by an enterprise belonging to one enterprise group, the user can perform the payment with the one-time password to the user's desired store or the like, with the lower possibility of the fraudulent use of the one-time password.

The user terminal input means may be capable of inputting an upper limit amount identified by the upper limit amount information as a sum of split amounts that are two or more amounts; and if the user terminal OTP generation unit generates the one-time password, the user terminal OTP generation unit may generate as many one-time passwords as a number of pieces of split amount information that is information identifying the split amounts, corresponding to the respective pieces of the split amount information.

In this case, if the settlement device OTP generation unit in the settlement device generates the one-time password identical to the one-time password which is generated in the user terminal, the settlement device OTP generation unit may generate as many one-time passwords identical to those generated in the user terminal, as the number of pieces of the split amount information, corresponding to the respective pieces of the split amount information; and in the recording medium, the one-time passwords and the split amount information made to correspond to the one-time passwords may be recorded so as to be associated with each other such that each piece of the upper limit amount information becomes the virtual balance information.

If the one-time password made to correspond to one piece of the split amount information generated in the user terminal and the amount information have been inputted from the settlement terminal input means of the settlement terminal, and the settlement terminal has sent the one-time password and the amount information from the settlement terminal transmission and reception means to the settlement device via the network, the virtual balance information associated with the one-time password identical to the one-time password received from the settlement terminal by the settlement device may be read out from the recording medium, and also on the condition that the amount identified by the amount information received from the settlement terminal is equal to or less than the amount identified by the virtual balance information, the final determination unit of the settlement device may permit the payment from the user of the user terminal to the administrator of the settlement terminal with the one-time password, and also subtract the amount used for the payment, from the virtual balance information recorded so as to be associated with the one-time password used for the payment in the recording medium.

In the settlement system of the invention of the present application, multiple one-time passwords may be generated from one user terminal. Moreover, all of the multiple one-time passwords generated from one user terminal may be valid, in other words, may be in a state of being capable of being used for the payments. If the multiple one-time passwords are generated, the user may also be caused to perform a procedure of generating the one-time password, including the input of the upper limit amount information, multiple times, which, however, will place a burden on the user. For example, if the user hopes to have three one-time passwords with the upper limit amount of 10000 yen, the user is caused to input three 10000 yen as the split amount information, and as a result, caused to input the upper limit amount information for 30000 yen, and thereby, the user can collectively obtain three one-time passwords with the upper limit amount of 10000 yen. The respective split amounts are not required to be the same. For example, if the user causes the settlement device to perform the credit determination with the respective split amounts of one 10000 yen+two 5000 yen+ten 1000 yen, and with the upper limit amount of 30000 yen as a sum of them, of course, on a condition that the temporary permission information is generated in the credit determination, the user will collectively obtain one one-time password with the upper limit amount of 10000 yen, two one-time passwords with the upper limit amount of 5000 yen, and ten one-time passwords with the upper limit amount of 1000 yen.

In this case, the settlement device allocates virtual balances with the split amounts as the upper limit amounts, to the multiple one-time passwords, respectively, and records them in the recording medium. Handling of the respective virtual balances may be the same as the case where only one one-time password is generated at a time.

The split amount information may be selected from predefined split amount information with an operation of the user terminal input means. For example, in the above-mentioned example, 10000 yen, 5000 yen, and 1000 yen have previously been prepared as selectable split amounts such that the user is caused to select how to combine them.

The inventor of the present application also proposes the following method executed by the user terminal, as one aspect of the invention of the present application. An effect thereby obtained is the same as the effect obtained in the above-mentioned settlement system.

An example of the method is a method executed by user terminal information processing means included in a user terminal for constituting a settlement system which has the user terminal, a settlement device, and a settlement terminal configured to include the user terminal used by a user, comprising user terminal input means that accepts input of information, user terminal transmission and reception means that performs transmission and reception of data via a predetermined network, and the user terminal information processing means that performs information processing; the settlement device that performs settlement of the user's payment, comprising settlement device transmission and reception means that performs transmission and reception of the data via the network, and settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network.

This method is executed by the user terminal information processing means.

Specifically, this method includes a process of accepting input of upper limit amount information that is information identifying an upper limit amount to be settled, with the user terminal input means; a process of transmitting the upper limit amount information and user information that is information identifying the user who performs the payment of the upper limit amount identified by the upper limit amount information, to the settlement device via the network with the user terminal transmission and reception means; a process of, if, in the settlement device that has received the upper limit amount information and the user information from the user terminal with the settlement device transmission and reception means, the settlement device information processing means has executed credit determination that is determination of whether or not the settlement of the payment of the amount identified by the upper limit amount information sent from the user terminal is possible, and in a case where it has been determined in the credit determination that the settlement is possible, the settlement device information processing means has generated temporary permission information that is information indicating the determination, and has also generated a one-time password in a case where the temporary permission information has been generated, and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password, and the settlement device transmission and reception means has transmitted the temporary permission information to the user terminal via the network, accepting the temporary permission information by the user terminal transmission and reception means; and a process of, if the temporary permission information has been accepted from the settlement device by the user terminal, generating a one-time password identical to the one-time password which is generated in the settlement device. The processes are executed by the user terminal information processing means.

Thereby, in this settlement system, if the one-time password generated in the user terminal and amount information that is information identifying an amount to be settled have been inputted from the settlement terminal input means of the settlement terminal, and the settlement terminal has sent the one-time password from the settlement terminal transmission and reception means to the settlement device via the network, the virtual balance information associated with a one-time password identical to the one-time password received from the settlement terminal by the settlement device is read out from the recording medium, and moreover, on a condition that the amount identified by the amount information received from the settlement terminal is equal to or less than an amount identified by the virtual balance information, the settlement device information processing means of the settlement device permits the payment from the user of the user terminal to an administrator of the settlement terminal with the one-time password, and also subtracts the amount used for the payment, from the virtual balance information recorded so as to be associated with the one-time password used for the payment in the recording medium.

The inventor of the present application also proposes a computer program for causing a predetermined computer to function as the user terminal included in the settlement system of the invention of the present application, as one aspect of the invention of the present application. An effect thereby obtained is the same as the effect obtained in the above-mentioned settlement system.

An example of the computer program is a computer program for causing a computer to function as a user terminal for constituting a settlement system which has the user terminal, a settlement device, and a settlement terminal configured to include the user terminal used by a user, comprising user terminal input means that accepts input of information, user terminal transmission and reception means that performs transmission and reception of data via a predetermined network, and user terminal information processing means that performs information processing; the settlement device that performs settlement of the user's payment, comprising settlement device transmission and reception means that performs transmission and reception of the data via the network, and settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network.

In addition, this computer program causes the computer to execute a process of accepting input of upper limit amount information that is information identifying an upper limit amount to be settled, with the user terminal input means; a process of transmitting the upper limit amount information and user information that is information identifying the user who performs the payment of the upper limit amount identified by upper limit the amount information, to the settlement device via the network with the user terminal transmission and reception means; a process of, if, in the settlement device that has received the upper limit amount information and the user information from the user terminal with the settlement device transmission and reception means, the settlement device information processing means has executed credit determination that is determination of whether or not the settlement of the payment of the amount identified by the upper limit amount information sent from the user terminal is possible, and in a case where it has been determined in the credit determination that the settlement is possible, the settlement device information processing means has generated temporary permission information that is information indicating the determination, and has also generated a one-time password in a case where the temporary permission information has been generated, and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password, and the settlement device transmission and reception means has transmitted the temporary permission information to the user terminal via the network, accepting the temporary permission information by the user terminal transmission and reception means; and a process of, if the temporary permission information has been accepted from the settlement device by the user terminal, generating a one-time password identical to the one-time password which is generated in the settlement device.

Thereby, in this settlement system, if the one-time password generated in the user terminal and amount information that is information identifying an amount to be settled have been inputted from the settlement terminal input means of the settlement terminal, and the settlement terminal has sent the one-time password from the settlement terminal transmission and reception means to the settlement device via the network, the virtual balance information associated with a one-time password identical to the one-time password received from the settlement terminal by the settlement device is read out from the recording medium, and moreover, on a condition that the amount identified by the amount information received from the settlement terminal is equal to or less than an amount identified by the virtual balance information, the settlement device information processing means of the settlement device permits the payment from the user of the user terminal to an administrator of the settlement terminal with the one-time password, and also subtracts the amount used for the payment, from the virtual balance information recorded so as to be associated with the one-time password used for the payment in the recording medium.

The inventor of the present application also proposes the settlement device used in the settlement system as described above, as one aspect of the invention of the present application. An effect thereby obtained is the same as the effect obtained in the above-mentioned settlement system.

An example of the settlement device is a settlement device for constituting a settlement system which has a user terminal, the settlement device, and a settlement terminal configured to include the user terminal used by a user, comprising user terminal input means that accepts input of information, user terminal transmission and reception means that performs transmission and reception of data via a predetermined network, and user terminal information processing means that performs information processing; the settlement device that performs settlement of the user's payment, comprising settlement device transmission and reception means that performs transmission and reception of the data via the network, and settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network.

The user terminal included in the settlement system including this settlement device is capable of inputting upper limit amount information that is information identifying an amount of an upper limit of the settlement, and amount information that is information identifying an amount to be settled, with the user terminal input means, and transmits the upper limit amount information and user information that is information identifying the user who performs the payment of the amount identified by upper limit the amount information, to the settlement device via the network with the user terminal transmission and reception means; and moreover, the user terminal information processing means comprises a user terminal OTP generation unit that generates a one-time password.

In addition, this settlement device receives the upper limit amount information and the user information from the user terminal with the settlement device transmission and reception means; the settlement device information processing means comprises a credit determination unit that, if the settlement device transmission and reception means has received the upper limit amount information and the user information, executes credit determination that is determination of whether or not the settlement of the payment of the amount identified by the upper limit amount information sent from the user terminal is possible, and if it is determined in the credit determination that the settlement is possible, generates temporary permission information that is information indicating the determination; the settlement device information processing means also comprises a final determination unit that performs final determination of the settlement, and a settlement device OTP generation unit that generates the one-time password identical to the one-time password which is generated in the user terminal if the temporary permission information has been generated; and the settlement device transmission and reception means transmits the temporary permission information generated by the credit determination unit to the user terminal via the network; and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password in the settlement device OTP generation unit.

In addition, in this settlement system, when the temporary permission information is accepted from the settlement device by the user terminal at the user terminal transmission and reception means, the user terminal OTP generation unit generates the one-time password; and if the one-time password generated and the amount information in the user terminal have been inputted from the settlement terminal input means of the settlement terminal, and the settlement terminal has sent the one-time password from the settlement terminal transmission and reception means to the settlement device via the network, the virtual balance information associated with a one-time password identical to the one-time password received from the settlement terminal by the settlement device is read out from the recording medium, and also on a condition that the amount identified by the amount information received from the settlement terminal is equal to or less than an amount identified by the virtual balance information, the final determination unit of the settlement device permits the settlement of the payment from the user of the user terminal to an administrator of the settlement terminal with the one-time password, and also subtracts the amount used for the payment, from the virtual balance information recorded so as to be associated with the one-time password used for the payment in the recording medium.

The user terminal input means of the user terminal may be capable of inputting user terminal cancellation information for identifying and canceling one of settlements performed in the past with the user terminal, after the final determination unit of the settlement device has permitted the settlement, and moreover, the user terminal transmission and reception means may send the user terminal cancellation information to the settlement device via the network. In this case, the settlement device information processing means of the settlement device may comprise cancellation means that, when the user terminal cancellation information has been accepted, cancels the settlement identified by the user terminal cancellation information.

In this way, the user can cancel the settlement that has already been allowed, on the user's own will, and for example, correction is enabled when there has been an error in the settlement.

A similar effect can also be obtained by the following invention.

The settlement terminal input means of the settlement terminal may be capable of inputting settlement terminal cancellation information for identifying and canceling one of settlements performed in the past with the settlement terminal, after the final determination unit of the settlement device has permitted the settlement, and moreover, the settlement terminal transmission and reception means may send the settlement terminal cancellation information to the settlement device via the network. In this case, the settlement device information processing means may comprise cancellation means that, when the settlement terminal cancellation information has been accepted, cancels the settlement identified by the settlement terminal cancellation information.

In this case, the administrator of the settlement terminal can cancel the settlement that has already been allowed, on the administrator's own will.

The user terminal cancellation information may also be sent from the user terminal similarly to the above-mentioned case, and the settlement terminal cancellation information may also be sent from the settlement terminal, also similarly to the above-mentioned case, respectively, to the settlement terminal. In this case, the cancellation means may cancel the settlement when the user terminal cancellation information and the settlement terminal cancellation information have been accepted and the settlements identified by the user terminal cancellation information and the settlement terminal cancellation information have matched each other.

In this case, the settlement that has already been allowed can be canceled only if the will of the administrator of the settlement terminal has matched the will of the user having the user terminal.

It should be noted that, in any case of the above three cases, a time in which the cancel of the settlement can be allowed can be limited. For example, an example is that the cancel of the settlement is enabled within 10 minutes since the settlement has been allowed in the settlement device.

The above function of enabling the cancel of the settlement is particularly useful in the case as follows. As mentioned above, the one-time password in the invention of the present application, which is used like the credit card number in the conventional credit card, that is, so-called disposable, and thus a possibility of plagiarism thereof is very low. However, for example, an unknown person may steal a glance at the one-time password displayed by the user on the display or the like of the user's own user terminal such as the smartphone, and a third party who has known the one-time password may send the one-time password, for example, from a settlement terminal at one store to the settlement device, before the user uses the one-time password for the user's own payment, that is, before the user sends the one-time password from a settlement terminal at another store to the settlement device. In the settlement device of the invention of the present application, basically, if the temporary permission information is generated, the authentication of an authentic user is performed, while if the settlement is performed with the one-time password sent from the settlement terminal, it is not necessarily required to check whether or not the authentic user has passed the one-time password to the administrator of the settlement terminal. Accordingly, if a malicious third party, who has stolen a glance at the one-time password displayed on the user terminal of the legitimate user, has used the one-time password before the legitimate user, the settlement device may not be able to find out such fraud.

In order to prevent such fraud, when the final determination unit of the settlement device has not permitted the settlement, the final determination unit generates non-permission information that identifies which settlement has not been permitted and indicates that the settlement has not been permitted, and sends the non-permission information to the settlement device transmission and reception means; and the settlement device transmission and reception means may transmit the non-permission information to the settlement terminal via the network. In this case, the settlement terminal that has accepted the non-permission information may notify an administrator of the settlement terminal of which settlement has not been permitted. In the settlement system having the settlement device and the settlement terminal as above, the administrator of the settlement terminal can know whether or not the settlement has been successful with the one-time password, which the person has received from the user and sent from the settlement terminal to the settlement device, for example, according to content displayed on the display of the settlement terminal based on the non-permission information. If the administrator of the settlement device has, for example, orally informed the user thereof, the user may operate the user's own user terminal to cause the user terminal to generate the above-mentioned user terminal cancellation information, and send the user terminal cancellation information to the settlement device. Thereby, the settlement allowed in the settlement device with the one-time password fraudulently known to the third party can be canceled.

It should be noted that, in this case, the settlement device may transmit the non-permission information only to the settlement terminal as the other party. It is because, in the settlement system of the invention of the present application, the fraudulent use of the one-time password by the third party occurs only if the third party has used the one-time password generated by the legitimate user in the user's own user terminal, before the legitimate user, and the settlement with the one-time password used by the malicious third party before the legitimate user is allowed in the settlement device. In other words, even if the one-time password has been used by the malicious third party, the settlement with the one-time password has been successful, in terms of whether or not the settlement has been successful, and thus the non-permission information cannot be sent to the user terminal at all. Accordingly, the settlement device may send the non-permission information only to the settlement terminal. However, in addition to sending the non-permission information to the settlement terminal, the settlement device may send the non-permission information, or information indicating that the identical one-time password has been used twice (that is, information indicating that the one-time password has been fraudulently used) to the user terminal.

The above processing may simply be processing, by the settlement device, of notifying the settlement terminal, and possibly the user terminal, of whether or not the settlement has been successful with the one-time password sent from the settlement terminal. If the administrator of the settlement terminal has known that the settlement has been permitted, according to content of the notification, the administrator of the settlement terminal may inform the user thereof, that is, of the completion of the payment. This is not different at all from the case of performing the payment by the user in the settlement system using the credit card. In contrast, if the administrator of the settlement terminal has known that the settlement has not been permitted, according to the content of the notification, the administrator of the settlement terminal may inform the user thereof, and prompt the user to cancel the settlement and to generate the one-time password again. While this is a somewhat different procedure from the case of performing the payment by the user in the settlement system using the credit card, this procedure itself further increases certainty of the settlement by the settlement system of the present application.

As mentioned above, the credit determination unit of the settlement device performs the credit determination of whether or not the user can perform the payment with the upper limit amount identified by the upper limit amount information sent by the user from the user terminal. This credit determination may be performed based on the user's occupation, place of employment, annual income, asset situation, and the like, similarly to the case of the credit card or the like.

In contrast, more easily, the credit determination may be performed by comparing the user's deposit balance to the upper limit amount.

In this case, for example, each user's deposit balance may be recorded in the recording medium. In that case, the credit determination unit may perform the credit determination by determining whether or not the amount identified by the upper limit amount information is equal to or less than the user's deposit balance, and generate the temporary permission information on a condition that the amount identified by the upper limit amount information is equal to or less than the user's deposit balance. When such credit determination is performed, since it is ensured that the user has the deposit equal to larger than the upper limit amount, that is, the user can perform the payment of the upper limit amount, there is no possibility of failure to receive money corresponding to the payment by a person who has received the payment with the one-time password generated in the user terminal.

Moreover, as mentioned above, each user's deposit balance may be recorded in the recording medium. In the settlement device in that case, if the temporary permission information has been generated, the upper limit amount information that has caused the generation of the temporary permission information may be subtracted from the deposit balance of the user who has sent the upper limit amount information that has caused the generation of the temporary permission information. This can be employed regardless of whether or not to use the deposit balance in the credit determination. If the user's deposit balance is reduced, and for example, money for the reduction is once moved to an account of the administrator of the settlement device once, or the like, the one-time password issued in the user terminal is put into a state that is not different from a state with security of money of an amount subtracted from the user's deposit balance, and can be regarded as the money itself in a way. This can also be said to be just the same as conversion of a part of the user's deposit balance into virtual currency called "one-time password."

It should be noted that a state where the user's deposit balance is recorded in the recording medium of the settlement device is a state where the administrator of the settlement device manages at least one deposit account of the user. Such a state can be realized, for example, if the user has previously paid some money to the administrator of the settlement device, that is, if a so-called prepaid system has been employed. Otherwise, if the administrator of the settlement device is a bank or the like that performs deposit management as its business, or also if the administrator of the settlement device is in cooperation with the bank or the like, the user's deposit balance may be recorded in the recording medium of the settlement device.

The inventor of the present application also proposes the following method executed by the settlement device, as one aspect of the invention of the present application. An effect thereby obtained is the same as the effect obtained in the above-mentioned settlement system.

An example of the method is a method executed by settlement device information processing means included in a settlement device for constituting a settlement system which has a user terminal, the settlement device, and a settlement terminal configured to include the user terminal used by a user, comprising user terminal input means that accepts input of information, user terminal transmission and reception means that performs transmission and reception of data via a predetermined network, and user terminal information processing means that performs information processing; the settlement device that performs settlement of the user's payment, comprising settlement device transmission and reception means that performs transmission and reception of the data via the network, and the settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network.

This method is executed by the settlement device information processing means.

Specifically, this method includes, in the settlement device information processing means: a process of, after upper limit amount information that is information identifying an amount of an upper limit of the settlement has been inputted with the user terminal input means in the user terminal, when the upper limit amount information and user information that is information identifying the user who performs the payment of the amount identified by the upper limit amount information have been transmitted to the settlement device via the network with the user terminal transmission and reception means, receiving the upper limit amount information and the user information from the user terminal with the settlement device transmission and reception means; a process of, if the settlement device transmission and reception means has received the upper limit amount information and the user information, executing credit determination that is determination of whether or not the settlement of the payment of the amount identified by the upper limit amount information for the user identified by the user information is possible, and if it is determined in the credit determination that the settlement is possible, generating temporary permission information that is information indicating the determination; a process of generating a one-time password if the temporary permission information has been generated; a process of recording, in the recording medium, the one-time password and upper limit amount information so as to be associated with each other such that the upper limit amount information becomes the virtual balance information, the upper limit amount information having been used for generating the temporary permission information that has caused the generation of the one-time password; a process of transmitting the generated temporary permission information to the user terminal via the network, with the settlement device transmission and reception means; a process of, if, in the user terminal that has accepted the temporary permission information at the user terminal transmission and reception means from the settlement device, a one-time password that has been generated by the user terminal information processing means and is identical to that generated in the settlement device, and the amount information have been inputted from the settlement terminal input means of the settlement terminal, and the settlement terminal has sent the one-time password and the amount information from the settlement terminal transmission and reception means to the settlement device via the network, receiving the one-time password and the amount information at the settlement device transmission and reception means; and a process of reading out the virtual balance information associated with a one-time password identical to the one-time password received from the settlement terminal by the settlement device, from the recording medium, and on a condition that the amount identified by the amount information received from the settlement terminal is equal to or less than an amount identified by the virtual balance information, settling the payment from the user of the user terminal to an administrator of the settlement terminal with the one-time password, and also subtracting the amount used for the payment, from the virtual balance information recorded so as to be associated with the one-time password used for the payment in the recording medium.

The inventor of the present application also proposes a computer program for causing a predetermined computer to function as the settlement device included in the settlement system of the invention of the present application, as one aspect of the invention of the present application. An effect thereby obtained is the same as the effect obtained in the above-mentioned settlement system.

An example of the computer program is a computer program for causing a computer to function as a settlement device for constituting a settlement system which has a user terminal, the settlement device, and a settlement terminal configured to include the user terminal used by a user, comprising user terminal input means that accepts input of information, user terminal transmission and reception means that performs transmission and reception of data via a predetermined network, and user terminal information processing means that performs information processing; the settlement device that performs settlement of the user's payment, comprising settlement device transmission and reception means that performs transmission and reception of the data via the network, and settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network.

In addition, this computer program causes the computer to execute a process of, after upper limit amount information that is information identifying an upper limit amount to be settled has been inputted with the user terminal input means in the user terminal, when the upper limit amount information and user information that is information identifying the user who performs the payment of the upper limit amount identified by the upper limit amount information have been transmitted to the settlement device via the network with the user terminal transmission and reception means, receiving the upper limit amount information and the user information from the user terminal with the settlement device transmission and reception means; a process of, if the settlement device transmission and reception means has received the upper limit amount information and the user information, executing credit determination that is determination of whether or not the settlement of the payment of the amount identified by the amount information for the user identified by the user information is possible, and if it is determined in the credit determination that the settlement is possible, generating temporary permission information that is information indicating the determination and has also generated a one-time password in a case where the temporary permission information has been generated, and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password; a process of transmitting the generated temporary permission information to the user terminal via the network with the settlement device transmission and reception means; a process of, if, in the user terminal that has accepted the temporary permission information at the user terminal transmission and reception means from the settlement device, the one-time password identical to the one-time password which is generated in the settlement device generated by the user terminal information processing means and the amount information have been inputted from the settlement terminal input means of the settlement terminal, and the settlement terminal has sent the one-time password from the settlement terminal transmission and reception means to the settlement device via the network, the virtual balance information associated with a one-time password identical to the one-time password received from the settlement terminal by the settlement device is read out from the recording medium, and moreover, on a condition that the amount identified by the amount information received from the settlement terminal is equal to or less than an amount identified by the virtual balance information; and a process of, on a condition that the amount identified by the amount information received from the settlement terminal is equal to or less than an amount identified by the virtual balance information, settling the payment from the user of the user terminal to an administrator of the settlement terminal with the one-time password, and also subtracts the amount used for the payment, from the virtual balance information recorded so as to be associated with the one-time password used for the payment in the recording medium.

BRIEF DESCRIPTION OF DRAWINGS

FIG. 7 is a diagram illustrating an example of data recorded in a credit information recording unit as illustrated in FIG. 6;

FIG. 8 is a diagram illustrating an example of data recorded in a settlement terminal information recording unit as illustrated in FIG. 6;

FIG. 9 is a diagram illustrating an example of data recorded in an OTP information recording unit as illustrated in FIG. 6;

FIG. 10 is a diagram illustrating an example of data recorded in a virtual balance recording unit as illustrated in FIG. 6;

FIG. 13 is a diagram illustrating an example of images displayed on a display of the user terminal included in the settlement system as illustrated in FIG. 1;

FIG. 15 is a diagram illustrating another example of the images displayed on the display of the user terminal included in the settlement system as illustrated in FIG. 1;

FIG. 16 is a diagram illustrating another example of the images displayed on the display of the user terminal included in the settlement system as illustrated in FIG. 1;

FIG. 17 is a diagram illustrating another example of the images displayed on the display of the user terminal included in the settlement system as illustrated in FIG. 1;

FIG. 18 is a diagram illustrating another example of the images displayed on the display of the user terminal included in the settlement system as illustrated in FIG. 1;

FIG. 19 is a diagram illustrating an example of images displayed on a display of the settlement terminal included in the settlement system as illustrated in FIG. 1;

FIG. 21 is a diagram illustrating an example of the image displayed on the display of the user terminal when the settlement is canceled in the settlement system as illustrated in FIG. 1;

FIG. 22 is a diagram illustrating an example of data recorded in a credit information recording unit in a variation;

FIG. 23 is a diagram illustrating an example of a cash voucher used in the first embodiment; and FIG. 24 is a diagram illustrating another example of the cash voucher used in the first embodiment.

DESCRIPTION OF EMBODIMENTS

Figure 1:
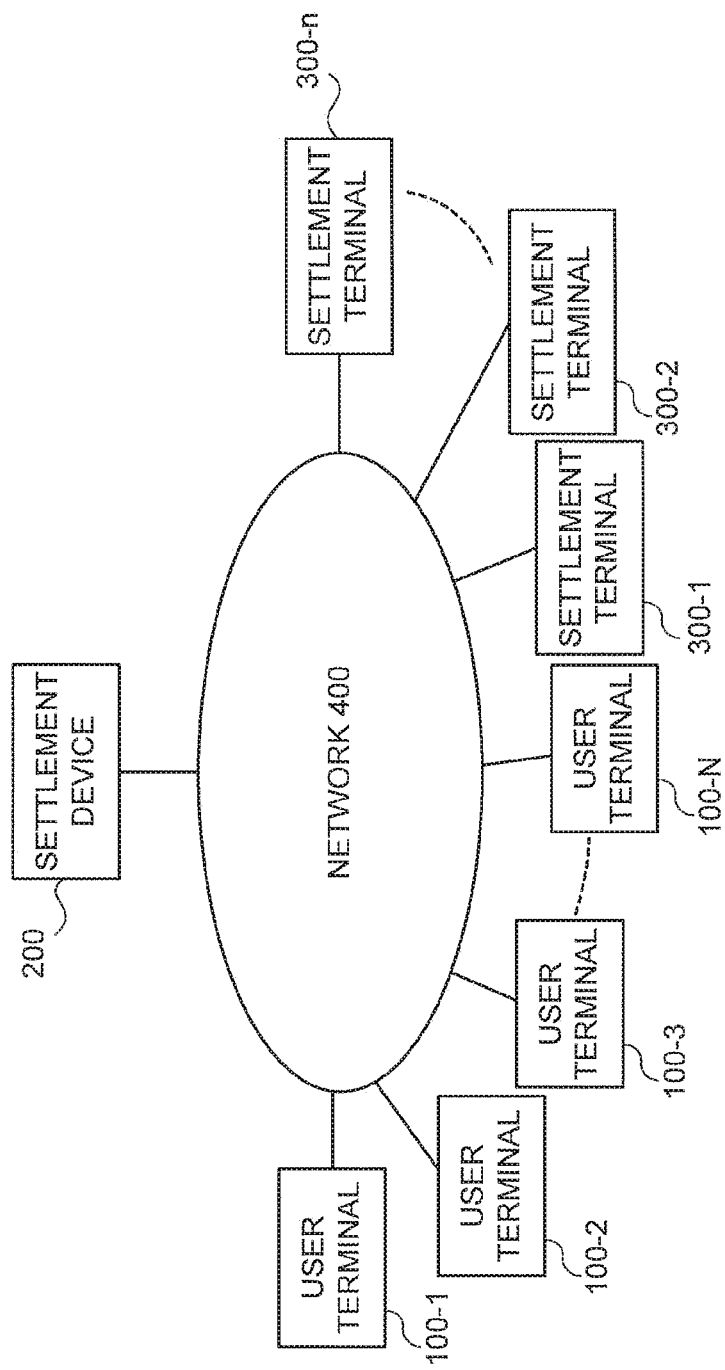
FIG. 1 is a diagram illustrating an entire configuration of a settlement system according to a first embodiment.

First and second embodiments of the present invention will be described below. In the description of each embodiment and a variation, the same reference characters shall be given to the same objects, and redundant description shall be omitted in some cases.

First Embodiment

An entire configuration of a settlement system of the first embodiment is schematically illustrated in FIG. 1.

The settlement system is configured to include multiple user terminals 100-1 to 100-N (which may also hereinafter simply be described as "user terminal 100."), a settlement device 200, and settlement terminals 300-1 to 300-*n* (which may also hereinafter simply be described as "settlement terminal 300."). These are all connectable to a network 400.

The network 400 is the Internet in this embodiment, but is not limited thereto.

The user terminal 100 corresponds to a user terminal in the present application, and includes a computer. More specifically, the user terminal 100 in this embodiment is configured with a general-purpose personal computer. In this embodiment, while the description is provided assuming that each user owns each one user terminal 100, one user may own multiple user terminals 100. In an example of a settlement system using credit cards, it is such a case where one user owns multiple credit cards. However, for example, through installation of multiple different computer programs (this will be described later) distributed by administrators of different settlement devices 200, in one user terminal 100, or the like, the user can also own only one user terminal 100 so that the user can perform settlements at multiple settlement devices 200, with one user terminal 100. This is a state similar to a state where the user possesses multiple credit cards in a conventional settlement system using credit cards. However, according to the invention of the present application, the user does not need to possess multiple credit cards that are physically bulky.

A configuration of the user terminal 100 will be described next. Each of the user terminals 100-1 to 100-N has the same configuration in connection with the invention of the present application.

The user terminal 100 is a mobile phone, a smartphone, a tablet, a notebook personal computer, a desktop personal computer, or the like. Among them, particularly, the smartphone or the tablet is preferred to be used as the user terminal 100, given that the smartphone or the tablet is portable and is suitable for installation of programs to be described later. The smartphone is, for example, iPhone™ that is manufactured and sold by Apple Japan, Inc. An example of the tablet is iPAD™ that is manufactured and sold by Apple Japan, Inc. Hereinafter, the description continues assuming that the user terminal is the smartphone, but is not limited thereto.

Figure 2:
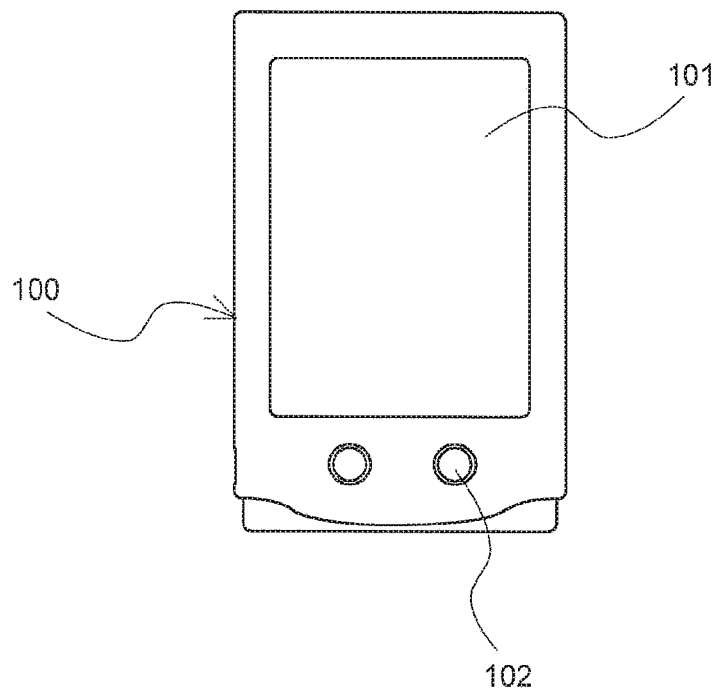
FIG. 2 is a diagram illustrating appearance of a user terminal included in the settlement system as illustrated in FIG. 1.

An example of appearance of the user terminal 100 is illustrated in FIG. 2.

The user terminal 100 includes a display 101. The display 101 is for displaying still images or moving images, and a publicly known or well-known display can be used. The display 101 is, for example, a liquid crystal display. The user terminal 100 also includes an input device 102. The input device 102 is for providing desired input to the user terminal 100 by the user. A publicly known or well-known input device can be used for the input device 102. The input device 102 of the user terminal 100 in this embodiment is a button-type input device, but is not limited thereto, and a numeric keypad, a keyboard, a trackball, a mouse or the like can also be used. Moreover, if the display 101 is a touch panel, the display 101 also has a function of the input device 102, which is the case in this embodiment.

Figure 3:
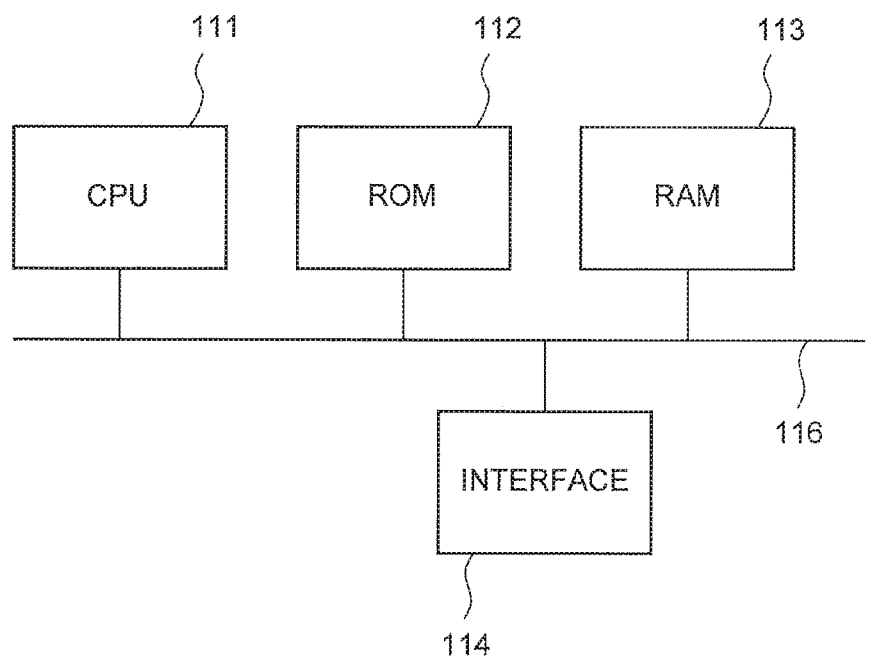
FIG. 3 is a diagram illustrating a hardware configuration of the user terminal included in the settlement system as illustrated in FIG. 1.

A hardware configuration of the user terminal 100 is illustrated in FIG. 3.

The hardware includes a CPU (central processing unit) 111, a ROM (read only memory) 112, a RAM (random access memory) 113, and an interface 114, which are interconnected by a bus 116.

The CPU 111 is an operational device that performs operations. The CPU 111, for example, executes a computer program recorded in the ROM 112 to thereby execute processing to be described later. It should be noted that the computer program as used herein includes at least a computer program for causing this user terminal 100 to function as the user terminal of the invention of the present application. This computer program may have been pre-installed in the user terminal 100, or may be installed in an ex-post manner. The installation of this computer program in the user terminal 100 may be performed via a predetermined recording medium such as a memory card, or may be performed via a network such as a LAN or the Internet.

The ROM 112 has recorded the computer program and data required to execute the processing to be described later by the CPU 111. The computer program recorded in the ROM 112 is not limited thereto, and if the user terminal 100 is the smartphone, a computer program and data have been recorded, for example, for executing telephone calls or e-mails, which are required to cause the user terminal to function as the smartphone. The user terminal 100 can also browse homepages based on data received via the network 400, and implements a publicly known web browser for enabling the browsing.

The RAM 113 provides a work area required to perform the processing by the CPU 111.

The interface 114 performs data exchange between the CPU 111, the RAM 113 and the like, which are connected via the bus 116, and the outside. The above-mentioned display 101 and the input device 102 are connected to the interface 114. Operation content inputted from the input device 102 is inputted to the bus 116 from the interface 114, and also, image data to be described later is outputted to the display 101 from the interface 114. The interface 114 is also connected to a GPS mechanism and a transmission and reception unit, and illustration of both is omitted.

The GPS mechanism detects a position where the user terminal 100 exists on the Earth. The GPS mechanism generates position information identifying the detected position of the user terminal 100. The GPS mechanism is publicly known or well-known, and for example, detects the position of the user terminal 100 by receiving radio waves from a geostationary satellite. The position information is received by the interface 114.

The transmission and reception unit performs data transmission and reception via the network 400 that is the Internet. While this communication may also be performed in a wired manner, if the user terminal 100 is the smartphone, this communication is wirelessly performed. As long as the communication is possible, the transmission and reception unit may have a publicly known or well-known configuration. The data received by the transmission and reception unit from the network 400 is received by the interface 114, and the data passed from the interface 114 to the transmission and reception unit is sent by the transmission and reception unit, via the network 400 to the outside, for example, to the settlement device 200.

Figure 4:
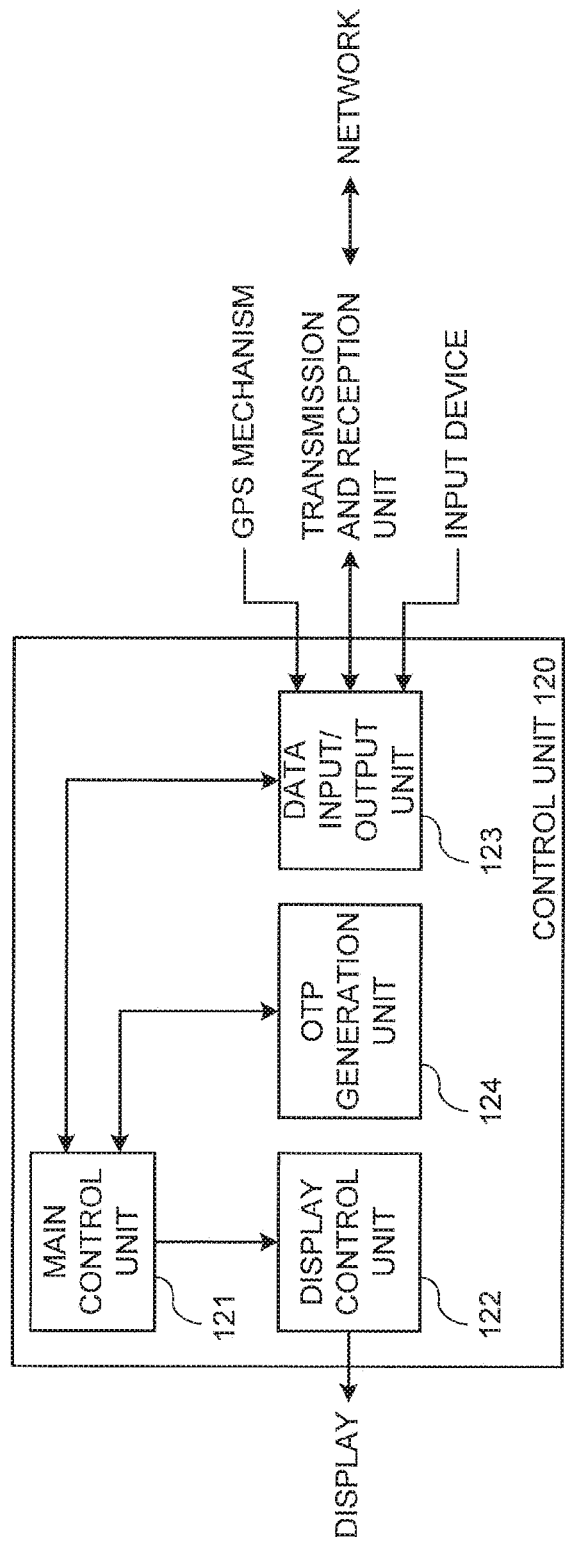
FIG. 4 is a block diagram illustrating functional blocks generated in the user terminal included in the settlement system as illustrated in FIG. 1.

Functional blocks as illustrated in FIG. 4 are generated within the user terminal 100 by executing the computer program by the CPU 111. It should be noted that while the following functional blocks may be generated with functions of the above-mentioned computer program alone for causing the user terminal 100 to function as the user terminal of the invention of the present application, the following functional blocks may be generated in cooperation with the above-mentioned computer program and an OS and other computer programs installed in the user terminal 100.

A control unit 120 as follows is generated within the user terminal 100 in connection with functions of the invention of the present application, and a main control unit 121, a display control unit 122, a data input/output unit 123, and an OTP generation unit 124 are generated within the control unit 120.

The control unit 120 executes information processing as described below.

The main control unit 121 performs the entire control within the control unit 120. For example, the main control unit 121 performs control of the display control unit 122 based on data received from the data input/output unit 123 to be detailed later.

If the main control unit 121 has received temporary permission information to be described later, from the data input/output unit 123 to be also described later, the main control unit 121 notifies the OTP generation unit 124 thereof. The main control unit 121 also receives a user ID and a password, which will be described later, and possibly additional information described later from the data input/output unit 123. The user ID, the password and the like are sent from the main control unit 121 to the data input/output unit 123. The main control unit 121 may also receive user terminal cancellation information to be described later, from the data input/output unit 123. Moreover, the main control unit 121 has integrated recording medium consisting of a memory or the like, whose illustration is omitted, and has recorded terminal information therein. Examples of the terminal information can include, in the case where the user terminal 100 is smartphone, an ID number recorded in a SIM card (Subscriber Identity Module Card) incorporated in this smartphone, and an individual identification number such as a manufacturing number of the smartphone. The main control unit 121 has previously obtained at least one of these pieces of terminal information from the user terminal 100. It should be noted that the main control unit 121 may obtain the terminal information from the user terminal 100 each time the user performs processing for payment. In either case, the main control unit 121 sends the user ID and the password as well as the terminal information to the data input/output unit 123 at timings to be described later.

The main control unit 121 also receives a one-time password from the OTP generation unit 124. The main control unit 121 sends the received one-time password to the data input/output unit 123.

The display control unit 122 performs control of images to be displayed on the display 101 under control of the main control unit 121. The images based on data sent from the display control unit 122 are displayed on the display 101. The main control unit 121 sends an instruction on what image should be displayed on the display 101, to the display control unit 122.

The data input/output unit 123 performs data input and output to the control unit 120. Specifically, the data input/output unit 123 receives the input from the input device 102. The input from the input device 102 to the data input/output unit 123 includes, for example, a settlement start instruction, the user ID and the password, upper limit amount information, the user ID, the password, the additional information, an upper limit amount information transmission instruction, and the user terminal cancellation information. They are sent to the main control unit 121.

Moreover, the data input/output unit 123 receives, from the transmission and reception unit, the temporary permission information or the like sent from the settlement device 200 via the network 400, which will be described later. The data input/output unit 123 sends the received temporary permission information or the like to the main control unit 121.

Moreover, the data input/output unit 123 receives the position information from the GPS mechanism. The data input/output unit 123 sends the received position information to the main control unit 121.

Moreover, the data input/output unit 123 receives, from the main control unit 121, the user ID, the password, the terminal information, the additional information, and the upper limit amount information.

The user ID is information for identifying the user, and is an enumeration of a predetermined number of alphanumeric characters in this embodiment as will be described later, but is not limited thereto. The password is information for further ensuring authentication of the user, and is an enumeration of a predetermined number of alphanumeric characters in this embodiment as will be described later, but is not limited thereto. The terminal information is information for identifying the user terminal 100, and is also intended to further ensure the authentication of the user. The terminal information in this embodiment is an enumeration of a predetermined number of numbers as will be described later, but is not limited thereto.

The upper limit amount information is information for identifying an amount for which the user intends to perform the payment to an administrator of the settlement terminal 300, and is a number representing the amount in a predetermined unit (yen, dollar, euro, or the like).

Moreover, to the data input/output unit 123, the position information and the one-time password are sent from the main control unit 121. It should be noted that the position information may be held in the data input/output unit 123 in a state of being inputted to the data input/output unit 123 from the GPS mechanism, instead of being returned from the data input/output unit 123 via the main control unit 121 to the data input/output unit 123. Moreover, the one-time password may be directly sent from the OTP generation unit 124 to the data input/output unit 123 without going through the main control unit 121.

The additional information is information for identifying an additional condition that is a condition for restricting the payment with the one-time password generated in the user terminal 100 as will be described later. The additional condition can be selected by the user, and also, the additional condition may not be selected, that is, the additional condition may not exist. Moreover, the settlement system in this embodiment may also not originally handle the restriction of the payment by means of the additional condition. However, the settlement system in this embodiment handles the restriction of the payment with the one-time password, by means of the additional condition. The additional condition in this embodiment includes a restriction of a time limit of permission of the payment, a restriction of a position of the settlement terminal 300 that receives the payment, and a restriction of the settlement terminal 300 that receives the payment.

The user terminal cancellation information is information indicating indication of intention of the user for cancellation of one of past settlements that have already been finished, as will be described later, and is inputted by the user with the input device 102. The user terminal cancellation information includes at least information identifying one of the past settlements that the user desires to cancel.

The user ID, the password, the terminal information, the additional information, the upper limit amount information, the position information, the user terminal cancellation information and the like are sent at respective appropriate timings to be described later, from the data input/output unit 123 to the transmission and reception unit, and are sent from the transmission and reception unit to the settlement device 200 via the network 400.

If the main control unit 121 has received the temporary permission information, the OTP generation unit 124 is notified thereof by the main control unit 121, as mentioned above. If the OTP generation unit 124 is notified thereof, the OTP generation unit 124 generates the one-time password. For a way of generating the one-time password, it is possible to follow the conventional art. A specific example of the way of generating the one-time password will be described later.

The settlement device 200 will be described next.

The settlement device 200 is a typical computer. A hardware configuration thereof may be equivalent to that of a settlement device in the conventional settlement system.

Figure 5:
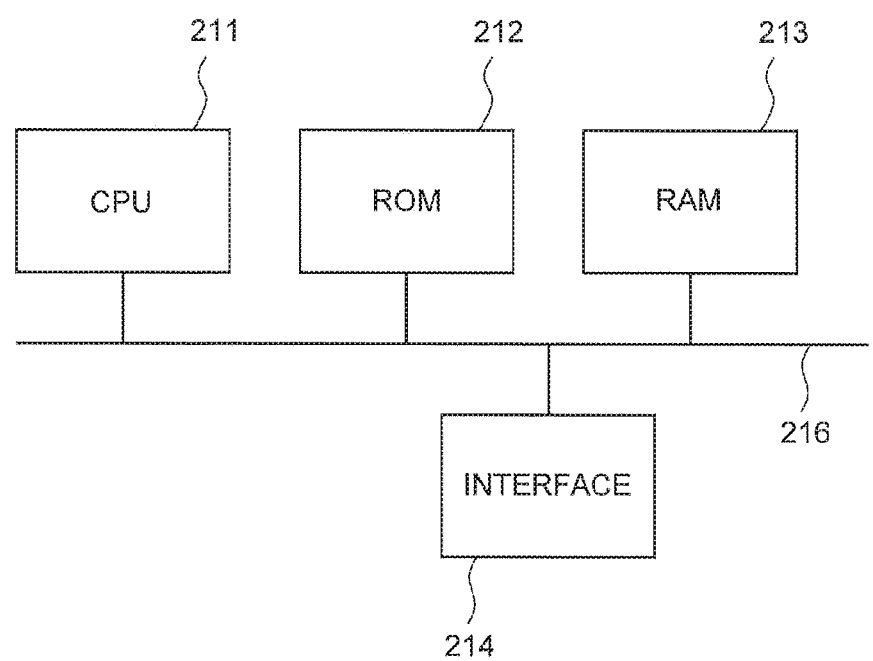
FIG. 5 is a diagram illustrating a hardware configuration of a settlement device included in the settlement system as illustrated in FIG. 1.

The hardware configuration of the settlement device 200 is illustrated in FIG. 5.

The hardware includes a CPU 211, a ROM 212, a RAM 213, and an interface 214, which are interconnected by a bus 216.

The CPU 211 is an operational device that performs operations. The CPU 211, for example, executes a computer program recorded in the ROM 212 to thereby execute the processing to be described later. It should be noted that the computer program as used herein includes at least a computer program for causing this settlement device 200 to function as a settlement device of the invention of the present application. This computer program may have been pre-installed in the settlement device 200, or may be installed in an ex-post manner. The installation of this computer program in the settlement device 200 may be performed via the predetermined recording medium such as the memory card, or may be performed via the network such as the LAN or the Internet.

The ROM 212 has recorded the computer program and data required to execute the processing to be described later by the CPU 211. The computer program recorded in the ROM 212 is not limited thereto, and any other necessary computer programs may be recorded.

The RAM 213 provides a work area required to perform the processing by the CPU 211.

In addition to the ROM 212 and the RAM 213, another recording medium, for example, an HDD (Hard Disk Drive) or an SSD (Solid State Drive) may naturally be provided to cause them to cover a part of functions of the ROM 212 and the RAM 213.

The interface 214 performs data exchange between the CPU 211, the RAM 213 and the like, which are connected via the bus 216, and the outside. The Interface 214 is at least connected to the transmission and reception unit. The data received by the transmission and reception unit from the network 400 is received by the interface 214, and the data passed from the interface 214 to the transmission and reception unit is sent by the transmission and reception unit, via the network 400 to the outside, for example, to the user terminal 100.

Figure 6:
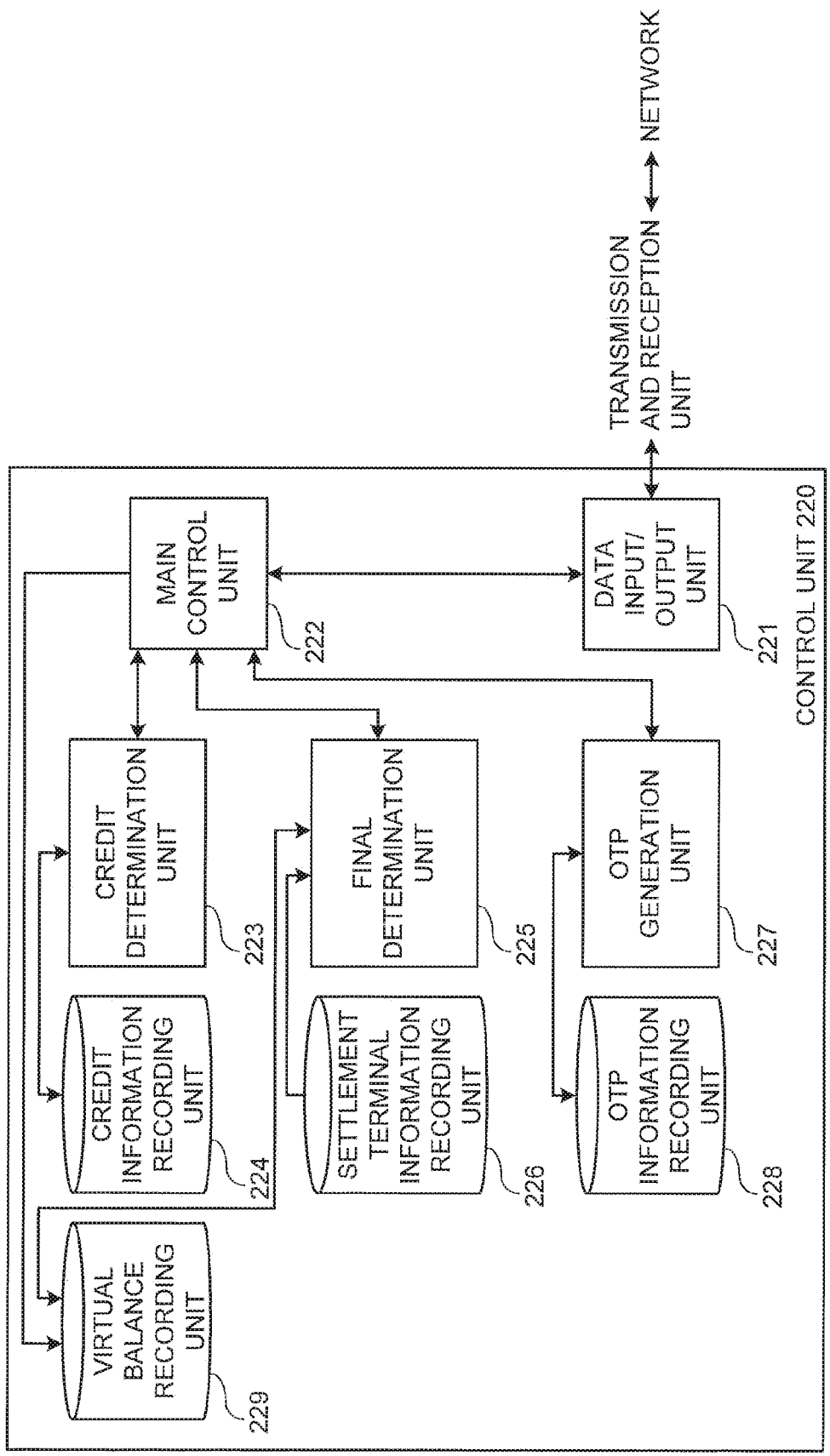
FIG. 6 is a block diagram illustrating functional blocks generated in the settlement device included in the settlement system as illustrated in FIG. 1.

Functional blocks as illustrated in FIG. 6 are generated within the settlement device 200 by executing the computer program by the CPU 211. It should be noted that while the following functional blocks may be generated with functions of the above-mentioned computer program alone for causing the settlement device 200 to function as the settlement device of the invention of the present application, the following functional blocks may be generated in cooperation with the above-mentioned computer program and the OS and other computer programs installed in the settlement device 200.

A control unit 220 as follows is generated within the settlement device 200 in connection with the functions of the invention of the present application. A data input/output unit 221, a main control unit 222, a credit determination unit 223, a credit information recording unit 224, a final determination unit 225, a settlement terminal information recording unit 226, an OTP generation unit 227, an OTP information recording unit 228, and a virtual balance recording unit 229 are generated within the control unit 220.

The data input/output unit 221 performs data input and output to the control unit 220. Specifically, the data input/output unit 221 accepts various data to be described later, from the main control unit 222. The data input/output unit 221 passes the various data accepted from the main control unit 222, to the transmission and reception unit, and the transmission and reception unit sends the data to the user terminal 100 or the settlement terminal 300 via the network 400.

The data input/output unit 221 also receives various data to be described later, which has been received by the transmission and reception unit from the user terminal 100 or the settlement terminal 300 via the network 400, from the transmission and reception unit, and sends the received data to the main control unit 222.

The main control unit 222 performs the entire control within the control unit 220.

The main control unit 222 may receive the user ID and the password as well as the terminal information and the upper limit amount information from the data input/output unit 221. If the main control unit 222 has received the user ID and the password as well as the terminal information, the main control unit 222 sends them to the credit determination unit 223.

The main control unit 222 may receive the additional information sent from the user terminal 100. If the main control unit 222 has received this additional information, the main control unit 222 records the additional information so as to be associated with the one-time password, which is associated with the upper limit amount information sent from the user terminal 100 with the additional information, in the virtual balance recording unit 229. The main control unit 222 may receive the position information sent from the user terminal 100, from the data input/output unit 221. If the main control unit 222 has received this position information, and if the one-time password associated with the upper limit amount information, which has been sent from the user terminal 100 with the position information, has been created later in the OTP generation unit 227, and an additional condition of "Close to the user terminal" to be described later has been added to the one-time password, the main control unit 222 records the position information so as to be added to the additional information identifying the additional condition, in the virtual balance recording unit 229.

The main control unit 222 may also receive the temporary permission information to be described later, from the credit determination unit 223. If the main control unit 222 has received the temporary permission information, the main control unit 222 sends it to the data input/output unit 221. If the main control unit 222 has received the temporary permission information, the main control unit 222 sends an instruction to generate the one-time password for the user who has sent the user ID and the like, which have caused the generation of this temporary permission information, to the OTP generation unit 227. The main control unit 222 may also receive settlement application information, the one-time password, the user ID, and the amount information, all of which have been sent from the settlement terminal 300 and will be described later, from the data input/output unit 221. If the main control unit 222 has received the settlement application information, the main control unit 222 sends them to the final determination unit 225.

The main control unit 222 may also receive the one-time password from the OTP generation unit 227. If the main control unit 222 has received the one-time password, the main control unit 222 sends it to the virtual balance recording unit 229. It should be noted that the one-time password is not necessarily required to be sent to the virtual balance recording unit 229 via the main control unit 222, and for example, may also be directly sent from the OTP generation unit 227 to the virtual balance recording unit 229.

The main control unit 222 may also receive final determination data to be described later, from the final determination unit 225. If the main control unit 222 has received the final determination data, the main control unit 222 performs settlement processing. The settlement processing is processing for allowing the settlement to the administrator of the settlement terminal 300 that has transmitted the temporary permission information for asking for payment to a certain user, from the user. The main control unit 222 in this embodiment holds data on what settlement has been performed. For example, the main control unit 222 records information on how much, from whom, and to whom the payment has finally been permitted, for each user in a recording medium that is not illustrated. The settlement processing will be described later.

The main control unit 222 may receive the user terminal cancellation information and settlement terminal cancellation information to be described later, from the data input/output unit 221. If the main control unit 222 has received the user terminal cancellation information and the settlement terminal cancellation information, and if the past settlements identified by the user terminal cancellation information and the settlement terminal cancellation information are identical, the main control unit 222 performs processing for canceling this past settlement. However, this processing of canceling the settlement is not necessarily essential, and if the processing of canceling the settlement is unnecessary, functions required only for this processing can also be deleted from the user terminal 100, the settlement device 200, and the settlement terminal 300. It should be noted that, in this embodiment, the main control unit 222 receives both the user terminal cancellation information and the settlement terminal cancellation information to be described later, and cancels the past settlement only if the past settlements identified by the user terminal cancellation information and the settlement terminal cancellation information are identical. Instead, however, the main control unit 222 may cancel the past settlement identified by the user terminal cancellation information or the settlement terminal cancellation information, when the main control unit 222 has accepted only any one of the user terminal cancellation information and the settlement terminal cancellation information. Moreover, the main control unit 222 may perform the cancellation of only relatively new settlements among the past settlements. For example, the main control unit 222 may allow the cancellation of only the settlements within 10 minutes since the above-mentioned settlement processing has finished.

The credit determination unit 223 receives the user ID and the password as well as the terminal information and the upper limit amount information from the main control unit 222, as mentioned above. If the credit determination unit 223 has received the user ID and the password as well as the terminal information, the credit determination unit 223 performs credit determination. The credit determination is determination of whether or not the settlement of the payment of an amount identified by the above-described upper limit amount information is possible, for the user identified by the user ID and the password as well as the terminal information. This credit determination also includes processing of so-called authentication regarding whether or not the user is legitimate.

The credit determination unit 223 utilizes data recorded in the credit information recording unit 224 for the credit determination including the authentication processing.

Data as illustrated in FIG. 7 has been recorded in the credit information recording unit 224.

In this embodiment, the user ID, the password, the terminal information, and a credit balance have been recorded in the credit information recording unit 224, but are not limited thereto. They are linked to each user. It should be noted that, in addition to them, a real name, a telephone number, an e-mail address and the like of each user may naturally be recorded.

The user ID is the information for identifying each user. The user ID in this embodiment is the enumeration of the predetermined number of alphanumeric characters, but is not limited thereto. The user ID is decided by each user, or otherwise decided by the administrator of the settlement device 200. If the user ID is decided by the user, the administrator of the settlement device 200 is notified of the user ID by the user according to a publicly known or well-known method, and the notified user ID is recorded in the credit information recording unit 224.

The password is information for checking legitimacy of each user. The password in this embodiment is the enumeration of the predetermined number of alphanumeric characters, but is not limited thereto. The password is decided by each user. The administrator of the settlement device 200 is notified of the password by the user according to the publicly known or well-known method, and the notified password is recorded in the credit information recording unit 224.

The terminal information is information for further solidly checking the legitimacy of each user. Specific examples thereof include the ID number recorded in the SIM card, the manufacturing number of the smartphone and the like, as already described. The terminal information is uniquely decided for each user terminal 100. The administrator of the settlement device 200 is notified of the terminal information, for example, from the user, according to the publicly known or well-known method, and the notified terminal information is recorded in the credit information recording unit 224.

The credit balance is a balance that is decided for each user and indicates how much payment can be performed more by the user with this settlement system. To be more precise, the user can generate the one-time password with an upper limit amount corresponding to the credit balance, in the user's own user terminal 100. For example, according to a concept similar to that used in the settlement system using the credit cards, in which "amount limit" has been decided for each user depending on each user's credit, and then the upper limit amount associated with the one-time password generated in the user terminal 100 is subtracted, or an amount that has already been used for the payment by the user is subtracted, from the amount limit, and thereby, the credit balance can be decided. In this case, "amount limit" is decided by each user's credit, and an amount thereof is not necessarily proportional to an amount of cash that each user has at this time point, or the amount of the cash that each user has at this time point, which has been grasped by the administrator of the settlement device 200.

When the credit determination unit 223 receives the user ID and the password as well as the terminal information and the upper limit amount information from the main control unit 222, the credit determination unit 223 reads out the password, the terminal information, and the credit balance, which are associated with the user ID identical to the received user ID, from the credit information recording unit 224. If the user ID identical to the user ID received by the credit determination unit 223 does not exist in the credit information recording unit 224, the credit determination unit 223 does not read out information such as the password from the credit information recording unit 224. In this case, the credit determination unit 223 ceases processing of the credit determination.

If the user ID identical to the user ID received from the main control unit 222 by the credit determination unit 223 has been recorded in the credit information recording unit 224, and if the password, the terminal information, and the credit balance, which are associated with the user ID identical to the received user ID, have been read out from the credit information recording unit 224, the credit determination unit 223 determines whether or not the password and the terminal information, which have been received from the main control unit 222, are identical to the password and the terminal information which have been read out from the credit information recording unit 224. If they have matched each other, the credit determination unit 223 authenticates that the user who has sent the user ID and the like is a legitimate user, and if at least one of the passwords and the terminal information has not matched, the credit determination unit 223 determines that the user who has sent the user ID and the like is not the legitimate user, and ceases the credit determination processing. The above is the authentication processing. In the authentication processing, if it is authenticated that the user who has sent the password is the legitimate user, the credit determination unit 223 performs the credit determination of whether or not the settlement asked by the user may be allowed.

The credit determination is performed by comparing the upper limit amount information transmitted from the user terminal 100, to the credit balance read out from the above-described credit information recording unit 224, which has been linked to the user ID linked to the upper limit amount information. In this embodiment, if the credit balance is equal to or larger than the amount identified by the upper limit amount information, the settlement asked by the user is allowed, which, however, is not limited thereto. In that case, the credit determination unit 223 generates the temporary permission information. In contrast, if the credit balance is smaller than the amount identified by the upper limit amount information, the settlement asked by the user is not allowed. In this case, the credit determination unit 223 does not generate the temporary permission information. If the credit determination unit 223 has generated the temporary permission information, the temporary permission information is sent to the main control unit 222.

Moreover, the credit determination unit 223 has a function of identifying time (a clock function included in the typical computer may be utilized), and notifies the main control unit 222 of time information for identifying the time when the credit determination has been performed. This time information is sent from the main control unit 222 to the final determination unit 225, and the main control unit 222, which has received it, is supposed to write the time information to the virtual balance recording unit 229 (FIG. 10).

The final determination unit 225 may receive the position information sent from the user terminal 100, from the main control unit 222, as mentioned above. The main control unit 222 may also receive the settlement application information, the user ID, the one-time password, and the amount information, all of which have been sent from the settlement terminal 300, from the data input/output unit 221. In this embodiment, the settlement application information, the user ID, the one-time password, and the amount information are collectively sent from the settlement terminal 300 to the settlement device 200, and such four pieces of the information are collectively received by the final determination unit 225, which, however, is not limited thereto. The final determination unit 225 has a function of performing processing of final determination if the final determination unit 225 has received the settlement application information, the user ID, the one-time password, and the amount information. The final determination is determination of whether or not the payment to the administrator of the settlement terminal 300, which has been desired by the user, is finally allowed.

The final determination unit 225 utilizes information recorded in the settlement terminal information recording unit 226 if necessary to perform the final determination. Moreover, the one-time password provided from the OTP generation unit 227 via the main control unit 222 is also utilized for the final determination.

In the settlement terminal information recording unit 226, a settlement terminal ID and various data related to the settlement terminal have been recorded in a state of being linked to each other, as illustrated in FIG. 8.

The settlement terminal ID is for distinguishing and identifying each settlement terminal 300. Since there are n settlement terminals 300 in this embodiment, serial numbers 1 to n that are natural numbers are used as the settlement terminal ID for identifying each settlement terminal 300 in this embodiment, which, of course, is not limited thereto.

As various data related to the settlement terminal 300, an enterprise name, a business type name, a facility name, position information and the like are recorded. The enterprise name is a name of the administrator of the settlement terminal 300, or a name of an enterprise to which the administrator belongs. For example, in this embodiment, if the settlement terminal 300 is placed in a store operated by Starbucks Coffee Japan™, the enterprise name of the settlement terminal 300 is "Starbucks," and also, if the settlement terminal 300 is placed in a directly managed store of McDonald's Company (Japan), Ltd., or a franchisee thereof, the enterprise name of the settlement terminal 300 is "McDonald's," regardless of the directly managed store or the franchisee, which, however, are not limited thereto. Moreover, a store name such as "○○ branch," if any, is also added to the enterprise name. The business type name is a business type of the store or the like where the settlement terminal 300 is placed, for example, such as restaurants, books, clothing, jewelry, beauty, travel agencies, brick-and-mortar store retail, and the Internet retail. If the store or the like where the settlement terminal 300 is placed is included, for example, as a tenant, in a commercial facility such as a shopping mall or a commercial building, the facility name identifies this commercial facility. The commercial facility may also be a virtual commercial facility on the Internet. Rakuten Ichiba™ managed by Rakuten, Inc. and Yahoo Shopping™ managed by Yahoo Japan Corporation are examples thereof.

The position information is information for identifying a position where the settlement terminal 300 linked thereto exists. The position information in this embodiment identifies the position of the settlement terminal 300 with latitude and longitude. In FIG. 8, numbers having a character "N" or "S" and positioned on the left of the character identify latitudes, in which the former identifies north latitude and the latter identifies south latitude, and numbers having a character "E" or "W" and positioned on the right of the character identify longitudes, in which the former identifies east longitude and the latter identifies west longitude, respectively. However, a format of the position information is not limited to a combination of latitude and longitude. It should be noted that the position information generated with the GPS mechanism of the user terminal 100 also has a similar format in this embodiment.

It should be noted that the position information is not set to the settlement terminal ID of 4 in FIG. 8. For example, if the settlement terminal 300 is used for settlement for a virtual store on the Internet, the identification of the position of the settlement terminal 300 is less meaningful for a reason to be described later. The position information may not be set to such a settlement terminal 300.

The administrator of the settlement device 200 can be informed of the various data related to the settlement terminal 300, for example, by notifying the administrator of the settlement device 200 thereof by the administrator of the settlement terminal 300 with appropriate means such as an e-mail or a letter, when the settlement terminal 300 is installed. The administrator of the settlement device 200 may link the notified position information to the settlement terminal ID of each settlement terminal 300, and record them in the settlement terminal information recording unit 226.

To the above-mentioned settlement application information, the settlement terminal ID of the settlement terminal 300 that has transmitted the settlement application information is attached. When the final determination unit 225 has received the settlement application information and the one-time password, the final determination unit 225 reads out all of the various data related to the settlement terminal 300, which is linked to the settlement terminal ID matching the settlement terminal ID added to the settlement application information, or a necessary part thereof, from the settlement terminal information recording unit 226.

The OTP generation unit 227 has a function of generating the one-time password.

As mentioned above, when the OTP generation unit 227 receives the instruction to generate the one-time password from the main control unit 222, the OTP generation unit 227 generates the one-time password. It should be noted that, a timing at which the one-time password is generated in the settlement device 200 may be at an appropriate timing that is the same time as the generation of the temporary permission information or later, and before the final determination unit 225 performs the final determination.

For the way of generating the one-time password, it is possible to follow the conventional art, and the specific example thereof is as follows, for example.

In order to generate the one-time password, for example, a method of assigning a past value to a predetermined function with one initial value (which may be two or more initial values) and thereby sequentially creating a new value may be executed each time the one-time password is required. Thereby, the one-time password that is the above "value" can be consecutively generated. Such a one-time password becomes a pseudo-random number having initial value dependence.

Examples of the function used for creating the above-mentioned "value" include the following (a) to (c). Any of the following (a) to (c) is an expression for creating $X_N$ that is the N-th "value." Moreover, P, Q, R, and S are natural numbers.

$$(X_N)=(X_{N-1})^P+(X_{N-2})^Q \quad (a)$$

$$(X_N)=(X_{N-1})^P \quad (b)$$

$$(X_N)=(X_{N-1})^P(X_{N-2})^Q(X_{N-3})^R(X_{N-4})^S \quad (c)$$

(a) generates a new "value" by using past two "values" to add them raised to the P-th power and the Q-th power, respectively. It should be noted that, precisely, when the past two "values" are used and the values raised to the P-th power and the Q-th power are added, the number of digits increases, and thus the new "value" is actually generated by extracting an appropriate number of digits from the beginning of an obtained value, extracting an appropriate number of digits from the end of the value, or extracting an appropriate number of digits from an appropriate portion of the value or the like.

(b) has the new "value" by using one past "value" to arrange the number of digits of the value raised to the P-th power as mentioned above.

(c) has the new "value" by using past four "values" to take the product of them raised to the P-th power, the Q-th power, the R-th power, and the S-th power, respectively, and then arranging the number of digits as mentioned above.

The above-mentioned (a) to (c) are an example of an algorithm for generating the one-time password, and a change can be added to the algorithm when the one-time password is generated, for example, a change can also be added in which the above-mentioned (a) to (c) are used in rotation or the like. In this embodiment, an enumeration of alphanumeric characters, which is obtained by performing an appropriate operation for the "value" obtained as above, is set as the one-time password.

In the generation of the one-time password, the OTP generation unit 227 utilizes data recorded in the OTP information recording unit 228. For example, data as described in FIG. 9 has been recorded in the OTP information recording unit 228. The user ID, the initial value, and the number of generation have been recorded in the OTP information recording unit 228. Only the initial value is essential among them.

The user ID recorded in the OTP information recording unit 228 is the same as the user ID recorded in the credit information recording unit 224, and is for identifying each user. When the OTP generation unit 227 receives the instruction to generate the one-time password, from the main control unit 222, the OTP generation unit 227 has also received the user ID of this user for whom the one-time password is generated. The OTP generation unit 227 reads out the initial value and the number of generation, which are associated with the user ID, from the OTP information recording unit 228, prior to the generation of the one-time password.

The initial value is the initial value used when the one-time password is generated.

The initial value is different for each user terminal 100. In order to enable generation of the one-time password identical to the one-time password generated in the OTP generation unit 124 of each user terminal 100, in the OTP generation unit 227 of the settlement device 200, the initial value identical to the initial value given to each user terminal 100 has been recorded in the OTP information recording unit 228. As mentioned above, the one-time password becomes the pseudo-random number having the initial value dependence. In other words, the one-time passwords for one user terminal 100 constantly become identical when the one-time passwords in the same order are compared to each other. Accordingly, if the one-time password identical to the initial value included in each user terminal 100 has been prepared in the settlement device 200, the settlement device 200 will be able to reproduce the one-time password in any user terminal 100. In this embodiment, there are two initial values for each user terminal 100 which have been recorded in the OTP information recording unit 228. This is because, in this embodiment, the above-mentioned mathematical expression (a) of utilizing the past two "values" to generate the new "value" is used to generate the one-time password, which, however, is not limited thereto. It is only necessary to have recorded the past values required to generate the new "value," that is, the one-time password, in the OTP information recording unit 228.

The number of generation is a numerical value indicating how many times the one-time password for the user terminal 100 has been generated. As mentioned above, the one-time password is a random number, but is a pseudo-random number. When the number of generation is 0, the one-time password generated first by using the initial value is used for the final determination to be described later; when the number of generation is 1, the one-time password generated second by using the above-mentioned initial value is used for the final determination; and when the number of generation is N, the one-time password generated N-lth by using the above-mentioned initial value is used for the final determination.

When the OTP generation unit 227 receives the instruction to generate the one-time password, from the main control unit 222, the OTP generation unit 227 reads out the initial value and the number of generation, which are linked to the user ID received with the one-time password, from the OTP information recording unit 228. The OTP generation unit 227 assigns the initial value to the above-mentioned mathematical expression (a), and generates up to the N-lth values when the read out number of generation is N. It becomes the one-time password used for the final determination.

It should be noted that the one-time password is generated in a similar manner also in the OTP generation unit 124 of the user terminal 100. As mentioned above, the OTP generation unit 124 of the user terminal 100 has the same initial value as that recorded in the OTP information recording unit 228 of the settlement device 200; can also use the same mathematical expression as that used in the OTP generation unit 227 of the settlement device 200 (in the case of this embodiment, the mathematical expression (a)); and can record the number of generation identifying how many times the "value" has been generated in the past, in a similar manner to the recording in the OTP information recording unit 228. Thereby, the one-time passwords generated in the user terminal 100 and the settlement device 200 can be constantly synchronized.

In this way, a method of using the one-time passwords generated in the same order in the two devices, in order to generate the identical one-time passwords in two devices that generate the one-time passwords, or to synchronize the one-time passwords, is generally referred to as "event synchronization." The above-mentioned method employs a one-time password approach using the event synchronization. In contrast, in order to synchronize the one-time passwords, information on time can also be used. Such a one-time password synchronization method is generally referred to as "time synchronization." Both the event synchronization and the time synchronization are publicly known technologies, and either of them can also be used to synchronize the one-time passwords.

In either case, the OTP generation unit 227 sends the generated one-time password to the final determination unit 225 via the main control unit 222. Moreover, the OTP generation unit 227 adds 1 to the number of generation that has been recorded in the OTP information recording unit 228, and has been linked to the user ID of the user terminal 100 in which the one-time password for the user terminal 100 has been created, and thereby rewrites the number of generation.

When the main control unit 222 receives the one-time password, the main control unit 222 records the one-time password; the user ID of the user who has sent the upper limit amount information and the like for generating the one-time password; this one-time password; the upper limit amount of the one-time password; time information indicating date and time of the generation of the one-time password (in this embodiment, more precisely, date and time when the credit determination has been performed); and the additional information if any additional information has existed for generating the one-time password, in a state of being associated with one another, in the virtual balance recording unit 229. FIG. 10 illustrates an example of data recorded in the virtual balance recording unit 229.

It should be noted that only the initial value is essential in the information to be recorded in the OTP information recording unit 228, as mentioned above. In that case, the one-time password generated in the user terminal 100 and the one-time password generated in the settlement device 200 are synchronized as follows.

First, there is a case without the information on the number of generation. In this case, the OTP generation unit 227 of the settlement device 200 repeats processing of erasing the oldest "value" and overwriting it with one new "value," each time the new "value" is generated. The one-time password generated in the user terminal 100 and the one-time password generated in the settlement device 200 can be synchronized by repeating similar processing also in the user terminal 100, without using the information on the number of generation indicating how many times the "value" has been generated in the past.

The final determination unit 225 receives the settlement application information, the one-time password, and the amount information from the main control unit 222, as mentioned above. Moreover, before that, the final determination unit 225 has received the additional information transmitted from the user terminal 100, and the time information generated in the credit determination unit 223, from the main control unit 222.

Meanwhile, the final determination unit 225 receives the settlement terminal information indicating the position of the settlement terminal 300 that has sent the settlement application information to the settlement device 200, from the position information recording unit 226, and also receives the one-time password from the OTP generation unit 227.

The final determination unit 225 compares the one-time password from the settlement terminal 300, which has been received via the main control unit 222, to the one-time password from the OTP generation unit 227, which has also been received via the main control unit 222. As a result, only when both of two conditions have all been satisfied, the final determination unit 225 finally makes a decision to allow the payment of money of amount identified with the amount information to the administrator of the settlement terminal 300 from the user of the user terminal 100, both of the two conditions being a condition that the above compared two one-time passwords match each other; and a condition that a time when this comparison has been performed is within a predetermined time, for example, 5 minutes, or within 30 minutes, from the time identified by the time information accepted from the credit determination unit 223 via the main control unit 222. If any of the three conditions is not satisfied, the final determination unit 225 finally makes a decision not to allow the above described payment. However, when the additional condition, which is an added condition as a condition for allowing the payment by the final determination unit 225, has been added with the additional information, the final determination unit 225 determines to allow the payment only if the additional condition has also been satisfied in addition to the above two conditions.

If any of the above two conditions or any of the additional condition is not satisfied, the final determination unit 225 finally makes a decision not to allow the above-described payment. These both decisions are referred to as "final determination."

If the final determination unit 225 has performed the final determination, the final determination unit 225 sends the final determination data that is data indicating a result of the final determination, to the main control unit 222. If the payment has been allowed in the final determination, the main control unit 222, which has received it, performs processing for allowing the payment of an amount of money identified by the amount information, from the user of the user terminal 100 that has generated the one-time password used to perform this final determination, to the administrator of the settlement terminal 300 that has sent the amount information with the one-time password. The processing includes subtraction of the amount identified by the amount information, from a virtual balance recorded in the virtual balance recording unit 229 in a state of being associated with a one-time password identical to the one-time password sent from the settlement terminal 300 with the amount information. In this way, the data in the virtual balance recording unit 229 is rewritten each time the payment with the one-time password has been performed. Moreover, a related financial institution or the like is notified of content of the payment settled in the settlement device 200 if the content is required in order for the administrator of the settlement device 200 to receive the user's money, or to realize the processing of the payment to the administrator of the settlement terminal 300.

Meanwhile, if the payment has not been allowed in the final determination, the main control unit 222 does not perform the above-mentioned processing. The main control unit 222 sends content based on the final determination data to the data input/output unit 221 so that the content is sent via the transmission and reception unit and the network 400, to the settlement terminal 300 that has transmitted the settlement application information that becomes the basis of the final determination.

The settlement terminal 300 will be described next.

The settlement terminal 300 is generally the same as a settlement terminal used in the settlement system using the credit cards, and is a typical computer. A hardware configuration thereof may be equivalent to that of the settlement terminal in the conventional settlement system.

It should be noted that the settlement terminal 300 includes the touch panel display, whose illustration is omitted. As a result, it means that the settlement terminal 300 includes the display and an input device. However, instead, while the settlement terminal 300 may include a display without a touch panel, and an input device including necessary input devices selected from publicly known or well-known input devices such as a numeric keypad, a keyboard, a mouse, and a trackball, so that the display and the input device are separated, the description continues below assuming that the settlement system in this embodiment includes a touch panel keyboard.

Figure 11:
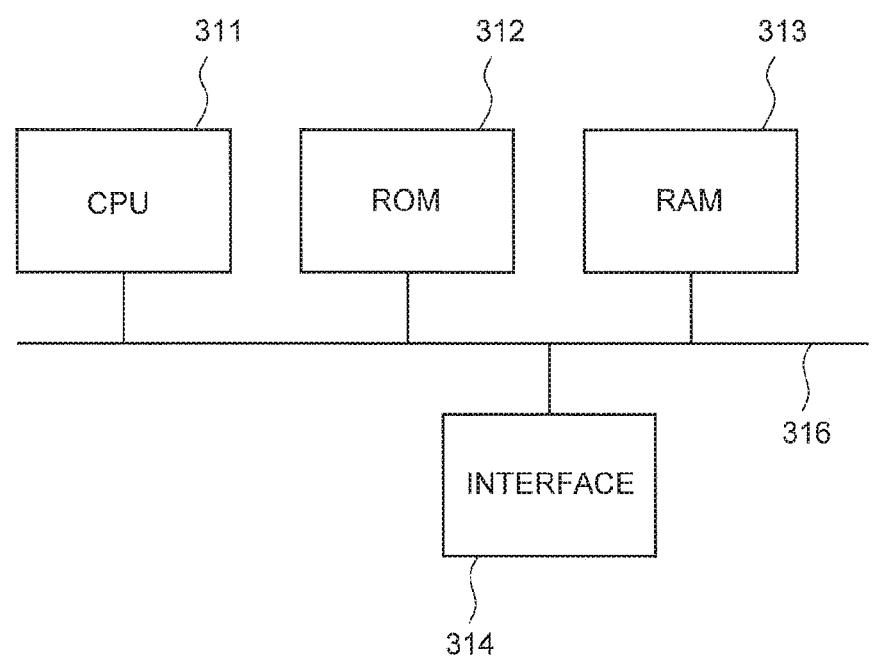
FIG. 11 is a diagram illustrating a hardware configuration of a settlement terminal included in the settlement system as illustrated in FIG. 1.

The hardware configuration of the settlement terminal 300 is illustrated in FIG. 11.

The hardware includes a CPU 311, a ROM 312, a RAM 313, and an interface 314, which are interconnected by a bus 316.

The CPU 311 is an operational device that performs operations. The CPU 311, for example, executes a computer program recorded in the ROM 312 to thereby execute the processing to be described later. This computer program may have been pre-installed in the settlement terminal 300, or may be installed in an ex-post manner. The installation of this computer program in the settlement terminal 300 may be performed via the predetermined recording medium such as the memory card, or may be performed via the network such as the LAN or the Internet.

The ROM 312 has recorded the computer program and data required to execute the processing to be described later by the CPU 311. The computer program recorded in the ROM 312 is not limited thereto, and any other necessary computer programs may be recorded.

The RAM 313 provides a work area required to perform the processing by the CPU 311.

The interface 314 performs data exchange between the CPU 311, the RAM 313 and the like, which are connected via the bus 316, and the outside. The Interface 314 is at least connected to the transmission and reception unit, whose illustration is omitted. The data received by the transmission and reception unit from the network 400 is received by the interface 314, and the data passed from the interface 314 to the transmission and reception unit is sent by the transmission and reception unit, via the network 400 to the outside, for example, to the settlement device 200.

The interface 314 is also connected to the input device provided on the touch panel display so as to accept input from the input device. The interface 314 is connected to the touch panel display so as to send data for displaying the images to be described later, to the touch panel display.

Figure 12:
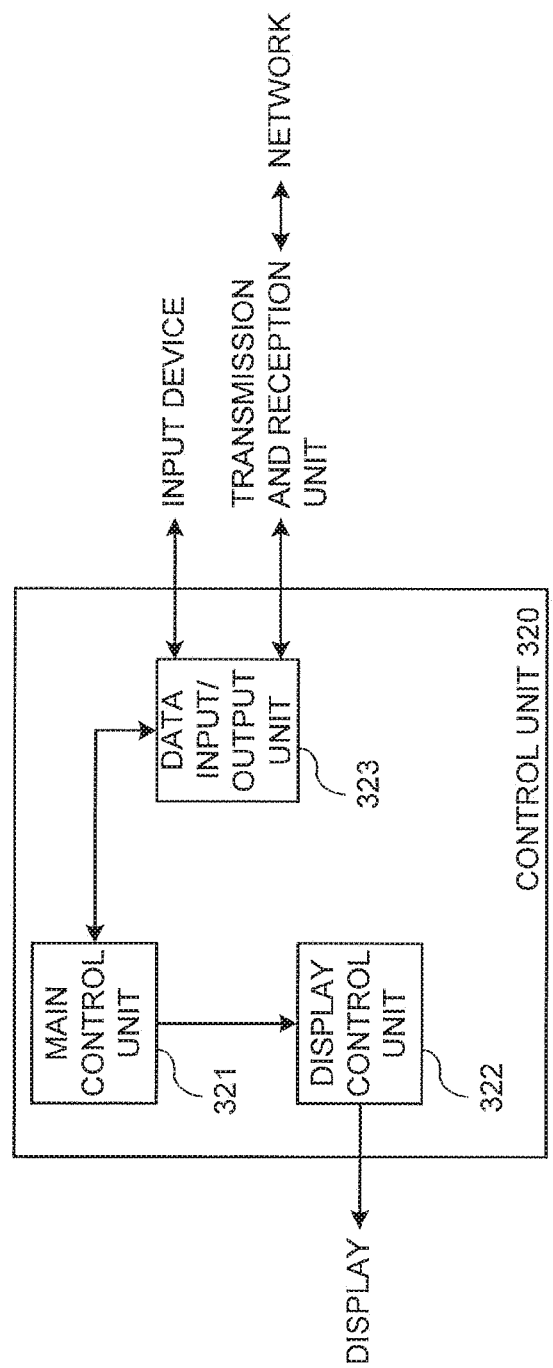
FIG. 12 is a block diagram illustrating functional blocks generated in the settlement terminal included in the settlement system as illustrated in FIG. 1.

Functional blocks as illustrated in FIG. 12 are generated within the settlement terminal 300 by executing the computer program by the CPU 311. It should be noted that while the following functional blocks may be generated with functions of the above-mentioned computer program alone for causing the settlement terminal 300 to function as the settlement terminal of the invention of the present application, the following functional blocks may be generated in cooperation with the above-mentioned computer program and the OS and other computer programs installed in the settlement terminal 300.

A control unit 320 as follows is generated within the settlement terminal 300 in connection with the functions of the invention of the present application, and a main control unit 321, a display control unit 322, and a data input/output unit 323 are generated within the control unit 320.

The control unit 320 executes the information processing as described below.

The main control unit 321 performs the entire control within the control unit 320. For example, the main control unit 321 performs control of the display control unit 322 based on data received from the data input/output unit 323 to be detailed later.

The main control unit 321 receives the user ID, the one-time password generated in the user terminal 100, the settlement application information, and the amount information from the data input/output unit 323 to be described later. Then, when all of them have been received, they are sent to the data input/output unit 323. The main control unit 321 may receive the settlement terminal cancellation information to be described later, from the data input/output unit 323. If the main control unit 321 has received the settlement terminal cancellation information, the main control unit 321 sends it to the data input/output unit 323 at an appropriate timing. Moreover, the main control unit 321 holds the settlement terminal ID unique to each settlement terminal 300 in order to distinguish each settlement terminal 300. The settlement terminal ID is included in the settlement application information by the main control unit 321.

The display control unit 322 performs control of the images to be displayed on the touch panel display under control of the main control unit 321. The images based on data sent from the display control unit 322 are displayed on the display. The main control unit 321 sends an instruction on what image should be displayed on the display, to the display control unit 322.

The data input/output unit 323 performs data input and output to the control unit 320. Specifically, the data input/output unit 323 receives the input from the input device. An example of data inputted from the input device to the data input/output unit 323 is as described above, and includes the user ID, the one-time password, and the settlement application information. They are sent to the main control unit 321. Moreover, the settlement terminal cancellation information may be inputted from the input device.

Moreover, the data input/output unit 323 outputs the data to the transmission and reception unit, whose illustration is omitted. The data outputted to the transmission and reception unit includes, for example, the user ID, the one-time password, the settlement application information, the amount information, and the settlement terminal cancellation information, and they are sent from the transmission and reception unit to the settlement device 200 via the network 400. It should be noted that the user ID and the one-time password are as already described. The amount information is information identifying an amount of money that a person, who intends to perform the payment with the one-time password, intends to pay. The settlement application information is information for requesting the settlement device 200 to perform the final determination of the settlement. Moreover, the settlement terminal cancellation information is information indicating an indication of intention of the administrator of the settlement terminal 300 for cancellation of one of the past settlements that have already been finished, and is inputted by the administrator of the settlement terminal 300 with the input device. The settlement terminal cancellation information includes at least information identifying one of the past settlements that the administrator desires to cancel.

Figure 20:
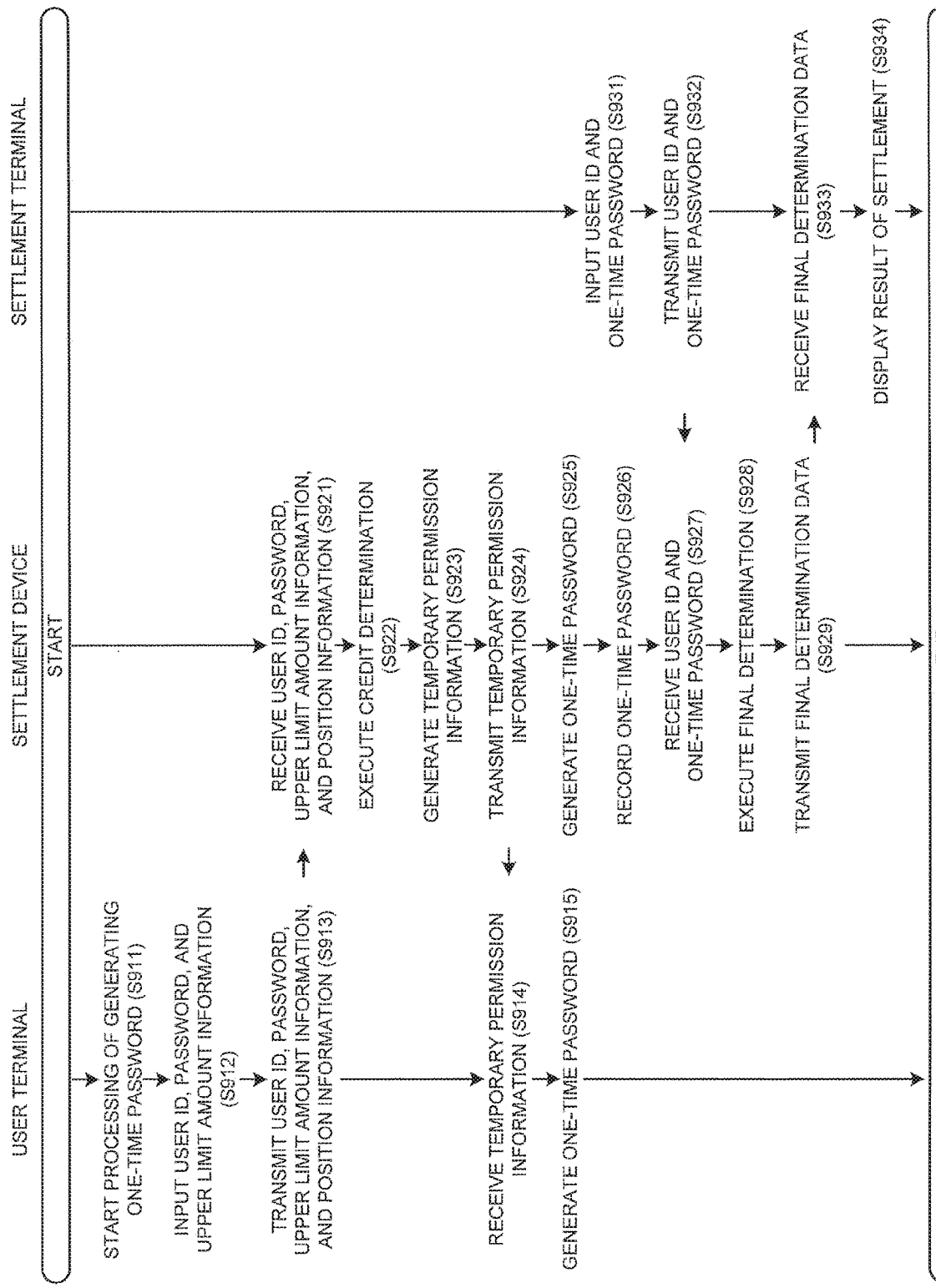
FIG. 20 is a diagram illustrating a flow of processing executed when a settlement is performed in the settlement system as illustrated in FIG. 1.

A method of using the settlement system as described above, and operations thereof will be described next with reference to FIG. 20.

When this system is used to perform the settlement, first, the user operates the user's own user terminal 100 to start the settlement processing (S911). This operation is, more specifically, an operation for starting the generation of the one-time password. As the operation, the user inputs information indicating the start of the processing. For example, this information can be inputted by touching an icon displayed on the display 101 of the user terminal 100, whose illustration is omitted.

The information is sent from the data input/output unit 123 to the main control unit 121. When the main control unit 121 accepts the information, the main control unit 121 sends an instruction to display such an image for prompting the user to input the user ID and the like on the display 101, to the display control unit 122. The display control unit 122, which has accepted this instruction, displays, for example, an image for prompting the user to input the user ID, the password, and the amount for which the user intends to perform the payment, on the display 101, as illustrated in FIG. 13(A). The user inputs the user ID on the right of a field denoted as "User ID," inputs the password on the right of a field denoted as "Password," and inputs the upper limit amount that is the upper limit of the amount for which the user intends to pay on the right of a field denoted as upper limit amount in yen respectively (S912). Data on the user ID and the password, which have been inputted by the user, is inputted from the input device 102 to the data input/output unit 123, and sent to the main control unit 121. While information identifying the upper limit amount is the upper limit amount information, this upper limit amount information is also similarly sent to the main control unit 121. Since the user ID, the password, and the upper limit amount, which have been inputted by the user, are displayed on the display 101, also including during the input, under control of the display control unit 122 controlled by the main control unit 121, the user can input the user ID, the password, and the upper limit amount while checking the display 101. According to an example illustrated in FIG. 13(B), the user intends to use this settlement system to make the own user terminal 100 issue a one-time password to perform the payment of 25000 yen.

As illustrated in FIG. 13(A), in this embodiment, on a lower side of a screen prompting the user to input the user ID and the like, check boxes are displayed for causing the user to decide whether or not to split the upper limit amount, and whether or not to add the additional condition, but are not necessarily limited thereto. This display is realized through an instruction sent to the display 101 by the display control unit 122, according to an instruction from the main control unit 121.

When the user inputs a check in a check box on the left of characters saying "Split the upper limit amount" as illustrated in FIG. 13(B), the check means that the user has provided an indication of intention of "Split the upper limit amount." Similarly, when the user inputs a check in a check box on the left of characters saying "Add additional conditions" as illustrated in FIG. 13(B), the check means that the user has provided an indication of intention of "Add additional conditions."

It should be noted that, as will be described later, if the upper limit amount has not been split, one one-time password corresponding to the upper limit amount information corresponding to that one upper limit amount will be generated in the user terminal 100. In contrast, if the upper limit amount has been split into multiple split amounts, as many one-time passwords as the number of the split amounts, corresponding to respective pieces of spit amount information corresponding to the respective spit amounts will be generated.

Figure 14:
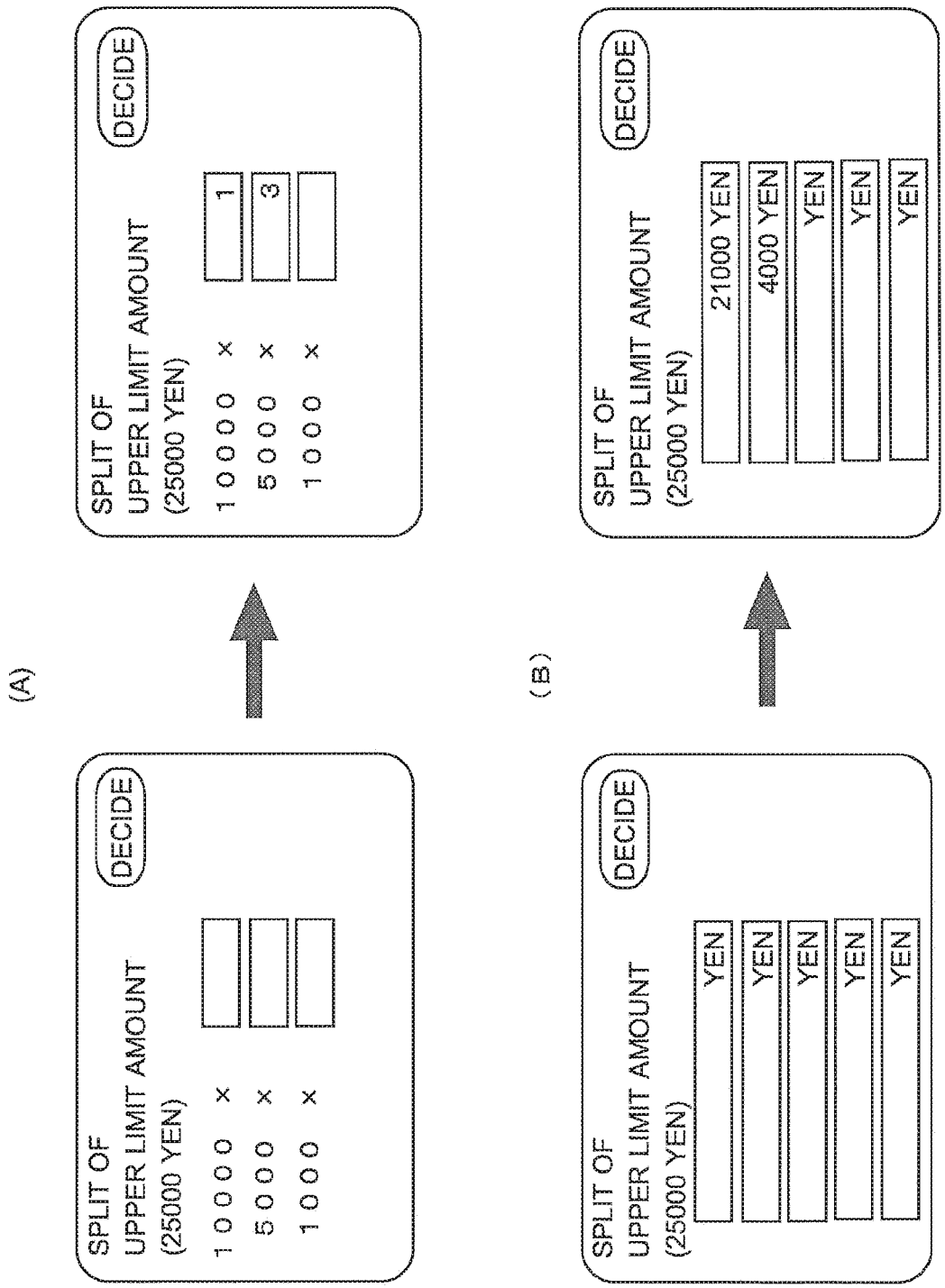
FIG. 14 is a diagram illustrating another example of the images displayed on the display of the user terminal included in the settlement system as illustrated in FIG. 1.

When the user inputs the check in the check box on the left of the characters saying "Split the upper limit amount," for example, an image as illustrated on the left side of FIG. 14(A) is displayed on the display 101. In this example, the split of the upper limit amount of 25000 yen into units of 10000 yen, 5000 yen, and 1000 yen, which are predefined units, is required. In this case, the user can decide how to combine 10000 yen, 5000 yen, and 1000 yen by selecting the number of each of them. In an example as illustrated on the right side of FIG. 14(A), a state of the upper limit amount of 25000 yen being split into one 10000 yen and three 5000 yen is illustrated.

Instead, an image as illustrated on the left side of FIG. 14(B) can be displayed on the display 101. In this case, how to split 25000 yen is completely left to the user, and merely multiple simple frames are prepared for the user to write amounts after the split of the upper limit amount. In an example as illustrated on the right side of FIG. 14(B), a state of the upper limit amount of 25000 yen being split into 21000 yen and 4000 yen is illustrated.

In either case of FIGS. 14(A) and 14(B), when the user clicks an upper right button saying "Decide," the upper limit amount is split in a manner inputted by the user, and is defined, and then the display of the display 101 returns to a state of FIG. 13. According to the input by the user, the upper limit amount will be represented as a sum of the split amounts by the split amount information identifying the multiple split amounts (in the above-mentioned former example, one 10000 yen, three 5000 yen, which are a total of four split amounts, and in the above-mentioned latter example, one 21000 yen and one 4000 yen, which are a total of two split amounts). This processing is performed by the main control unit 121. In this embodiment, it is assumed that the latter of the above-mentioned cases has been selected by the user.

When the user inputs the check in the check box on the left of the characters saying "Add additional conditions," for example, an image as illustrated in FIG. 15(A) is displayed on the display 101. This display is realized through the instruction sent to the display 101 by the display control unit 122, according to the instruction from the main control unit 121.

In this example, as the additional condition, content indicating limitation of any of a place of a payment recipient, a business type and the like of the payment recipient, and a payment period can be selected as the additional condition. The user can operate the input device 102 to select arbitrary one of them. In an example of FIG. 15(A), a check inputted in any of check boxes positioned on the left of three choices means that the choice corresponding to the checked check box has been selected by the user.

The check has been inputted in all the check boxes in FIG. 15(B). In this embodiment, in addition to only one check box, the user can input the check in multiple check boxes and thereby add multiple additional conditions to the one-time password to be described later, which is created from one piece of the upper limit amount information, which, however, is not necessarily required. It should be noted that, in this embodiment, only one one-time password may be created, or multiple one-time passwords may be created, from one piece of the upper limit amount information.

If the multiple one-time passwords are generated from one piece of the upper limit amount information, all of the additional conditions to be set to all of the one-time passwords may or may not be the same. As is self-evident at least for those skilled in the art, if the additional conditions are set to the respective split amounts causing the respective one-time passwords to be generated, for example, as follows, the additional conditions to be set to the multiple one-time passwords created from one piece of the upper limit amount information can be different from one another. In this embodiment, if the multiple one-time passwords are generated from one piece of the upper limit amount information, the additional conditions to be set to all of the one-time passwords can be different, which, however, is not limited thereto.

When the user inputs a check in a check box on the left of characters saying "Limit the place of the payment recipient," the settlement terminal 300 that can receive the payment is restricted by sending the one-time password to the settlement device 200 so that the payment is allowed only when the one-time password generated in the user terminal 100 has been sent to the settlement device 200 from the settlement terminal 300, which exists close to the position of the user terminal 100 when the user terminal 100 has generated the upper limit amount information and sent the upper limit amount information with other data to the settlement device 200, as will be described later. It should be noted that, while the additional information may also be generated below, if multiple pieces of the additional information are generated, the multiple pieces of the additional information are collected as one piece of the additional information including the multiple additional conditions.

When the user inputs the check in the check box on the left of the characters saying "Limit the place of the payment recipient," data for performing the above-mentioned restriction related to the payment with the one-time password, that is, the additional information will be generated by the main control unit 121.

When the user inputs a check in a check box on the left of characters saying "Limit the business type and the like of the payment recipient," for example, an image as illustrated in FIG. 16(A) is displayed on the display 101. In this example, the business type and the like of the payment recipient with the one-time password can be restricted in four formats.

Four restrictions in this example include, from the top, a restriction of the business type of the payment recipient, a restriction of a group of the payment recipient, a restriction of a facility of the payment recipient, and a restriction of a store of the payment recipient.

"Business type" in the restriction of the business type of the payment recipient corresponds to data of "business type name" recorded in the settlement terminal information recording unit 226, and specific examples thereof include restaurants, books, clothing, jewelry, beauty, travel agencies, brick-and-mortar store retail, the Internet retail, and the like. The user can write one of the above-illustrated business types in a frame on the right of a section of "Business Type" (it would be further convenient if multiple selection is also possible), and thereby restrict the payment recipient with the one-time password only to the written business type. It should be noted that, for this selection, a suggestion function or a pull-down menu function, which are well known or publicly known, can be used to reduce a burden placed on the user. It should be noted that this is also similar in other cases. It should be noted that, in order to realize such a suggestion function or such a pull-down function, for example, necessary data from the various data recorded in the settlement terminal information recording unit 226 of the settlement device 200 may have been recorded in the recording medium included in the user terminal 100, or the necessary data from the data recorded in the settlement terminal information recording unit 226 of the settlement device 200 may have been made available to the user terminal 100. In either case, such specifications can be realized by a publicly known or well-known technology.

"Group" in the restriction of the group of the payment recipient generally corresponds to data of "enterprise name" recorded in the settlement terminal information recording unit 226, and is made by removing the store name from the data of "enterprise name" recorded in the settlement terminal information recording unit 226 (for example, made by removing "Shimbashi branch" from data of "McDonald's (Shimbashi branch)," for the settlement terminal of the settlement terminal ID of 1 in FIG. 8). In this case, the user writes "McDonald's," "Starbucks," or the like in a frame on the right of a section of "Group" (it would be further convenient if the multiple selection is also possible). Thus, the payment performed with the one-time password becomes possible only in the case of the payment to a specific group enterprise.

"Facility" in the restriction of the facility of the payment recipient corresponds to data of "facility name" recorded in the settlement terminal information recording unit 226, and an example thereof is a name of the commercial facility such as the shopping mall or the commercial building. The user can write one of facility names in a frame on the right of a section of "Facility" (it would be further convenient if the multiple selection is also possible), and thereby restrict the payment recipient with the one-time password only to a case where the one-time password has been sent from the settlement terminal 300 placed at the store positioned within the written facility, to the settlement device 200.

"Store" in the restriction of the store of the payment recipient corresponds to the data of "enterprise name" recorded in the settlement terminal information recording unit 226, and identifies each store where the settlement terminal 300 is placed. In this case, the user performs writing to identify a specific store such as "McDonald's (Shimbashi branch)" as a pinpoint in a frame on the right of a section of "Store" (it would be further convenient if the multiple selection is also possible). Thus, the payment performed with the one-time password becomes possible only if the one-time password has been sent from the settlement terminal 300 placed in the specific store, to the settlement device 200.

When the user clicks an upper right button saying "Decide" on the display in FIG. 16, data for limiting the business type and the like of the payment recipient, that is, the additional information is generated by the main control unit 121, and the display of the display 101 returns to a state of FIG. 15.

It should be noted that, in the above restrictions in the four formats, the restrictions in multiple formats can also be employed in combination. In that case, it is also free to enable or disable the user to decide whether multiple restrictions are related to one another with "and" or "or," or the like. It should be noted that, in FIG. 16(B), a state is illustrated where "○○ mall" has been selected as the restriction of the business type and the like of the payment recipient. In this case, the restriction is imposed to the one-time password such that the payment is allowed only if the one-time password has been sent from the settlement terminal 300 placed in a store within a facility named "○○ mall," to the settlement device 200.

When the user inputs a check in a check box on the left of characters saying "Limit the payment period," for example, an image as illustrated in FIG. 17(A) is displayed on the display 101. In this example, a period of the payment with the one-time password is restricted by specifying a start time thereof and an end time thereof, respectively.

"YYYY/MM/DD/hh/mm" is written on the right of each of sections of "Start Payment" and "End Payment" on the display 101 as illustrated in FIG. 17(A). As is well known, among them, "YYYY" denotes the Christian era, "MM" demotes the month, "DD" denotes the date, "hh" denotes the hour, and "mm" denotes the minute, respectively.

The user can select a period in which the payment with the one-time password is possible, by himself by writing in the above-described sections of "Start Payment" and "End Payment," for example, as illustrated in FIG. 17(B). In this example, the period in which the payment with the one-time password is possible is one day on Dec. 25, 2016.

When the user clicks an upper right button saying "Decide" on the display in FIG. 17, data for limiting the payment period, that is, the additional information is generated by the main control unit 121, and the display of the display 101 returns to the state of FIG. 15.

Finally, when the user clicks an upper right button saying "Decide" displayed on the display 101 in the state of FIG. 15, the additional conditions are defined, and the additional information is also defined accordingly. Then, the display of the display 101 returns to the state of FIG. 13.

It should be noted that, regarding a way of limiting the payment period, regardless of the illustration, for example, a restricted time since an appropriate timing after the start of processing for generating the one-time password in the user terminal 100, or as a more practical illustration, since the generation of the temporary permission information, may be identified. For example, the user may be enabled to provide a limit of the payment period, such as 30 minutes within the generation of the temporary permission information, on the user's own will.

After the input of the user ID, the password, and the upper limit amount information has been finished, and the split of the upper limit amount information and the generation of the additional information have been performed if necessary, when the display of the display 101 is put into the state of FIG. 13, the user clicks a button saying "Decide" displayed on the display 101.

When the user clicks the button saying "Decide," the GPS mechanism generates the position information on the user terminal, which is information identifying a position where the user terminal 100 exists. The position information is sent from the data input/output unit 123 to the main control unit 121. In addition to the user ID, the password, and the upper limit amount information (multiple pieces of the split amount information may be included), possibly as well as the additional information, the main control unit 121 collects the position information, and the terminal information recorded in the recording medium of the main control unit 121, whose illustration is omitted, all together and sends them to the data input/output unit 123. The data input/output unit 123 collectively sends the data to the transmission and reception unit, and the transmission and reception unit collectively sends the data to the settlement device 200 via the network 400 (S913). Since the user clicks the button saying "Decide," transmission of the above five pieces of the data to the settlement device 200 is executed at least, for example, within several seconds generally in real time.

The settlement device 200 accepts the data at its transmission and reception unit (S921). The transmission and reception unit sends all of the data to the data input/output unit 221, and the data input/output unit 221 sends all of the data to the main control unit 222. The main control unit 222 sends the user ID, the password, the terminal information, and the upper limit amount information to the credit determination unit 223.

The credit determination unit 223 executes the credit determination (S922). The credit determination is specifically executed as follows.

When the credit determination unit 223 receives the user ID, the password, and the terminal information from the main control unit 222, the credit determination unit 223 reads out the password, the terminal information, and the credit balance, which are associated with the user ID identical to the received user ID, from the credit information recording unit 224. If the user ID identical to the user ID received by the credit determination unit 223 does not exist in the credit information recording unit 224, the credit determination unit 223 does not read out the information such as the password from the credit information recording unit 224. In this case, the credit determination unit 223 ceases the processing of the credit determination.

In this embodiment, as illustrated in FIG. 13(B), since the user ID inputted to the user terminal 100 by the user is "d2af1apfa," and the user ID identical thereto exists on the second row from the top of the credit information recording unit 224 (FIG. 7), the credit determination unit 223 reads out the password (aofau554), the terminal information (012457854), and the credit balance (2956002 yen), which are linked to the user ID, from the credit information recording unit 224.

If the user ID identical to the user ID received from the main control unit 222 by the credit determination unit 223 has been recorded in the credit information recording unit 224, and if the password, the terminal information, and the credit balance, which are associated with the user ID identical to the user ID received from the main control unit 222, have been read out from the credit information recording unit 224, the credit determination unit 223 determines whether or not the password and the terminal information, which have been received from the main control unit 222, are identical to the password and the terminal information which have been read out from the credit information recording unit 224. If they have matched each other, the credit determination unit 223 authenticates that the user who has sent the user ID and the like is the legitimate user. In contrast, if at least one of the password and the terminal information has not matched, it is determined that the user who has sent the user ID and the like is not the legitimate user, and the credit determination processing is ceased.

Next, the credit determination for the authenticated user is executed. The credit determination unit 223 compares the upper limit amount information sent by the user, to the credit balance read out from the above-described credit information recording unit 224, which has been linked to the user ID of the user. In this embodiment, if the credit balance is equal to or larger than the amount identified by the upper limit amount information, the settlement asked by the user is allowed, which, however, is temporal. In contrast, if the credit balance is smaller than the amount identified by the upper limit amount information, the settlement asked by the user is not allowed. In this example, since the credit balance (2956002 yen) is larger than the amount (25000 yen) identified by the upper limit amount information, the settlement asked by the user is allowed. If this settlement is allowed, the credit determination unit 223 generates the temporary permission information (S923). If the credit determination unit 223 has generated the temporary permission information, the temporary permission information is sent to the main control unit 222.

It should be noted that, if the credit determination unit 223 has generated the temporary permission information, the credit determination unit 223 notifies the main control unit 222 of the time information for identifying the time when the credit determination has been performed. This time information is sent from the main control unit 222 to the final determination unit 225, along with the user ID in order to identify who is the user who has been temporarily allowed the settlement in the temporary permission information.

The main control unit 222 sends the temporary permission information to the data input/output unit 221. The data input/output unit 221 transmits the temporary permission information to the user terminal 100 via the transmission and reception unit and the network 400 (S924).

Meanwhile, when the main control unit 222 receives the temporary permission information, the main control unit 222 sends the instruction to generate the one-time password, to the OTP generation unit 227.

The user ID received by the main control unit 222 is attached to the instruction to generate the one-time password. The OTP generation unit 227 reads out the initial value and the number of generation, which are linked to the user ID corresponding to that user ID, from the OTP information recording unit 228. Moreover, in the instruction to generate the one-time password, if the upper limit amount information includes the split amount information, information identifying at least the number of pieces of the split amount information (or may also be the split amount information itself) is included.

Processing of generating the one-time password performed by the OTP generation unit 227 with information on the initial value and the number of generation, which have been recorded in the OTP information recording unit 228, becomes exactly the same as processing of generating the one-time password, which is executed as will be described later in the user terminal 100 that has transmitted the upper limit amount information or the like sent for generating the temporary permission information. Accordingly, unless there is fraud by a third party somewhere in the generation of the one-time password performed in the user terminal 100, the transmission of the one-time password from the settlement terminal 300 to the settlement device 200, or the like, the processing of generating the one-time password performed in the user terminal 100 and the processing of generating the one-time password performed in the settlement device 200 are completely synchronized. The one-time password is linked to the upper limit amount information. When the upper limit amount information includes the multiple pieces of the split amount information, the one-time password is linked to each of the multiple pieces of the split amount information. In other words, in the latter case, as many one-time passwords as the number of pieces of the split amount information will be generated. For example, as mentioned above, in this embodiment, a case has been illustrated where the upper limit amount information identifying the upper limit amount of 25000 yen, which has been generated in the user terminal 100, includes two pieces of the split amount information, that is, the split amount information identifying the split amount of 21000 yen, and the split amount information identifying the split amount of 4000 yen. In that case, the OTP generation unit 227 generates two one-time passwords to be linked to the respective pieces of the split amount information (S925).

When the OTP generation unit 227 has generated the one-time password, the OTP generation unit 227 sends the one-time password or the one-time passwords to the main control unit 222 with the user ID, in order to identify which user or which user terminal 100 each one-time password has been generated for. As mentioned above, the main control unit 222 has previously received the user ID, the password, and the upper limit amount information, and possibly the additional information in advance. When the main control unit 222 receives the one-time password, the main control unit 222 records the user ID, the one-time password, the upper limit amount information (or the split amount information), and the additional information, if any, in a state of being linked to one another in the virtual balance recording unit 229 (S926). Then, the upper limit amount is recorded as virtual balance information identifying the virtual balance, in the virtual balance recording unit 229. The virtual balance indicates the amount limit for one one-time password at the time point when the payment can be performed with one one-time password, and has a property in which the virtual balance becomes smaller each time the payment with the one-time password has been performed. The upper limit amount is used as an initial value of the virtual balance.

As described in the example of FIG. 10, two one-time passwords including one-time passwords of 01563894451 and f23aa012200 are made to correspond to the user ID of d2af1apfa. Moreover, these two one-time passwords are made to correspond to two virtual balances (upper limit amounts) of 21000 yen and 4000 yen, respectively. Moreover, as recorded in the virtual balance recording unit 229, the one-time password of 01563894451 has been provided with the additional condition that the payment with the one-time password is possible only in response to a request from the settlement terminal 300 placed in the store within the shopping mall named "○○ mall," and the one-time password of f23aa012200 has been provided with the additional condition that the payment with the one-time password is possible only in response to a request from the settlement terminal 300 close to the user terminal.

It should be noted that both the processing of S925 and S926 and the processing of S924 as described above may be executed after the generation of the temporary permission information, regardless of the order of the processing.

The transmission and reception unit of the user terminal 100 receives the temporary permission information sent from the settlement device 200 (S914). The received temporary permission information is sent from the data input/output unit 123 to the main control unit 121. The main control unit 121, which has received the temporary permission information, notifies the OTP generation unit 124 of the reception of the temporary permission information.

The OTP generation unit 124, which has received this notification, generates the one-time password (S915). The OTP generation unit 124 has the initial value for generating the one-time password, and has recorded the number of generation indicating how many times the one-time password has been generated in the past. Moreover, the OTP generation unit 124 can use the mathematical expression for generating the one-time password (that is, the algorithm). The OTP generation unit 124 generates the values one after another by repeating processing of assigning the initial value to the above-mentioned mathematical expression and assigning the obtained value to the mathematical expression again to obtain the next value. The OTP generation unit 124 sets the value created at the number of times larger than the number indicated by the number of generation by one, as the one-time password to be used then. This processing of generating the one-time password is the same as the processing executed in the settlement device 300. The number of the one-time passwords to be generated is one if the upper limit amount information, which has caused the reception of the temporary permission information and has been sent from the user terminal 100 to the settlement device 200, does not include the split amount information; and the number of the one-time passwords to be generated is the same number as the number of pieces of the split amount information if the upper limit amount information includes the multiple pieces of the split amount information. This situation is also similar to the settlement device 300.

The generated one-time password is sent to the main control unit 121. The main control unit 121 sends an instruction to display the one-time password on the display 101, to the display control unit 122. For example, an image as illustrated in FIG. 18(A) is displayed on the display 101 under the display control of the control unit 122. If the multiple one-time passwords have been generated, all of them are indicated to the user by collectively displaying the multiple one-time passwords on the display 101, or by switching the display to thereby consecutively display the multiple one-time passwords on the display 101. Moreover, these one-time passwords are saved, for example, in the main control unit 121 so that they can be displayed on the display 101 whenever there is a request from the user.

This one-time password is utilized like a credit card number in the conventional settlement system using the credit cards, but has a limited time during which the one-time password is valid (can be used in the settlement), as will be described later. From the side of calling the user's attention, as illustrated in FIG. 18(A), such a display as "This one-time password is valid for a week from now" is preferably performed on the display 101 at an appropriate timing, regardless of whether or not the display is performed along with the one-time password.

It should be noted that, as mentioned above, the credit determination unit 223 of the settlement device 200 may also not generate the temporary permission information, if the credit determination has been ceased, if the credit balance for the user has been insufficient, or the like. In this case, naturally, the temporary permission information is not transmitted to the user terminal 100. However, also in this case, some data may be transmitted from the settlement device 200 to the user terminal 100, and a fact that the temporary permission information has not been generated in the settlement device 200 (from the user's viewpoint, a procedure of the settlement cannot be continued), and a reason thereof, if required, may be displayed on the display 101 of the user terminal 100.

In that case, for example, such an image as illustrated in FIG. 18(B) is displayed on the display 101 of the user terminal 100. This image is also displayed on the display 101 by the display control unit 122, according to the instruction from the main control unit 121. In the case of this figure, as is apparent from a check in a square check box on the left, it is indicated to the user that the reason why the procedure of the settlement cannot be continued is because the password is not correct.

When the one-time password is displayed on the display 101 of the user terminal 100, the user is put into a state where the user can perform the payment to the third party with the one-time password, except where the payment is not allowed due to the additional condition.

The user passes the one-time password to the settlement terminal 300 at the user's desired timing, for example, by inputting the one-time password to the settlement terminal 300 (S931). If the one-time password has previously been generated, the one-time password will be passed to the settlement terminal 300 without time and effort.

As mentioned above, the settlement terminal 300 includes the touch panel display, whose illustration is omitted. On the touch panel display, for example, as illustrated in FIG. 19(A), a display for prompting the user or the like to input the user ID, the one-time password, and the payment amount is performed. The payment amount is information identifying an amount to be paid to the administrator of the settlement terminal 300 by the user, and data generated by the input thereof is the amount information as described in the present application. This display is performed by the display control unit 322 under control of the main control unit 321 of the settlement terminal 300. The user inputs the user ID on the right of a field displayed as "User ID," inputs the one-time password on the right of a field displayed as "OTP," and inputs the payment amount on the right of a field displayed as "Payment amount" through manual operations on the touch panel display.

The state in which the user operates the display of the settlement terminal 300 to input the user ID, the one-time password, and the payment amount is shown in FIG. 19(B). Since the user ID and the one-time password, which have been inputted by the user, are displayed on the display, also including during the input, under control of the display control unit 322 controlled by the main control unit 321, the user can input the user ID and the one-time password while checking the display.

It should be noted that, in this embodiment, the one-time password generated through the manual input from the user in the user terminal 100 is to be passed to the settlement terminal 300, which, however, is not limited thereto, and also, for example, after the display 101 of the user terminal 100 is imaged by a camera included in the settlement terminal 300 or connected to the settlement terminal 300, predetermined image processing can be performed for an image including the display 101 in the settlement terminal 300, so that the settlement terminal 300 may identify the one-time password displayed on the display 101. Alternatively, the one-time password displayed as a one-dimensional or two-dimensional bar code on the display 101 of the user terminal 100 is read by a bar-code reader included in the settlement terminal 300, and thereby, the one-time password generated in the user terminal 100 can also be passed to the settlement terminal 300. Moreover, the one-time password can also be passed as data from the user terminal 100 to the settlement terminal 300 through wireless communication such as Bluetooth or infrared communication. It should be noted that, if the one-time password is passed from the user terminal 100 to the settlement terminal 300 through the wireless communication, the one-time password is not necessarily required to be displayed on the display 101 of the user terminal 100.

It should be noted that a method of delivering the one-time password from the user terminal 100 to the settlement terminal 300 is not limited thereto. The user can print the one-time password generated in the user terminal 100, or information identifying the one-time password on paper, for example, with a publicly known or well-known printer owned by the user. In this case, the user is not required to generate the one-time password at a place where the user intends to perform the payment (in a store, or near the store), and may perform the generation at home or a place where the printer exists. The paper having the one-time password printed thereon can be used as a cash voucher similarly to money (or paper money), and as a tool for the payment through delivery of the paper. The user can perform the settlement by delivering the cash voucher to the administrator of the settlement terminal 300. An example of this cash voucher is illustrated in FIGS. 23 and 24.

FIG. 23 is an example of a cash voucher having the one-time password printed thereon, in which FIG. 23(A) illustrates a front side of one cash voucher, and FIG. 23(B)

illustrates a back side of the cash voucher. The one-time password is printed on the cash voucher. In this embodiment, while a number of 01563894451 has been generated as the one-time password in the user terminal 100, as an example, the first half thereof is printed as a part of the one-time password (OTP1) on the front side of the cash voucher, and the second half thereof is printed as a rest part of the one-time password (OTP2) on the back side of the cash voucher. While the entire one-time password may be printed on either of the front side or the back side of the cash voucher, when the one-time password is printed across both sides of the cash voucher in this way, it becomes difficult for a malicious third party to steal a glance at the entire one-time password or secretly take a photo thereof. Moreover, on the cash voucher in FIG. 23, a face F of a person supposed to use this cash voucher to perform the payment (the person is not necessarily the user who has generated the one-time password) is printed. With such a cash voucher, it is possible to make a rule that only if a face of a person who has passed the cash voucher to the administrator of the settlement terminal 300 has matched the face printed on the cash voucher, the administrator of the settlement terminal 300 performs subsequent processing related to the settlement, and execution of such a rule can reduce a risk of fraudulent use of a cash voucher (fraudulent payment) by a person who has fraudulently obtained the cash voucher. It should be noted that, in this example, while the face F of the user or the like is printed on both the front and back sides of the cash voucher, the face F only needs to be printed on any one side of the cash voucher. The administrator of the settlement terminal 300, who has received such a cash voucher, can input one part and the rest part of the one-time password described on the front and back sides of the cash voucher, to the settlement terminal 300 by using a numeric keypad or other input devices, or by imaging them with the camera. If the face F is different from a person other than the user, a person who has been legitimately transferred the cash voucher from the user can use the cash voucher to perform the settlement.

The cash voucher in FIG. 24 has the information for identifying the one-time password printed on the paper, instead of the one-time password. As an example of the information for identifying the one-time password, the two-dimensional bar code is employed in this embodiment. Also in the case of the cash voucher as illustrated in FIG. 24, one part of the one-time password is printed on the front side of the cash voucher, and the rest part of the one-time password is printed on the back side of the cash voucher. The two-dimensional bar code printed on the side as illustrated in FIG. 24(A) corresponds to OTP1 described in FIG. 23(A), and also, the two-dimensional bar code printed on the side as illustrated in FIG. 24(B) corresponds to OTP2 described in FIG. 23(B), and when those two-dimensional bar codes are read by a predetermined two-dimensional bar-code reader, respective values corresponding to OTP1 and OTP2 are read out. Moreover, as is the case of the cash voucher as illustrated in FIG. 23, the cash voucher as illustrated in FIG. 24 also has the face F of a person, who is scheduled to use the cash voucher, printed on both the front and back sides thereof. The administrator of the settlement terminal 300, who has received such a cash voucher, can input the one-time password to the settlement terminal 300, for example, by using the bar-code reader to read the two-dimensional bar codes printed on the front and back sides of the cash voucher.

It should be noted that, if the multiple one-time passwords are generated in the user terminal 100, the above-mentioned cash voucher may be printed for each one-time password.

In either case, after the user or the administrator of the settlement terminal 300 finishes the input of the user ID, the password, and the amount information, the user or the administrator of the settlement terminal 300 clicks the button saying "Decide," which is displayed on the display.

When the user or the like clicks the button saying "Decide," content of the input is sent from the data input/output unit 323 to the main control unit 321. When the main control unit 321 receives the content of the input, the main control unit 321 generates the settlement application information. The settlement application information is the information for requesting the settlement device 200 to perform the final determination of the settlement, from the administrator of the settlement terminal 300. The settlement terminal ID for identifying the settlement terminal 300 is also included in the settlement application information. The main control unit 321 collects the settlement application information, the user ID, the one-time password, and the amount information, all together, and sends them to the transmission and reception unit of the settlement terminal 300 via the data input/output unit 323, and sends them from the transmission and reception unit to the settlement device 200 via the network 400 (S932).

The settlement device 200 receives those pieces of the data comprising the one-time password sent from the settlement terminal 300, at its transmission and reception unit (S927). The settlement application information, the user ID, the one-time password, and the amount information sent from the settlement terminal 300 are sent to the main control unit 222 vie the data input/output unit 221.

The main control unit 222 sends the data of the settlement application information, the user ID, and the one-time password sent from the settlement terminal 300, to the final determination unit 225. The final determination unit 225 performs the final determination (S928).

The final determination is performed as follows.

When the final determination unit 225 receives the settlement application information, the user ID, and the one-time password from the main control unit 222, the final determination unit 225 reads out a one-time password identical to the one-time password received from the main control unit 222, among them, along with the user ID, the virtual balance information, the time information, and the additional information, which are made to correspond to that identical one-time password, from the virtual balance recording unit 229. For example, if the one-time password sent from the user to the settlement device 200 via the settlement terminal 300 has been "01563894451" as illustrated in FIG. 18, since the one-time password identical thereto exists on the top of the virtual balance recording unit 229 as illustrated in FIG. 10, the final determination unit 225 reads out, in addition to this one-time password, the user ID of "d2af1apfa;" the virtual balance information identifying the virtual balance of "21000 yen;" the time information "2016/12/24/10/11" indicating that the one-time password has been generated at 10:11 on Dec. 24, 2016; and the additional information identifying the additional condition of "Only ○○ mall," from the virtual balance recording unit 229. If the one-time password identical to the one-time password received from the main control unit 222 has not been recorded in the virtual balance recording unit 229, the final determination unit 225 determines not to allow the payment. In other words, matching of both one-time passwords, that is, the one-time password generated in the user terminal 100 and the one-time password generated in the settlement device 200, becomes one of the conditions for the determination that the settlement is possible, in the final determination. This condition is valid because it is possible to assume that there is no fraud in all processes of the settlement, if both one-time passwords match each other. For example, it is possible to assume that there is no impersonation by the malicious third party with respect to a person who has used the user terminal 100 to generate the one-time password, and the administrator of the settlement terminal 300 who has sent the one-time password, and moreover, there is no attack by the malicious third party also during the transmission of the one-time password from the settlement terminal 300 to the settlement device 200.

It is assumed that the final determination unit 225 has successfully read out the one-time password identical to the one-time password received from the main control unit 222, along with the user ID, the virtual balance information, and the additional information, which are made to correspond to that identical one-time password, from the virtual balance recording unit 229. Then, the final determination unit 225 determines whether or not the user ID received from the main control unit 222 is identical to the user ID made to correspond to the one-time password in the virtual balance recording unit 229. If they do not match each other, it is because the user who has sent the one-time password and the like via the settlement terminal 300 may be the malicious third party.

If both user IDs have matched each other, the final determination unit 225 compares the amount identified by the amount information sent from the main control unit 222, to the amount identified by the virtual balance information read out from the virtual balance recording unit 229. As a result, the amount identified by the virtual balance information, which is equal to or larger than the amount identified by the amount information, becomes one of conditions for the final determination unit 225 to allow the payment asked by the user. This becomes the condition because money of the amount identified by the virtual balance information can also be considered as that has been deposited at the settlement device 200 or the administrator thereof from the user, in a way, and thus, if the payment has been allowed, reception of the money of the amount by the administrator of the settlement terminal 300 is generally ensured. For example, if the amount identified by the amount information sent from the user to the settlement device 200 via the settlement terminal 300 is "10000 yen" as illustrated in FIG. 18, and the amount identified by the virtual balance information is "21000 yen" as illustrated in FIG. 10, the above-described condition is satisfied.

Moreover, in the final determination in this embodiment, the final determination unit 225 compares the time identified by the time information, which has been generated by the credit determination unit 223 and recorded in the virtual balance recording unit 229, to a time when the final determination has been performed, and determines whether or not a time interval therebetween is within a predetermined time interval. The time interval within the predetermined time interval (in this embodiment, the time interval is one week as described with FIG. 18(A).) becomes one of the conditions for the determination that the settlement is possible, in the final determination in this embodiment, which, however, is not necessarily limited thereto. This condition is valid because reduction in the time interval can reduce a time in which the one-time password generated by the user terminal 100 can be stolen and fraudulently used by the third party, and thereby further increase the safety of the settlement. It should be noted that, in this embodiment, the time when the credit determination has been performed in the credit determination unit 223 is to be used as a starting point for measuring the above-mentioned time interval, and the time when the final determination is performed in the final determination unit 225 is to be used as an ending point for measuring the above-mentioned time interval. However, specifically, the starting point for measuring the above-mentioned time interval is not limited to the above-mentioned timing. The starting point for measuring the above-mentioned time interval can be an appropriate timing after the user operates the input device 102 of the user terminal 100 to thereby provide the first input required for the processing for this settlement, and before the final determination unit 225 performs the final determination. In other words, an arbitrary timing after S911 is started, and before the final determination is performed in the final determination unit 225, specifically, an arbitrary time point until a time instant when the temporary permission information arrives at the user terminal 100 from the settlement device 200, can be the starting point for measuring the above-mentioned time interval. Examples of an employable starting point include, for example, a timing when the upper limit amount information has been inputted in the user terminal 100; a timing when the button having characters saying "Decide" displayed thereon, which is displayed on the display 101 in the user terminal 100, has been clicked; a timing when the upper limit amount information and the like transmitted from the user terminal 100 have been received by the settlement device 200; a timing when the credit determination has been started in the credit determination unit 223; a timing when the transmission of the temporary permission information from the settlement device 200 to the user terminal has been started; and the like. Note that it is possible to set no valid for the one-time password generated in the user terminal 100 in this settlement system.

Moreover, if the additional information has been added to the one-time password for which the user has asked for the payment with this one-time password, the final determination unit 225 also regards the satisfaction of the additional condition indicated by the additional information, as one of the conditions for allowing the payment.

In the above-mentioned example, while the user has intended to use the one-time password of "01563894451" for the payment, the additional condition of "Only ○○ mall," that is, the additional condition that the payment is allowed only when the one-time password and the like have been sent from the settlement terminal 300 placed at the store within ○○ mall, to the settlement device 200, has been added to this one-time password, and thus, the final determination unit 225 determines whether or not this condition has been satisfied. As mentioned above, the settlement terminal ID, which is an identifier for identifying the settlement terminal 300 that has sent the settlement application information to the settlement device 200 with the one-time password and the like, has been added to the settlement application information. The final determination unit 225 reads out information (at least information required for the determination) on the store having the settlement terminal ID added, from the settlement terminal information recording unit 226, in order to perform the above-mentioned determination.

For example, it is assumed that the settlement terminal ID of 2 has been added to the settlement application information. In this case, as can be seen in FIG. 8, its facility name is "○○ mall," and the store where the settlement terminal 300 having the settlement terminal ID added is placed, is positioned in ○○ mall. In other words, in this case, the above-mentioned additional condition is satisfied.

The additional conditions include, for example, as mentioned above, the restriction of the business type of the payment recipient, the restriction of the group of the payment recipient, the restriction of the store, and the restriction of the facility of the payment recipient. While the above-mentioned additional information "○○ mall" corresponds to the restriction of the facility of the payment recipient, if the restriction of the business type of the payment recipient has been added to the one-time password as the additional condition, the final determination unit 225 reads out the data of the business type name linked to the settlement terminal ID added to the settlement application information, from the settlement terminal information recording unit 226, and determines whether or not the additional condition has been satisfied. Moreover, if the restrictions of the group and the store of the payment recipient have been added to the one-time password as the additional conditions, the final determination unit 225 reads out the data of the enterprise name linked to the settlement terminal ID added to the settlement application information, from the settlement terminal information recording unit 226, and determines whether or not the additional conditions have been satisfied.

Moreover, the payment period may also be restricted as the additional condition. In that case, the final determination unit 225 determines whether or not date and time at a time point when the final determination is performed satisfy the condition required in the additional condition (for example, in the case as illustrated in FIG. 17(B), for example, the additional condition is the condition that the payment with the one-time password is allowed only for one day on Dec. 25, 2016). It should be noted that, if this determination requires date and time of the generation of the temporary permission information, the final determination unit 225 may utilize the above-mentioned time information for this determination.

As mentioned above, the user may input the check in the check box on the left of the characters saying "Limit the place of the payment recipient" as illustrated in FIG. 15(B). The additional condition in this case becomes, in this embodiment, the second additional condition from the top of FIG. 10, that is, "Close to the user terminal," but is not limited thereto. In more detail, this additional condition is the condition that the payment is allowed only when the one-time password generated in the user terminal 100 has been sent to the settlement device 200 from the settlement terminal 300, which exists close to the position of the user terminal 100 when the user terminal 100 has generated the upper limit amount information and sent the upper limit amount information with other data to the settlement device 200, as will be described later.

If this additional condition exists, the final determination unit 225 reads out the position information from the settlement terminal information recording unit 226. In contrast, as mentioned above, to the additional information for identifying the additional condition of "Close to the user terminal," which has been recorded in the virtual balance recording unit 229, the position information indicating where the user terminal 100 has existed when the user has sent the upper limit amount information to the settlement device 200 has been added. If the additional condition of "Close to the user terminal" exists, the final determination unit 225 compares both pieces of the position information, and determines whether or not the user terminal 100 when the upper limit amount information has been inputted, and the settlement terminal 300 that has sent the one-time password and the like to the settlement device 200 are positioned close to each other, that is, whether or not a distance between both is in a positional relationship equal to or less than a predetermined distance. In this case, a fact that the positions identified by both pieces of the position information are closer than the predetermined distance, for example, 20 m, becomes one of the conditions for the determination that the settlement is possible, in the final determination. This condition is valid for the following reason. Simply stated, the position information sent from the user terminal 100 indicates where the user terminal 100 is located. Simply stated, the position information read out from the settlement terminal information recording unit 226 indicates where the settlement terminal 300 is located. Then, a fact that the positions identified by both pieces of the position information are close indicates that the user operating the user terminal 100 and the administrator of the settlement terminal 300 are close. In the case where, for example, the user immediately uses the generated one-word password, the user and the administrator of the settlement terminal 300 who receives the payment from the user are close when the payment is performed. For example, in the case where the user immediately uses the one-time password generated by their own user terminal 100 to perform the payment at restaurants, other eating places, shops of brick-and-mortar stores and the like, such a situation usually occurs, or rather, a situation that is not so hardly occurs. A possibility of achieving prevention of the impersonation of the user or the administrator of the settlement terminal 300 by the third party is increased by checking whether or not a situation has occurred where a distance between the user and the settlement terminal 300 is close, through the comparison of the two pieces of the position information as described above. In addition, while the position of the settlement terminal 300 is fixed to some extent, the user moves, and thus it is difficult for the third party who does not know where the user is to impersonate the user. Accordingly, it is very meaningful to have a result of the comparison of the two pieces of the position information, as the condition for allowing the settlement. It should be noted that, while safety of the settlement using this settlement system increases with a shorter reference distance (for example, 20 m in the above-mentioned case) for judging whether or not the positions identified by both pieces of the position information are "close," this reference distance may be appropriately decided depending on performance of the GPS mechanism included in the user terminal 100 (precision of the position of the user terminal 100 identified by the position information) or the like.

In contrast, there is a case where the settlement terminal 300 does not exist in the brick-and-mortar store. For example, in the case of the payment at the virtual store existing on the Internet, online settlement is performed as is widely known. In that case, it is not meaningful to have the distance between the user and the settlement terminal 300, as the condition for allowing the settlement. In this embodiment, if the settlement terminal 300 does not exist in the brick-and-mortar store, as is the case of the settlement terminal ID of 4 in FIG. 8, the position information on the settlement terminal 300 does not need to be recorded in the settlement terminal information recording unit 226, which, however, is not necessarily limited thereto. If the settlement terminal 300 does not exist in the brick-and-mortar store, it is because the additional condition of "Close to the user terminal" is not selected by the user.

It should be noted that, in this embodiment, whenever the upper limit amount information and the like are transmitted from the user terminal 100 to the settlement device 200, the position information identifying the position of the user terminal 100 is also supposed to be transmitted. However, as mentioned above, the position information is required only if the additional condition of "Limit the place of the payment recipient" has been selected by the user. Accordingly, the position information may be transmitted from the user terminal 100 to the settlement device 200 only if the position information is required, that is, only if the additional condition of "Limit the place of the payment recipient" has been selected by the user.

To sum up, in this embodiment, only when the final determination unit 225 of the settlement device 200 has determined that the following five conditions have all been satisfied, the final determination unit 225 finally makes the decision to allow the payment from the user having the user terminal 100 to the administrator of the settlement terminal 300.

1. The one-time password matching the one-time password sent from the user terminal 100 to the settlement device 200 via the settlement terminal 300 has been recorded in the virtual balance recording unit 229.
2. The user ID, which has been sent with the one-time password from the user terminal 100 to the settlement device 200 via the settlement terminal 300, matches the user ID associated with the one-time password, which has been recorded in the virtual balance recording unit 229 and is identical to the one-time password sent from the user terminal 100.
3. The amount identified by the amount information, which has been sent with the one-time password from the user terminal 100 via the settlement terminal 300, is equal to or less than the virtual balance associated with the one-time password matching the one-time password sent from the user terminal 100.
4. A timing when the final determination is performed is before a certain time point defined in the settlement device 200.
5. The payment satisfies the additional condition.

If any of the above-described five conditions is not satisfied, the final determination unit 225 in this embodiment finally makes the decision not to allow the above-described payment. Both these decisions are referred to as "final determination."

It should be noted that, in the above-described five conditions to be used in the final determination by the final determination unit 225, only the conditions 1 and 3 are essential. This settlement system may be changed such that the final determination unit 225 performs the final determination without use of other conditions. Moreover, if the above-described five conditions are used in the final determination, there is no specific rule regarding which condition the determination is started with.

If the final determination unit 225 has performed the final determination, the final determination unit 225 generates the final determination data that is the data indicating the result of the final determination, and sends the final determination data to the main control unit 222. If the payment has been allowed in the final determination, the main control unit 222, which has received the final determination data, performs processing for allowing the payment of the amount of money identified by the amount information that has been sent from the settlement terminal 300 with the one-time password, from the user having the user terminal 100 that has generated the one-time password or the like, to the administrator of the settlement terminal 300 that has sent the one-time password used to perform the final determination.

The result of this processing is recorded, for example, in the recording medium, which has been integrated in the main control unit 222, or located within or outside the settlement device 200, and whose illustration is omitted, and the related financial institution or the like is notified thereof if it is required to realize the processing of the payment. Content to be recorded in the recording medium may include at least information for identifying the user who has performed the payment, information for identifying a recipient of the payment, and the one-time password used in the payment. Moreover, as a part of this processing, the main control unit 222 subtracts the paid amount from the virtual balance recorded in the virtual balance recording unit 229 in a state of being associated with the one-time password used for the payment. Meanwhile, if the payment has not been allowed in the final determination, the main control unit 222 does not perform the above-mentioned processing.

The main control unit 222 sends the content of the final determination data to the data input/output unit 221 so that the content is sent via the transmission and reception unit and the network 400, to the settlement terminal 300 that has transmitted the settlement application information that becomes the basis of the final determination (S929).

The settlement terminal 300 receives this data (S933). The settlement terminal 300 receives this data at its transmission and reception unit. The data received by the transmission and reception unit is sent from the transmission and reception unit to the data input/output unit 323, and is sent from the data input/output unit 323 to the main control unit 321.

The main control unit 321 controls the display control unit 322 to display the content based on the final determination data on its display. Under control of the display control unit 322, appropriate display is performed on the display of the settlement terminal 300 (S934). If the content of the final determination data allows the payment, the display would indicate it, and if the content of the final determination data does not allow the payment, the display would indicate it.

It should be noted that the settlement device 200 may also transmit the content of the final determination data to the user terminal 100, in addition to the settlement terminal 300. In this case, the content based on the final determination data, which is similar to that displayed on the display of the settlement terminal 300, is displayed on the display 101 of the user terminal 100.

The above is a flow of the settlement performed in the settlement system in this embodiment.

Moreover, if there is a remaining amount in the virtual balance for one one-time password, the user may use the same one-time password for the payment again. In that case, the settlement terminal 300 used to send the one-time password and the like to the settlement device 200 is not necessarily the same as the settlement terminal 300 used last time. In other words, the user can perform the payment with the one-time password multiple number of times, possibly to different persons, within a range of the upper limit amount identified by the upper limit amount information.

In contrast, the expiration time of the one-time password may expire before the user uses it, and the virtual balance made to correspond to the one-time password may not be 0. In such a case, the main control unit 222 in the settlement device 200 may process money corresponding to the balance as money that has not been used by the user. For example, the money for the balance may be set back to the user's credit balance, and moreover, even if the one-time password has been issued in the user terminal 100, when the payment with the one-time password has not occurred, for example, an external financial institution may not be notified of the performance of the payment with the one-time password.

However, the settlement performed as described above may be canceled. The cancellation is executed in a flow as follows.

It is assumed that the user and the administrator of the settlement terminal 300 have thought that they hope to cancel the settlement performed in the past, in some circumstances. Then, the user operates the input device 102 of the user terminal 100 to invoke a settlement cancellation screen on the display 101. An example of the display on the display 101 at the time is illustrated in FIG. 21. It should be noted that, in this example, the above-described settlement of 25000 yen, which has been performed by the user with the user ID of d2af1apfa, is to be cancelled.

As illustrated in FIG. 21, a list of past settlements that are cancelable is displayed on the display 101. In this embodiment, the past settlements that are cancelable are limited, for example, to those within 10 minutes after the settlements have finished in the settlement device 200, and thus, there will not be many past settlements displayed here. In FIG. 21(A), two payments, that is, a payment of 25000 yen that has been performed at 19:21 on Dec. 25, 2016, and a payment of 2600 yen that has been performed at 19:18 on the same day, are displayed as cancelable targets on the display 101. The user uses the input device 102 to select one of them. FIG. 21(B) illustrates a state where the former of the two payments as cancellation targets has been selected. When the user clicks a button saying "Decide," the user terminal cancellation information including information for identifying the payment of 25000 yen that has been performed at 19:21 on Dec. 25, 2016, as the cancellation target is generated. The user terminal cancellation information is generated by the main control unit 121 that has accepted the input from the input device 102 via the data input/output unit 123. The user terminal cancellation information is sent from the main control unit 121 to the transmission and reception unit via the data input/output unit 123, and sent from the transmission and reception unit to the settlement device 200 via the network 400.

Meanwhile, the administrator of the settlement terminal 300 also performs similar processing to generate the settlement terminal cancellation information. The administrator of the settlement terminal 300 operates the input device of the settlement terminal 300 to display the screen similar to that as illustrated in FIG. 21, on the display of the settlement terminal 300. The list of the past settlements that are cancelable is displayed on the display. In this embodiment, while the past settlements that are cancelable are limited, for example, to those within 10 minutes after the settlements have finished in the settlement device 200, the number of settlements performed with one settlement terminal 300 is generally larger than the number of settlements performed with one user terminal 100, and thus, the settlements more than those illustrated in FIG. 21 will be displayed on the display of the settlement terminal 300. The administrator of the settlement terminal 300 operates the input device of the settlement terminal 300 to select one of them. In order for the administrator of the settlement terminal 300 to avoid a wrong choice, while only the time and date and the amount of the settlement are displayed as information for identifying the past settlement in the example as illustrated in FIG. 21, in addition, information for identifying the user who has performed the settlement, for example, the user ID, may also conveniently be displayed on the display. With the operation of the input device by the administrator of the settlement terminal 300, the settlement terminal cancellation information including the information identifying the payment of 25000 yen that has been performed by the user with the user ID of d2af1apfa at 19:21 on Dec. 25, 2016 is generated. The settlement terminal cancellation information is generated by the main control unit 321 that has accepted the input from the input device via the data input/output unit 323. The settlement terminal cancellation information is sent from the main control unit 321 to the transmission and reception unit via the data input/output unit 323, and sent from the transmission and reception unit to the settlement device 200 via the network 400.

The settlement device 200 receives the user terminal cancellation information and the settlement terminal cancellation information at its transmission and reception unit. The user terminal cancellation information and the settlement terminal cancellation information are sent to the main control unit 222 via the data input/output unit 221. If the main control unit 222 has received those two pieces of the information, the main control unit 222 determines whether or not the past settlements identified by the user terminal cancellation information and the settlement terminal cancellation information are identical. As a result, if both are identical, the main control unit 222 performs processing for canceling this past settlement. If only one of the user terminal cancellation information and the settlement terminal cancellation information has been received, or if these two pieces of the information have been received, but the past settlements identified by the user terminal cancellation information and the settlement terminal cancellation information are not identical, the main control unit 222 does not perform processing of canceling the past settlements. The main control unit 222 records a result of the cancellation of the settlement, for example, in the recording medium, which has been integrated in the main control unit 222, and whose illustration is omitted, and moreover, notifies the related financial institution or the like of the result if it is required to realize the processing of the cancellation.

The above-mentioned cancellation processing becomes more practical, for example, in use as follows.

The one-time password in the invention of the present application, which is used like the credit card number in the conventional credit card, that is, so-called disposable, and thus a possibility of plagiarism thereof is very low and can hardly be assumed. However, while the user sends the one-time password generated in the user terminal 100, to the settlement device 200 via the settlement terminal 300, there is a slight possibility of the one-time password being stolen by the third party and used by the third party.

In the above-mentioned embodiment, when the user intends to perform the payment, the user ID in addition to the one-time password is to be transmitted from the settlement terminal 300 to the settlement device 200. However, if the material for identifying the user, which is sent with the one-time password from the settlement terminal 300 to the settlement device 200, is only the user ID, since the user ID is typically not changed and is fixed, when the user ID has also been stolen in addition to the one-time password, a situation may also occur where the impersonation by the third party cannot be prevented. However, instead of sending the user ID with the one-time password, when biometric authentication is performed with a signature provided by the user to the touch panel display included in the settlement terminal 300, or with a fingerprint, a retina texture or the like of the user, along with the one-time password, such impersonation becomes almost impossible. However, since the signature, the fingerprint, the retina texture and the like, which are used for the biometric authentication, are basically unchanged, a slight possibility of the impersonation by the third party is still left even if they are used. Moreover, as will be mentioned later, if the one-time password is sent from the settlement terminal 300 to the settlement device 200, any information for identifying the user who has generated the one-time password in the user's own user terminal 100, such as the user ID, may also not be attached. In such a case, with the one-time password, which has been generated and the temporary permission information has been generated, in addition to the user who has generated the one-time password with the user's own user terminal 100, anyone can deliver the one-time password to the other party to perform the payment, which will have characteristics like cash, check or the like. If the settlement system handles such a one-time password, the third party who has stolen the one-time password can replace the user who has generated the one-time password with the user's own user terminal 100, and can use the one-time password.

The fraudulent use of the one-time password by such a third party can be prevented by the above-mentioned cancellation processing.

As mentioned above, in the settlement system of this embodiment, the final determination data is sent from the settlement device 200 to the settlement terminal 300, and the content indicated by the final determination data is displayed on the display included in the settlement terminal 300.

Here, it is assumed that the one-time password has been fraudulently used by the third party. For example, it is assumed that the stolen one-time password has been transmitted to the settlement device 200 from the settlement terminal 300 managed by a person other than the other party to whom the user has intended to pass the one-time password, which has been generated in the user's own user terminal 100 in order to perform the user's payment. In this case, the payment with the one-time password may be approved by the final determination unit 225 of the settlement device 200. However, as mentioned above, in order for the final determination unit 225 to perform positive determination for the payment with the one-time password sent from the settlement terminal 300, all of above-mentioned five requirements need to be satisfied in this embodiment. Accordingly, even if the one-time password stolen from the user and sent to the settlement device 200 has matched the one-time password created in the OTP generation unit 227 of the settlement device 200 and recorded in the virtual balance recording unit 229, the final determination unit 225 does not allow the settlement unless all other requirements are satisfied. However, all other conditions may be satisfied, and moreover, originally, since some of the other conditions are not necessarily essential in the settlement system in this embodiment, the other conditions may also not be originally considered in the final determination unit 225. In such a case, if the above-mentioned condition of matching of the one-time passwords has been satisfied and the virtual balance is sufficiently left, the final determination unit 225 of the settlement device 200 approves the payment with the one-time password.

In this case, the final determination data will be sent from the settlement device 200 to the settlement terminal 300. This final determination data is supposed to indicate that the settlement has been allowed. However, here, a problem is that the administrator of the settlement terminal 300 who has been enabled to receive the payment is different from the other party to whom the user has originally intended to perform the payment. In this stage, the final determination data has not arrived at the settlement terminal 300 of the administrator who is the other party to whom the user has originally intended to perform the payment. Meanwhile, as mentioned above, the final determination data may also be sent to the user terminal 100. However, even if the final determination data is sent to the user terminal 100 in this stage, the content of the final determination data is that the settlement device 200 has allowed the payment from the user to the other party to whom the user has not originally intended to perform the payment. Also depending on the degree of the information displayed on the display of the user terminal 100, from the content, the user may not be aware of the fraudulent use of the one-time password generated in the user's own user terminal 100, by the third party.

Meanwhile, it is assumed that, after the third party has already used the one-time password generated by the user in the user's own user terminal 100, that is, after the payment to someone with the one-time password has been established, the user has passed the one-time password to the other party to whom the user has originally intended to perform the payment. In this case, the one-time password is sent from the settlement terminal 300 of the administrator who is the other party, to the settlement device 200. However, since the one-time password has already been used in the past payment, the final determination unit 225 of the settlement device 200 does not allow the payment with the one-time password again. For example, regarding a fact that the one-time password has been utilized in the past (for example, within a certain time range), the final determination unit 225 searches whether or not a one-time password, which is identical to the one-time password that is a current target of the final determination, exists in the one-time passwords recorded in the above-mentioned recording medium, and if the identical one-time password exists, the final determination unit 225 can determine that the one-time password has been utilized in the past. However, since the one-time password has already been used for a past payment, the final determination unit 225 of the settlement device 200 may not allow the payment with the one-time password, depending on an amount of the balance for the one-time password.

Thus, in this case, the final determination data sent from the settlement device 200 to the settlement terminal 300 may indicate that the settlement is not allowed. The administrator of the settlement terminal 300, who has been a person who should originally receive the payment, tells the user who has passed the one-time password that the settlement has not been allowed in the settlement device 200.

The user, who has heard it, recognizes the fraudulent use of the one-time password in the past, and may execute the above-mentioned cancellation processing. Thereby, the fraudulent use of the one-time password can be prevented. It should be noted that the settlement device 200 can grasp the second attempt to use the one-time password, as mentioned above. The settlement device 200 may notify the user terminal 100 thereof, or of existence of a person who intends the fraudulent use of the one-time password. In order to enable the user to more easily recognize an occurrence of the fraudulent use, information on the number of the payment performed with the one-time password, or on the balance after the payments with the one-time password, should be previously added to data to be sent to the user terminal 100 or the settlement terminal 300 when the settlement has been allowed or has not been allowed, and such information should be displayed on the display 101 of the user terminal 100 or the display of the settlement terminal 300.

[Variation]

The settlement system of the variation will be described. This variation may also be applied to the second embodiment.

The settlement system of the variation is basically not different from the settlement system according to the first embodiment. A difference is a part of the data recorded in the credit information recording unit 224 of the settlement device 200. Also, consequently, the credit determination processing executed by the credit determination unit 223, and the processing in the main control unit 222 in the case where the payment has been realized with the one-time password from the user of the user terminal 100 to the administrator of the settlement terminal 300, are different in the case of the variation and the case of the first embodiment.

In the settlement system of the first embodiment, each user's credit balance has been recorded in the credit information recording unit 224 of the settlement device. This credit balance is not unrelated to each user's cash as mentioned above, but is decided depending on each user's credit. In the settlement system of the variation, a deposit balance has been recorded instead of the credit balance (FIG. 22).

The deposit balance is a balance of cash owned by the user. The deposit balance is, for example, the balance of the user's bank account itself, which is owned by the user at a certain bank, for example. In this case, for the above-mentioned certain bank, the administrator of the settlement device 200 itself may or may not be the bank. Alternatively, the deposit balance may also be the balance of money deposited at the administrator of the settlement device 200 from the user.

In the first embodiment, if the credit determination unit 223 performs the credit determination, the amount identified by the upper limit amount information has been compared to the amount of the credit balance, and the condition for generating the temporary permission information has been that the latter is equal to or larger than the former. Instead, if the credit determination unit 223 in the variation performs the credit determination, the amount identified by the upper limit amount information is compared to an amount of the deposit balance, and the condition for generating the temporary permission information is that the latter is equal to or larger than the former. It should be noted that, if the credit determination unit 223 has generated the temporary permission information, and the OTP generation unit 227 has generated the one-time password, the main control unit 222, which has accepted the one-time password, records the one-time password, and the upper limit amount and the like, which are made to correspond to the one-time password, in the virtual balance recording unit 229. Also in the case of this variation, this point is not different from the case of the first embodiment.

Then, it is assumed that the one-time password has been sent from the settlement terminal 300 to the settlement device 200, and after the processing similar to the case of the first embodiment, the payment with the one-time password, from the user of the user terminal 100 to the administrator of the settlement terminal 300, has been allowed in the settlement device 200. Then, in this variation, the amount for which the payment has been allowed is subtracted from the deposit balance associated with the one-time password used for the payment. This subtracted amount may be deposited to the administrator of the settlement device 200 once, may be remitted to the recipient of the payment, or may be remitted to a person who performs the payment to the recipient of the payment. When such processing is performed, the one-time password owned by the user is put into a state similar to such a state where security guarantee with the money owned by the user as the deposit balance is provided. In other words, the one-time password can also be said to be the money that is owned by the user as the deposit balance and can be brought out as data or information.

This function of the security guarantee becomes more robust if, after the one-time passwords have been generated in the settlement device 200 and the user terminal 100, the main control unit 222 in the settlement device 200 defines that the amount corresponding to the upper limit amount information made to correspond to the generated one-time password is subtracted from the user's deposit balance and deposited to the administrator of the settlement device 200 (or, for example, a public third party).

Second Embodiment

The settlement system of the second embodiment will be described. The settlement system of the second embodiment is basically configured similarly to the settlement system of the first embodiment, and the flow of the settlement performed by this settlement system is also similar to the case of the settlement system of the first embodiment.

Difference between the settlement systems of the first embodiment and the second embodiment is a way of performing the final determination, in the final determination unit 225 of the settlement device 200, and moreover, the data sent from the settlement terminal 300 to the settlement device 200 is also changed accordingly. Moreover, the data recorded in the virtual balance recording unit 229 is also changed.

In the first embodiment, as mentioned above, it has been supposed that, if the settlement application information and the one-time password are transmitted from the settlement terminal 300 to the settlement device 200, the user ID is also transmitted with them.

The one-time password, which has been generated in the user terminal 100 and transmitted from the settlement terminal 300, is to be compared to the one-time password, which has been generated in the OTP generation unit 227 of the settlement device 200, in the final determination unit 225, and thus needs to be sent with the settlement application information from the settlement terminal 300 to the settlement device 200. Meanwhile, in the above-mentioned embodiment, the user ID has been used to check whether or not the payment with the user ID is performed by the user himself of the user terminal 100 that has generated the one-time password.

However, the check may be more conveniently omitted, that is, it may be more convenient if the one-time password can also be used by a person other than the legitimate user of the user terminal 100 that has generated the one-time password.

This second embodiment relates to such a settlement system.

In the settlement system of the second embodiment, as mentioned above, when the settlement application information is transmitted from the settlement terminal 300 to the settlement device 200, while the one-time password generated in the user terminal 100 is added to the settlement application information, the information for identifying the user who intends to perform the settlement, such as the user ID, is not added.

Moreover, the user ID, which has been recorded so as to be associated with the one-time password in the first embodiment, is not recorded in the virtual balance recording unit 229, but may also be recorded.

It is assumed that one user or a person other than the user has transmitted the one-time password not necessarily generated in the user terminal 100 owned by the user, with the settlement application information to the settlement device 200 through the settlement terminal 300. In other words, it is assumed that the one-time password generated in the user terminal 100 has been sent to the settlement device 200 via the settlement terminal 300 by the user of the user terminal 100, or by a person who has been transferred the one-time password from the user directly or via anyone else.

The settlement application information and the one-time password are received at the transmission and reception unit of the settlement device 200, and sent to the main control unit 222 via the data input/output unit 221. The main control unit 222 sends the settlement application information and the one-time password which have been received, to the final determination unit 225.

The final determination unit 225 then determines whether or not the one-time password matching the one-time password received from the main control unit 222 exists in many one-time passwords for various users, which have been generated in the OTP generation unit 227 and recorded in the virtual balance recording unit 229. If such a one-time password exists, the final determination unit 225 reads out the one-time password matching the one-time password received from the main control unit 222 and sent from the user via the settlement terminal 300; and various data (however, the user ID does not exist) linked to the matching one-time password and recorded in the virtual balance recording unit 229. Subsequent processing in this second embodiment may be similar to the case of the above-mentioned embodiment, except for omission of the above-mentioned condition 2 for determining the matching of the user IDs.

While the final determination unit 225 will compare the one-time password generated in the user terminal 100 to many one-time passwords generated by the OTP generation unit 227 and recorded in the virtual balance recording unit 229, the number of the one-time passwords generated is large but not huge if the one-time password generated in the user terminal 100 has the expiration time. Moreover, there is no possibility of generation of identical one-time passwords for multiple users created in the OTP generation unit 227 during that time. Accordingly, in this case, it can be said that the above-mentioned condition 4 is also preferably used in the final determination unit 225.

Accordingly, the final determination unit 225 can also correctly generate the final determination data similarly to the case of the first embodiment, according to the method of the second embodiment.

The invention claimed is:

1. A settlement system configured to include:
a user terminal used by a user, comprising user terminal input means that accepts input of information, user terminal transmission and reception means that performs transmission and reception of data via a predetermined network, and user terminal information processing means that performs information processing;
a settlement device that performs settlement of the user's payment, comprising settlement device transmission and reception means that performs transmission and reception of the data via the network, settlement device information processing means that performs information processing, and a recording medium that records at least virtual balance information for each user so as to be associated with each user; and
a settlement terminal managed by a recipient of the payment from the user, comprising settlement terminal input means that accepts the input of the information, and settlement terminal transmission and reception means that performs transmission and reception of the data via the network,
wherein each of the user terminal, the settlement device, and the settlement terminal is capable of connecting to the network,
wherein the user terminal is capable of inputting upper limit amount information that is information identifying an amount of an upper limit of the settlement, and amount information that is information identifying an amount to be settled, with the user terminal input means, and transmits the upper limit amount information and user information that is information identifying the user who performs the payment of the amount identified by the upper limit amount information, to the settlement device via the network with the user terminal transmission and reception means; and moreover, the user terminal information processing means comprises a user terminal OTP generation unit that generates a one-time password,
wherein the settlement device receives the upper limit amount information and the user information from the user terminal with the settlement device transmission and reception means; the settlement device information processing means comprises a credit determination unit that, if the settlement device transmission and reception means has received the upper limit amount information and the user information, executes credit determination that is determination of whether or not the settlement of the payment of the amount identified by the upper limit amount information sent from the user terminal is possible, and if it is determined in the credit determination that the settlement is possible, generates temporary permission information that is information indicating the determination; the settlement device information processing means also comprises a final determination unit that performs final determination of the settlement, and a settlement device OTP generation unit that generates a one-time password identical to the one-time password which is generated in the user terminal if the temporary permission information has been generated; the settlement device transmission and reception means transmits the temporary permission information generated by the credit determination unit to the user terminal via the network; and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password in the settlement device OTP generation unit, and
wherein when the temporary permission information is accepted from the settlement device by the user terminal at the user terminal transmission and reception means, the user terminal OTP generation unit separately and independently generates the one-time password; and if the one-time password generated in the user terminal and the amount information have been inputted from the settlement terminal input means of the settlement terminal, and the settlement terminal has sent the one-time password and the amount information from the settlement terminal transmission and reception means to the settlement device via the network, the virtual balance information associated with a one-time password identical to the one-time password received from the settlement terminal by the settlement device is read out from the recording medium, and also on a condition that the amount identified by the amount information received from the settlement terminal is equal to or less than an amount identified by the virtual balance information, the final determination unit of the settlement device permits the payment from the user of the user terminal to an administrator of the settlement terminal with the one-time password, and also subtracts the amount used for the payment, from the virtual balance information recorded so as to be associated with the one-time password used for the payment in the recording medium, wherein at least one of event synchronization or time synchronization is used to generate, in the user terminal, the one-time password based on an initial value, and to generate, in the settlement device, the one-time password identical to the one-time password which is generated in the user terminal based on the same initial value, and wherein generating the one-time password in both the user terminal and the settlement device comprises assigning a past value to a predetermined function that raises the past value to a predetermined power.

2. A user terminal for constituting a settlement system which has the user terminal, a settlement device, and a settlement terminal configured to include:

the user terminal used by a user, comprising user terminal input means that accepts input of information, user terminal transmission and reception means that performs transmission and reception of data via a predetermined network, and user terminal information processing means that performs information processing;

the settlement device that performs settlement of the user's payment, comprising settlement device transmission and reception means that performs transmission and reception of the data via the network, settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network, wherein upper limit amount information that is information identifying an amount of an upper limit of the settlement, and amount information that is information identifying an amount to be settled are capable of being inputted with the user terminal input means; the upper limit amount information and user information that is information identifying the user who performs the payment of the amount identified by the upper limit amount information are transmitted to the settlement device via the network with the user terminal transmission and reception means; and moreover, the user terminal information processing means comprises a user terminal OTP generation unit that generates a one-time password, wherein the settlement device receives the upper limit amount information and the user information from the user terminal with the settlement device transmission and reception means; the settlement device information processing means comprises a credit determination unit that, if the settlement device transmission and reception means has received the upper limit amount information and the user information, executes credit determination that is determination of whether or not the settlement of the payment of the amount identified by the upper limit amount information for the user identified by the user information is possible, and if it is determined in the credit determination that the settlement is possible, generates temporary permission information that is information indicating the determination; the settlement device information processing means also comprises a final determination unit that performs final determination of the settlement, and a settlement device OTP generation unit that generates a one-time password identical to the one-time password which is generated in the user terminal if the temporary permission information has been generated; the settlement device transmission and reception means transmits the temporary permission information generated by the credit determination unit to the user terminal via the network; and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password in the settlement device OTP generation unit, and wherein when the temporary permission information is accepted from the settlement device by the user terminal at the user terminal transmission and reception means, the user terminal OTP generation unit separately and independently generates the one-time password; and thereby, if the one-time password generated in the user terminal and the amount information have been inputted from the settlement terminal input means of the settlement terminal, and the settlement terminal has sent the one-time password and the amount information from the settlement terminal transmission and reception means to the settlement device via the network, the virtual balance information associated with a one-time password identical to the one-time password received from the settlement terminal by the settlement device is read out from the recording medium, and also on a condition that the amount identified by the amount information received from the settlement terminal is equal to or less than an amount identified by the virtual balance information, the final determination unit of the settlement device permits the payment from the user of the user terminal to an administrator of the settlement terminal with the one-time password, and also subtracts the amount used for the payment, from the virtual balance information recorded so as to be associated with the one-time password used for the payment in the recording medium, wherein at least one of event synchronization or time synchronization is used to generate, in the user terminal, the one-time password based on an initial value, and to generate, in the settlement device, the one-time password identical to the one-time password which is generated in the user terminal based on the same initial value, and wherein generating the one-time password in both the user terminal and the settlement device comprises assigning a past value to a predetermined function that raises the past value to a predetermined power.

3. The user terminal according to claim 2, wherein the user information includes both a user ID inputted by the user with the user terminal input means, and unique terminal information allocated to each user terminal that is the user terminal.

4. The user terminal according to claim 2, wherein the user terminal input means is capable of, with an operation thereof, inputting an additional condition that is a condition added in order for the final determination unit of the settlement device to permit the payment from the user of the user terminal to the administrator of the settlement terminal, and the user terminal transmission and reception means sends the additional condition to the settlement device via the network, and when the settlement device transmission and reception means accepts the additional condition, the final determination unit adds a condition for permitting the payment from the user of the user terminal to the administrator of the settlement terminal, depending on the additional condition.

5. The user terminal according to claim 4, wherein the additional condition is a restriction of a period in which the payment is permitted.

6. The user terminal according to claim 4, wherein the additional condition is a restriction of a position of the settlement terminal that receives the payment.

7. The user terminal according to claim 4, wherein the additional condition is a restriction of the settlement terminal that receives the payment.

8. The user terminal according to claim 6, wherein the user terminal comprises position information generation means that generates position information that is information for identifying a position where the user terminal exists, and the user terminal transmission and reception means transmits the position information to the settlement device, and only if a position of the settlement terminal that has sent the one-time password from the user terminal with the settlement terminal transmission and reception means thereof is within a predetermined distance from the position identified by the position information generated in the position information generation means of the user terminal, the final determination unit of the settlement device permits the payment from the user of the user terminal to the administrator of the settlement terminal with the one-time password.

9. The user terminal according to claim 8, wherein the user terminal transmission and reception means transmits the position information along with the upper limit amount information and the user information to the settlement device.

10. The user terminal according to claim 2, wherein the user terminal input means is capable of inputting an upper limit amount identified by the upper limit amount information as a sum of split amounts that are two or more amounts; and if the user terminal OTP generation unit generates the one-time password, the user terminal OTP generation unit generates as many one-time passwords as a number of pieces of split amount information that is information identifying the split amounts, corresponding to the respective pieces of the split amount information, if the settlement device OTP generation unit in the settlement device generates the one-time password identical to the one-time password which is generated in the user terminal, the settlement device OTP generation unit generates as many one-time passwords identical to those generated in the user terminal, as the number of pieces of the split amount information, corresponding to the respective pieces of the split amount information; and in the recording medium, the one-time passwords and the split amount information made to correspond to the one-time passwords are recorded so as to be associated with each other such that each piece of the upper limit amount information becomes the virtual balance information, and if the one-time password made to correspond to one piece of the split amount information generated in the user terminal and the amount information have been inputted from the settlement terminal input means of the settlement terminal, and the settlement terminal has sent the one-time password and the amount information from the settlement terminal transmission and reception means to the settlement device via the network, the virtual balance information associated with the one-time password identical to the one-time password received from the settlement terminal by the settlement device is read out from the recording medium, and also on the condition that the amount identified by the amount information received from the settlement terminal is equal to or less than the amount identified by the virtual balance information, the final determination unit of the settlement device permits the payment from the user of the user terminal to the administrator of the settlement terminal with the one-time password, and also subtracts the amount used for the payment, from the virtual balance information recorded so as to be associated with the one-time password used for the payment in the recording medium.

11. The user terminal according to claim 10, wherein the split amount information is selected from predefined split amount information with an operation of the user terminal input means.

12. The user terminal according to claim 2, wherein the user terminal input means is capable of inputting user terminal cancellation information for identifying and canceling one of settlements performed in the past with the user terminal, after the final determination unit of the settlement device has permitted the settlement, and moreover, the user terminal transmission and reception means sends the user terminal cancellation information to the settlement device via the network, and the settlement device information processing means comprises cancellation means that, when the user terminal cancellation information has been accepted, cancels the settlement identified by the user terminal cancellation information.

13. A method executed by user terminal information processing means included in a user terminal for constituting a settlement system which has the user terminal, a settlement device, and a settlement terminal configured to include:

the user terminal used by a user, comprising user terminal input means that accepts input of information, user terminal transmission and reception means that performs transmission and reception of data via a predetermined network, and the user terminal information processing means that performs information processing;

the settlement device that performs settlement of the user's payment, comprising settlement device transmission and reception means that performs transmission and reception of the data via the network, settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network, wherein the method executed by the user terminal information processing means includes:

a process of accepting input of upper limit amount information that is information identifying an amount of an upper limit of the settlement, with the user terminal input means;

a process of transmitting the upper limit amount information and user information that is information identifying the user who performs the payment of the amount identified by the upper limit amount information, to the settlement device via the network with the user terminal transmission and reception means;

a process of, if, in the settlement device that has received the upper limit amount information and the user information from the user terminal with the settlement device transmission and reception means, the settlement device information processing means has executed credit determination that is determination of whether or not the settlement of the payment of the amount identified by the upper limit amount information sent from the user terminal is possible, and in a case where it has been determined in the credit determination that the settlement is possible, the settlement device information processing means has generated temporary permission information that is information indicating the determination, and has also generated a one-time password in a case where the temporary permission information has been generated, and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password, and the settlement device transmission and reception means has transmitted the temporary permission information to the user terminal via the network, accepting the temporary permission information by the user terminal transmission and reception means; and a process of, if the temporary permission information has been accepted from the settlement device by the user terminal, separately and independently generating, by the user terminal, a one-time password identical to the one-time password which is generated in the settlement device, and wherein thereby, if the one-time password generated in the user terminal and amount information that is information identifying an amount to be settled have been inputted from the settlement terminal input means of the settlement terminal, and the settlement terminal has sent the one-time password and the amount information from the settlement terminal transmission and reception means to the settlement device via the network, the virtual balance information associated with a one-time password identical to the one-time password received from the settlement terminal by the settlement device is read out from the recording medium, and moreover, on a condition that the amount identified by the amount information received from the settlement terminal is equal to or less than an amount identified by the virtual balance information, the settlement device information processing means of the settlement device permits the payment from the user of the user terminal to an administrator of the settlement terminal with the one-time password, and also subtracts the amount used for the payment, from the virtual balance information recorded so as to be associated with the one-time password used for the payment in the recording medium, wherein at least one of event synchronization or time synchronization is used to generate, in the user terminal, the one-time password based on an initial value, and to generate, in the settlement device, the one-time password identical to the one-time password which is generated in the user terminal based on the same initial value, and wherein generating the one-time password in both the user terminal and the settlement device comprises assigning a past value to a predetermined function that raises the past value to a predetermined power.

14. A computer program, stored on non-transitory media, for causing a computer to function as a user terminal for constituting a settlement system which has the user terminal, a settlement device, and a settlement terminal configured to include:

the user terminal used by a user, comprising user terminal input means that accepts input of information, user terminal transmission and reception means that performs transmission and reception of data via a predetermined network, and user terminal information processing means that performs information processing;

the settlement device that performs settlement of the user's payment, comprising settlement device transmission and reception means that performs transmission and reception of the data via the network, settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network, wherein the computer is caused to execute:

a process of accepting input of upper limit amount information that is information identifying an amount of an upper limit of the settlement, with the user terminal input means;

a process of transmitting the upper limit amount information and user information that is information identifying the user who performs the payment of the amount identified by the upper limit amount information, to the settlement device via the network with the user terminal transmission and reception means;

a process of, if, in the settlement device that has received the upper limit amount information and the user information from the user terminal with the settlement device transmission and reception means, the settlement device information processing means has executed credit determination that is determination of whether or not the settlement of the payment of the amount identified by the upper limit amount information sent from the user terminal is possible, and in a case where it has been determined in the credit determination that the settlement is possible, the settlement device information processing means has generated temporary permission information that is information indicating the determination, and has also generated a one-time password in a case where the temporary permission information has been generated, and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password, and the settlement device transmission and reception means has transmitted the temporary permission information to the user terminal via the network, accepting the temporary permission information by the user terminal transmission and reception means; and a process of, if the temporary permission information has been accepted from the settlement device by the user terminal, separately and independently generating, by the user terminal, a one-time password identical to the one-time password which is generated in the settlement device, and wherein thereby, if the one-time password generated in the user terminal and amount information that is information identifying an amount to be settled have been inputted from the settlement terminal input means of the settlement terminal, and the settlement terminal has sent the one-time password and the amount information from the settlement terminal transmission and reception means to the settlement device via the network, the virtual balance information associated with a one-time password identical to the one-time password received from the settlement terminal by the settlement device is read out from the recording medium, and moreover, on a condition that the amount identified by the amount information received from the settlement terminal is equal to or less than an amount identified by the virtual balance information, the settlement device information processing means of the settlement device permits the payment from the user of the user terminal to an administrator of the settlement terminal with the one-time password, and also subtracts the amount used for the payment, from the virtual balance information recorded so as to be associated with the one-time password used for the payment in the recording medium, wherein at least one of event synchronization or time synchronization is used to generate, in the user terminal, the one-time password based on an initial value, and to generate, in the settlement device, the one-time password identical to the one-time password which is generated in the user terminal based on the same initial value, and wherein generating the one-time password in both the user terminal and the settlement device comprises assigning a past value to a predetermined function that raises the past value to a predetermined power.

15. A settlement device for constituting a settlement system which has a user terminal, the settlement device, and a settlement terminal configured to include:

the user terminal used by a user, comprising user terminal input means that accepts input of information, user terminal transmission and reception means that performs transmission and reception of data via a predetermined network, and user terminal information processing means that performs information processing;

the settlement device that performs settlement of the user's payment, comprising settlement device transmission and reception means that performs transmission and reception of the data via the network, settlement device information processing means that performs information processing, and a recording medium that records at least virtual balance information for each user so as to be associated with each user; and the settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network, wherein the user terminal is capable of inputting upper limit amount information that is information identifying an amount of an upper limit of the settlement, and amount information that is information identifying an amount to be settled, with the user terminal input means, and transmits the upper limit amount information and user information that is information identifying the user who performs the payment of the amount identified by the upper limit amount information, to the settlement device via the network with the user terminal transmission and reception means; and moreover, the user terminal information processing means comprises a user terminal OTP generation unit that generates a one-time password, wherein the upper limit amount information and the user information are received from the user terminal with the settlement device transmission and reception means; the settlement device information processing means comprises a credit determination unit that, if the settlement device transmission and reception means has received the upper limit amount information and the user information, executes credit determination that is determination of whether or not the settlement of the payment of the amount identified by the upper limit amount information sent from the user terminal is possible, and if it is determined in the credit determination that the settlement is possible, generates temporary permission information that is information indicating the determination; the settlement device information processing means also comprises a final determination unit that performs final determination of the settlement, and a settlement device OTP generation unit that generates a one-time password identical to the one-time password which is generated in the user terminal if the temporary permission information has been generated; the settlement device transmission and reception means transmits the temporary permission information generated by the credit determination unit to the user terminal via the network; and moreover, in the recording medium, the one-time password and the upper limit amount information are recorded so as to be associated with each other such that the upper limit amount information becomes the virtual balance information, the upper limit amount information having been used for generating the temporary permission information that has caused the generation of the one-time password in the settlement device OTP generation unit, and wherein when the temporary permission information is accepted from the settlement device by the user terminal at the user terminal transmission and reception means, the user terminal OTP generation unit separately and independently generates the one-time password; and if the one-time password generated in the user terminal and the amount information have been inputted from the settlement terminal input means of the settlement terminal, and the settlement terminal has sent the one-time password and the amount information from the settlement terminal transmission and reception means to the settlement device via the network, the virtual balance information associated with a one-time password identical to the one-time password received from the settlement terminal by the settlement device is read out from the recording medium, and also on a condition that the amount identified by the amount information received from the settlement terminal is equal to or less than an amount identified by the virtual balance information, the final determination unit of the settlement device permits the settlement of the payment from the user of the user terminal to an administrator of the settlement terminal with the one-time password, and also subtracts the amount used for the payment, from the virtual balance information recorded so as to be associated with the one-time password used for the payment in the recording medium, wherein at least one of event synchronization or time synchronization is used to generate, in the user terminal, the one-time password based on an initial value, and to generate, in the settlement device, the one-time password identical to the one-time password which is generated in the user terminal based on the same initial value, and wherein generating the one-time password in both the user terminal and the settlement device comprises assigning a past value to a predetermined function that raises the past value to a predetermined power.

16. The settlement device according to claim 15, wherein the final determination unit permits the settlement only if a time from a predetermined time point after the user starts processing for inputting the upper limit amount information with the user terminal input means and before the final determination unit performs the final determination of the settlement, until the final determination unit performs the final determination of the settlement, is shorter than a predefined time interval.

17. The settlement device according to claim 15, wherein the user terminal input means is capable of inputting user terminal cancellation information for identifying and canceling one of settlements performed in the past with the user terminal, after the final determination unit of the settlement device has permitted the settlement, and moreover, the user terminal transmission and reception means sends the user terminal cancellation information to the settlement device via the network, and the settlement device information processing means comprises cancellation means that, when the user terminal cancellation information has been accepted, cancels the settlement identified by the user terminal cancellation information.

18. The settlement device according to claim 15, wherein the settlement terminal input means is capable of inputting settlement terminal cancellation information for identifying and canceling one of settlements performed in the past with the settlement terminal, after the final determination unit of the settlement device has permitted the settlement, and moreover, the settlement terminal transmission and reception means sends the settlement terminal cancellation information to the settlement device via the network, and the settlement device information processing means comprises cancellation means that, when the settlement terminal cancellation information has been accepted, cancels the settlement identified by the settlement terminal cancellation information.

19. The settlement device according to claim 17, wherein the settlement terminal input means is capable of inputting settlement terminal cancellation information for identifying and canceling one of settlements performed in the past with the settlement terminal, after the final determination unit of the settlement device has permitted the settlement, and moreover, the settlement terminal transmission and reception means sends the settlement terminal cancellation information to the settlement device via the network, and the cancellation means cancels the settlement when the user terminal cancellation information and the settlement terminal cancellation information have been accepted and the settlements identified by the user terminal cancellation information and the settlement terminal cancellation information have matched each other.

20. The settlement device according to claim 17, wherein when the final determination unit has not permitted the settlement, the final determination unit generates non-permission information that identifies which settlement has not been permitted and indicates that the settlement has not been permitted, and sends the non-permission information to the settlement device transmission and reception means; and the settlement device transmission and reception means transmits the non-permission information to the settlement terminal via the network, and the settlement terminal that has accepted the non-permission information notifies an administrator of the settlement terminal of which settlement has not been permitted.

21. The settlement device according to claim 15, wherein each user's deposit balance is recorded in the recording medium, and if the temporary permission information has been generated, the upper limit amount information that has caused the generation of the temporary permission information is subtracted from the deposit balance of the user who has sent the upper limit amount information that has caused the generation of the temporary permission information.

22. The settlement device according to claim 15, wherein each user's deposit balance is recorded in the recording medium, and
the credit determination unit performs the credit determination by determining whether or not the amount identified by the upper limit amount information is equal to or less than the user's deposit balance, and generates the temporary permission information on a condition that the amount identified by the upper limit amount information is equal to or less than the user's deposit balance.

23. A method executed by settlement device information processing means included in a settlement device which has a user terminal, the settlement device, and a settlement terminal for constituting a settlement system configured to include:
the user terminal used by a user, comprising user terminal input means that accepts input of information, user terminal transmission and reception means that performs transmission and reception of data via a predetermined network, and user terminal information processing means that performs information processing;
the settlement device that performs settlement of the user's payment, comprising settlement device transmission and reception means that performs transmission and reception of the data via the network, the settlement device information processing means that performs information processing, and a recording medium that records at least virtual balance information for each user so as to be associated with each user; and
the settlement terminal managed by a recipient of the payment from the user, comprising settlement terminal input means that accepts the input of the information, and settlement terminal transmission and reception means that performs transmission and reception of the data via the network,
wherein each of the user terminal, the settlement device, and the settlement terminal is capable of connecting to the network, and
wherein the method executed by the settlement device information processing means includes:
a process of, after upper limit amount information that is information identifying an amount of an upper limit of the settlement has been inputted with the user terminal input means in the user terminal, when the upper limit amount information and user information that is information identifying the user who performs the payment of the amount identified by the upper limit amount information have been transmitted to the settlement device via the network with the user terminal transmission and reception means, receiving the upper limit amount information and the user information from the user terminal with the settlement device transmission and reception means;
a process of, if the settlement device transmission and reception means has received the upper limit amount information and the user information, executing credit determination that is determination of whether or not the settlement of the payment of the amount identified by the upper limit amount information for the user identified by the user information is possible, and if it is determined in the credit determination that the settlement is possible, generating temporary permission information that is information indicating the determination;
a process of generating a one-time password if the temporary permission information has been generated;
a process of recording, in the recording medium, the one-time password and upper limit amount information so as to be associated with each other such that the upper limit amount information becomes the virtual balance information, the upper limit amount information having been used for generating the temporary permission information that has caused the generation of the one-time password;
a process of transmitting the generated temporary permission information to the user terminal via the network, with the settlement device transmission and reception means;
a process of, if, in the user terminal that has accepted the temporary permission information at the user terminal transmission and reception means from the settlement device, a one-time password that has been separately and independently generated by the user terminal information processing means and is identical to that generated in the settlement device, and the amount information have been inputted from the settlement terminal input means of the settlement terminal, and the settlement terminal has sent the one-time password and the amount information from the settlement terminal transmission and reception means to the settlement device via the network, receiving the one-time password and the amount information at the settlement device transmission and reception means; and
a process of reading out the virtual balance information associated with a one-time password identical to the one-time password received from the settlement terminal by the settlement device, from the recording medium, and on a condition that the amount identified by the amount information received from the settlement terminal is equal to or less than an amount identified by the virtual balance information, settling the payment from the user of the user terminal to an administrator of the settlement terminal with the one-time password, and also subtracting the amount used for the payment, from the virtual balance information recorded so as to be associated with the one-time password used for the payment in the recording medium,
wherein at least one of event synchronization or time synchronization is used to generate, in the user terminal, the one-time password based on an initial value, and to generate, in the settlement device, the one-time password identical to the one-time password which is generated in the user terminal based on the same initial value, and
wherein generating the one-time password in both the user terminal and the settlement device comprises assigning a past value to a predetermined function that raises the past value to a predetermined power.

24. A computer program, stored on non-transitory media, for causing a computer to function as a settlement device for constituting a settlement system configured to include:
a user terminal used by a user, comprising user terminal input means that accepts input of information, user terminal transmission and reception means that performs transmission and reception of data via a predetermined network, and user terminal information processing means that performs information processing;

the settlement device that performs settlement of the user's payment, comprising settlement device transmission and reception means that performs transmission and reception of the data via the network, settlement device information processing means that performs information processing, and a recording medium that records at least virtual balance information for each user so as to be associated with each user; and a settlement terminal managed by a recipient of the payment from the user, comprising settlement terminal input means that accepts the input of the information, and settlement terminal transmission and reception means that performs transmission and reception of the data via the network, wherein each of the user terminal, the settlement device, and the settlement terminal is capable of connecting to the network, and wherein the computer is caused to execute:

a process of, after upper limit amount information that is information identifying an amount of an upper limit of the settlement has been inputted with the user terminal input means in the user terminal, when the upper limit amount information and user information that is information identifying the user who performs the payment of the amount identified by the upper limit amount information have been transmitted to the settlement device via the network with the user terminal transmission and reception means, receiving the upper limit amount information and the user information from the user terminal with the settlement device transmission and reception means;

a process of, if the settlement device transmission and reception means has received the upper limit amount information and the user information, executing credit determination that is determination of whether or not the settlement of the payment of the amount identified by the upper limit amount information for the user identified by the user information is possible, and if it is determined in the credit determination that the settlement is possible, generating temporary permission information that is information indicating the determination;

a process of generating a one-time password if the temporary permission information has been generated;

a process of recording, in the recording medium, the one-time password and upper limit amount information so as to be associated with each other such that the upper limit amount information becomes the virtual balance information, the upper limit amount information having been used for generating the temporary permission information that has caused the generation of the one-time password;

a process of transmitting the generated temporary permission information to the user terminal via the network, with the settlement device transmission and reception means;

a process of, if, in the user terminal that has accepted the temporary permission information at the user terminal transmission and reception means from the settlement device, a one-time password that has been separately and independently generated by the user terminal information processing means and is identical to that generated in the settlement device, and the amount information have been inputted from the settlement terminal input means of the settlement terminal, and the settlement terminal has sent the one-time password and the amount information from the settlement terminal transmission and reception means to the settlement device via the network, receiving the one-time password and the amount information at the settlement device transmission and reception means; and a process of reading out the virtual balance information associated with a one-time password identical to the one-time password received from the settlement terminal by the settlement device, from the recording medium, and on a condition that the amount identified by the amount information received from the settlement terminal is equal to or less than an amount identified by the virtual balance information, settling the payment from the user of the user terminal to an administrator of the settlement terminal with the one-time password, and also subtracting the amount used for the payment, from the virtual balance information recorded so as to be associated with the one-time password used for the payment in the recording medium, wherein at least one of event synchronization or time synchronization is used to generate, in the user terminal, the one-time password based on an initial value, and to generate, in the settlement device, the one-time password identical to the one-time password which is generated in the user terminal based on the same initial value, and wherein generating the one-time password in both the user terminal and the settlement device comprises assigning a past value to a predetermined function that raises the past value to a predetermined power.

25. A cash voucher made by:
printing the one-time password generated in the user terminal according to claim 2, on paper.

26. The cash voucher according to claim 15, wherein
a part of the one-time password is printed on one side of the paper, and a rest part of the one-time password is printed on another side of the paper, respectively.

27. A cash voucher made by:
printing information for identifying the one-time password generated in the user terminal according to claim 2, on paper.

28. The cash voucher according to claim 27, wherein information for identifying a part of the one-time password is printed on one side of the paper, and information for identifying a rest part of the one-time password is printed on another side of the paper, respectively.

29. The cash voucher according to claim 25, wherein
a face of a person scheduled to use the cash voucher is printed on the paper.

* * * * *